(12) United States Patent
Klinker et al.

(10) Patent No.: US 7,584,298 B2
(45) Date of Patent: Sep. 1, 2009

(54) TOPOLOGY AWARE ROUTE CONTROL

(75) Inventors: Eric Klinker, Oakland, CA (US);
Jeremy T. Johnson, San Diego, CA (US); Brian Douglas Grady, Mountain View, CA (US); Edward Crabbe, Seattle, WA (US)

(73) Assignee: Internap Network Services Corporation, Atlanta, GA (US)

( * ) Notice: Subject to any disclaimer, the term of this patent is extended or adjusted under 35 U.S.C. 154(b) by 794 days.

(21) Appl. No.: 10/735,589

(22) Filed: Dec. 12, 2003
(Under 37 CFR 1.47)

(65) Prior Publication Data

US 2006/0182034 A1 Aug. 17, 2006

Related U.S. Application Data

(60) Provisional application No. 60/433,285, filed on Dec. 13, 2002.

(51) Int. Cl.
*G06F 15/173* (2006.01)
(52) U.S. Cl. ............... 709/238; 709/239; 709/242; 709/223; 370/229
(58) Field of Classification Search ........... 709/238, 709/239, 242, 223; 370/229, 232, 235
See application file for complete search history.

(56) References Cited

U.S. PATENT DOCUMENTS

| | | | |
|---|---|---|---|
| 3,801,757 A | 4/1974 | Carissimi et al. | |
| 4,873,517 A | 10/1989 | Baratz et al. | |
| 5,575,676 A | 11/1996 | Tsukakoshi et al. | |
| 5,598,532 A | 1/1997 | Liron | |
| 5,724,513 A | 3/1998 | Ben-Nun et al. | |
| 5,742,585 A * | 4/1998 | Yamamoto et al. | 370/223 |
| 5,781,534 A | 7/1998 | Perlman et al. | |
| 5,870,561 A | 2/1999 | Jarvis et al. | |
| 5,898,668 A | 4/1999 | Shaffer | |
| 5,933,425 A | 8/1999 | Iwata | |
| 5,953,312 A | 9/1999 | Crawley et al. | |
| 5,974,237 A | 10/1999 | Shurmer et al. | |
| 6,047,326 A | 4/2000 | Kilkki | |
| 6,047,331 A | 4/2000 | Medard et al. | |
| 6,055,571 A | 4/2000 | Fulp et al. | |

(Continued)

FOREIGN PATENT DOCUMENTS

EP 0974029 10/1998

(Continued)

OTHER PUBLICATIONS

International Search Report issued for International Patent Application No. PCT/US03/39642.

(Continued)

*Primary Examiner*—Frantz B Jean
(74) *Attorney, Agent, or Firm*—Kilpatrick Stockton LLP

(57) ABSTRACT

The present invention uses proxy points for measuring different routes to a destination address space. Multiple paths to the desired destination address space are identified. Each path begins at a source and terminates at the destination address space. Proxy points are identified for each path and are associated with a point between the source and the destination address space. Measurements of the path performance from each source to the appropriate proxy point are compared to determine an optimum route.

16 Claims, 43 Drawing Sheets

U.S. PATENT DOCUMENTS

| | | | |
|---|---|---|---|
| 6,064,677 A | 5/2000 | Kappler et al. | |
| 6,078,957 A | 6/2000 | Adelman et al. | |
| 6,084,858 A | 7/2000 | Matthews et al. | |
| 6,097,699 A | 8/2000 | Chen et al. | |
| 6,130,890 A | 10/2000 | Leinwand et al. | |
| 6,154,778 A | 11/2000 | Koistinen et al. | |
| 6,181,679 B1 | 1/2001 | Ashton et al. | |
| 6,185,635 B1 | 2/2001 | O'Loughlin et al. | |
| 6,213,791 B1 | 4/2001 | Kodama | |
| 6,226,751 B1 | 5/2001 | Arrow et al. | |
| 6,236,642 B1 | 5/2001 | Shaffer et al. | |
| 6,244,880 B1 | 6/2001 | Fukase et al. | |
| 6,249,801 B1 | 6/2001 | Zisapel et al. | |
| 6,252,848 B1 | 6/2001 | Skirmont | |
| 6,256,314 B1 | 7/2001 | Rodrig et al. | |
| 6,262,976 B1 | 7/2001 | McNamara | |
| 6,275,470 B1 | 8/2001 | Ricciulli | |
| 6,292,464 B1 | 9/2001 | Elahmadi et al. | |
| 6,363,053 B1 | 3/2002 | Schuster et al. | |
| 6,363,056 B1 | 3/2002 | Beigi et al. | |
| 6,374,300 B2 | 4/2002 | Masters | |
| 6,393,486 B1 | 5/2002 | Pelavin et al. | |
| 6,400,681 B1 | 6/2002 | Bertin et al. | |
| 6,404,769 B1 | 6/2002 | Kapoor | |
| 6,405,219 B2 | 6/2002 | Saether et al. | |
| 6,466,984 B1 | 10/2002 | Naveh et al. | |
| 6,473,405 B2 * | 10/2002 | Ricciulli | 370/238 |
| 6,496,477 B1 | 12/2002 | Perkins et al. | |
| 6,549,781 B1 | 4/2003 | O'Byrne et al. | |
| 6,574,195 B2 | 6/2003 | Roberts | |
| 6,625,150 B1 | 9/2003 | Yu | |
| 6,658,457 B2 | 12/2003 | Nishikawa et al. | |
| 6,665,702 B1 | 12/2003 | Zisapel et al. | |
| 6,678,248 B1 | 1/2004 | Haddock et al. | |
| 6,690,649 B1 | 2/2004 | Shimada | |
| 6,724,722 B1 | 4/2004 | Wang et al. | |
| 6,724,733 B1 | 4/2004 | Schuba et al. | |
| 6,728,265 B1 | 4/2004 | Yavatkar et al. | |
| 6,738,349 B1 | 5/2004 | Cen | |
| 6,785,237 B1 | 8/2004 | Sufleta | |
| 6,801,502 B1 | 10/2004 | Rexford et al. | |
| 6,831,890 B1 | 12/2004 | Goldsack et al. | |
| 6,831,893 B1 | 12/2004 | Ben Nun et al. | |
| 6,842,783 B1 | 1/2005 | Boivie et al. | |
| 6,857,025 B1 | 2/2005 | Maruyama et al. | |
| 6,904,020 B1 | 6/2005 | Love et al. | |
| 6,947,379 B1 | 9/2005 | Gleichauf et al. | |
| 6,954,431 B2 | 10/2005 | Roberts | |
| 7,065,482 B2 | 6/2006 | Shorey et al. | |
| 7,164,657 B2 | 1/2007 | Phaal | |
| 7,222,190 B2 | 5/2007 | Klinker et al. | |
| 7,269,157 B2 | 9/2007 | Klinker et al. | |
| 2001/0021176 A1 | 9/2001 | Mimura et al. | |
| 2001/0037387 A1 | 11/2001 | Gilde et al. | |
| 2002/0010765 A1 | 1/2002 | Border | |
| 2002/0010792 A1 | 1/2002 | Border et al. | |
| 2002/0040400 A1 | 4/2002 | Masters | |
| 2002/0057699 A1 | 5/2002 | Roberts | |
| 2002/0075813 A1 | 6/2002 | Baldonado et al. | |
| 2002/0078223 A1 | 6/2002 | Baldonado et al. | |
| 2002/0103846 A1 | 8/2002 | Zisapel et al. | |
| 2002/0105909 A1 | 8/2002 | Flanagan et al. | |
| 2002/0105911 A1 | 8/2002 | Pruthi et al. | |
| 2002/0110084 A1 | 8/2002 | Butt et al. | |
| 2002/0141378 A1 | 10/2002 | Bays et al. | |
| 2002/0145981 A1 | 10/2002 | Klinker et al. | |
| 2002/0163884 A1 | 11/2002 | Peles et al. | |
| 2002/0184393 A1 | 12/2002 | Leddy et al. | |
| 2002/0186661 A1 | 12/2002 | Santiago et al. | |
| 2003/0002443 A1 | 1/2003 | Basso et al. | |
| 2003/0012145 A1 | 1/2003 | Bragg | |
| 2003/0016627 A1 | 1/2003 | MeLampy et al. | |
| 2003/0074449 A1 | 4/2003 | Smith et al. | |
| 2003/0076840 A1 | 4/2003 | Rajagopal et al. | |
| 2003/0079005 A1 | 4/2003 | Myers et al. | |
| 2003/0086422 A1 | 5/2003 | Klinker | |
| 2003/0088529 A1 | 5/2003 | Klinker | |
| 2003/0088671 A1 | 5/2003 | Klinker et al. | |
| 2003/0118029 A1 | 6/2003 | Maher et al. | |
| 2003/0133443 A1 | 7/2003 | Klinker | |
| 2003/0142627 A1 * | 7/2003 | Chiu et al. | 370/238 |
| 2003/0214913 A1 | 11/2003 | Kan et al. | |
| 2004/0044761 A1 * | 3/2004 | Phillipi et al. | 709/223 |
| 2004/0196787 A1 | 10/2004 | Wang et al. | |
| 2004/0258226 A1 | 12/2004 | Host | |
| 2007/0140128 A1 | 6/2007 | Klinker et al. | |

FOREIGN PATENT DOCUMENTS

| | | |
|---|---|---|
| EP | 1570604 | 9/2005 |
| JP | 2000/235824 | 8/2000 |
| WO | WO-98/46937 | 10/1998 |
| WO | WO-01/33805 | 5/2001 |
| WO | WO-03/040874 | 5/2003 |
| WO | WO-03/040947 | 5/2003 |
| WO | WO-03/041342 | 5/2003 |
| WO | WO-2004/056047 | 7/2004 |

OTHER PUBLICATIONS

International Search Report mailed Jun. 7, 2004 for international patent application PCT/US03/39642.

Labovitz, et al., "Delayed Internet Routing Convergence", *IEEE*, vol. 9, No. 3, Jun. 2001, 293-306.

* cited by examiner

TOPOLOGY AWARE ROUTE CONTROL

CROSS-REFERENCES TO RELATED REFERENCES

This application claims priority to U.S. Provisional Application No. 60/433,285 entitled "Topology-Based Route Control Over Data Networks Using Convergence Point Analysis" filed Dec. 13, 2002, which is incorporated herein by reference.

This application also incorporates each of the following by reference for all purposes:

U.S. Non-Provisional Application entitled, "Data Network Controller," having U.S. patent application Ser. No. 10/286, 576 and filed Nov. 1, 2002, published as U.S. Patent Publication Number U.S. 2003/0088529 A1;

U.S. Non-Provisional Application entitled, "System and Method to Assure Network Service Levels with Intelligent Routing," having U.S. application Ser. No. 09/833,219 and filed Apr. 10, 2001, now issued as U.S. Pat. No. 7,269,157;

U.S. Non-Provisional Patent Application entitled, "System and Method to Provide Routing Control of Information Over Data Networks," having U.S. patent application Ser. No. 10/013,809 and filed Dec. 7, 2001, now issued as U.S. Pat. No. 7,222,190;

U.S. Non-Provisional Patent Application entitled, "System and Method to Provide Routing Control of Information over Networks," having U.S. patent application Ser. No. 10/040, 902 and filed Dec. 28, 2001, now issues as U.S. Pat. No. 7,133,365; and U.S. Provisional Patent Application entitled, "System and Method to Assure Network Service Levels and Bandwidth Management with Intelligent Routing," having U.S. Provisional Patent Application No. 60/350,186 and filed Nov. 2, 2001.

BACKGROUND

The present invention relates generally to the control of data over network communications systems, and more specifically to topology-based route control of data over communications networks.

Networks are communications systems that connect nodes or points for the purpose of sharing resources. A node typically represents a computer or collection of computers or other computing devices. Interchangeably referred to herein as a "point," a node is typically an endpoint for a particular segment along a network "path" or "route." A route describes a path between two nodes which may or may not encompass intermediate nodes, connections, sub-routes and the like between a data source, such as a web-based database, and a destination, such as a customer, partner, or branch website.

Networks typically represent a topology of devices and connections such as computers, servers, peripheral equipment, and other computing devices, connected by cables, wires, or other communication media for use in transmitting data and information in the form of electronic signals, for example. Networks may be classified in a number of ways, including nodal and topology. Nodes can be classified as servers, computers, or other types of computing devices and typically include routers, hubs, and switches. Networks can also be classified according to the topology of the network.

Under topology-based classifications, networks are classified by the configuration of the network equipment and components. Star, bus, ring, and hybrid configurations are representative network configurations well known in the art.

Another topology-based classification relates a particular type of network to a number of aggregated devices associated therewith.

For example, over a short-distance, such as within a building or small cluster of buildings, a Local Area Network or LAN can be used. Where computing resources are spread over a larger area, such as a city or town, a Metropolitan Area Network or MAN may be used. Computers, servers, routers, switches, and hubs are representative of some types of equipment that are networked for the purpose of sharing with other users, regardless of the type of network. However, networks over large geographic areas are generally classified as Wide Area Networks or WANs. WANs can also connect LANs or other WANs thus forming larger networks encompassing more users and branch offices.

One particular data network is the Internet, which is increasingly being used as a method of transport for communication of resources between companies and consumers. Information technology or "IT" is used by many types of organizations and businesses to manage data transport over data networks. Sharing of information, data, and other resources is a mission-critical activity in many organizations. Software programs (i.e., "applications") that share data or information over networks permit increased efficiencies, dramatic lowering of associated costs, and improvement in overall performance. However, performance bottlenecks have emerged over time, limiting the usefulness and efficiency of the Internet infrastructure for business-critical applications. These bottlenecks occur typically at distinct places along the many network routes to a destination from a source, for example. Each distinct bottleneck requires a unique solution and they may occur at various places along a network route.

Conventional route control techniques and technologies utilize and make control decisions on data routes as advertised from a current or in-use routing table. These routes are often large allocations of address space meant to keep an inter-provider routing table small. Aggregation of routes is a criterion when routing tables are communicated among large Internet service providers (ISPs), as is common when using data routing protocols such as Border Gateway Protocol (BGP).

With the introduction of classless inter-domain routing (CIDR), a routing table is established using a variety of network sizes. For example, a network may have numerous IP addresses, such as a corporate LAN. The network (or a group of such networks) is listed in a routing table as a network prefix. A prefix can be, for example, a 32 bit IP address that has an associated netmask indicating how many of the leading bits are significant.

BGP4 is a version of a protocol deployed to handle variable length prefixes introduced with CIDR. With BGP4, a prefix is no longer required to be defined by a byte boundary (Class A, B, or C space), but can be one of 32 different sizes depending on the length of the network mask. The common notation for a prefix is "address/netmask", e.g. 12.0.0.0/8. The 12.0.0.0 is the address and the "/8" indicates that only the first 8 bits of that address are significant such that, in this case, the "12" is a prefix defining the associate address space. The fewer the bits in the netmask, the more IP addresses in the prefix. For example, a /16 prefix has 256 times the address space of a /24 prefix given the 8 bit difference in the netmask.

Traditional route control products utilize and make control decisions on routes as advertised in a BGP routing table. These routes are often described as large allocations of address space intended to reduce the size of an inter-provider routing table. These route control products, however, do not consider the vast geographic distances that may exist between adjacent networks of a large address block. This is relevant to a multi-homed enterprise which may have geographically disparate branch offices or network server locations in, for example, California, Maryland, Florida, and Texas. Conventional route control products do not efficiently route data to multi-homed enterprises, often degrading performance by selecting the shortest path to a destination address.

Further, conventional routing control products force users to make a route control decision that improve some portions of the address space at the expense of possibly degrading other portions of the address space related to a second geographic region. Potentially, conventional products may not be aware of an address distribution and users consequently confront control decisions that can introduce larger problems than those resolved by limited route control decisions.

As will be described below in connection with FIG. 1D, address allocations in a single aggregated route can fall into widely different locations. In this figure, one of the address allocations occurs in San Jose (12.0.128.0/1) and another in New York (12.0.0.0/1). It is uncommon that a single route decision for the /16 can effectively optimize every address in the block. Users may face performance degradations at some destinations in order to optimize performance at other destinations because conventional routing control products do not adjust for multi-homed network configurations. Alternatively, users may fail to recognize this geographic diversity, not realizing a large-scale route (e.g., a /16 route) may be geographically widespread and thus direct data routing in an inefficient manner. Upon fixing small problems for a particular destination will introduce greater problems for a larger set of destinations. If the cascading problems are not recognized, the product may then introduce performance route flapping for a large address block. In conventional route control techniques, control decisions on routes in a routing table move large volumes of traffic between two NSPs. The delivery of high volumes of advertisements can significantly disrupt multi-homed enterprise networks.

In the field of data communications, the line of signal transmission from a source to a destination traverses a "first mile," a "middle mile," and a "last mile," the latter of which can be located at either end of a data path, typically connecting the switch or central office of a telecommunications service provider such as Pacific Bell to a customer's PBX. In one particular segment, the "last mile," a bottleneck has received attention over the past few years. The "last mile" is the connection between end-users and a communications network, such as a connection from a central office to a home subscriber or user. Systems such as xDSL and cable access using coaxial cable have emerged to dramatically improve last mile performance. As described herein, the "first mile" bottleneck is part of the network where content is hosted on Web servers. First mile access has improved, for example, through the use of more powerful Web servers, higher speed communications channels between servers and storage, and load balancing techniques.

The "middle mile," however, is the last bottleneck to be addressed in the area of Internet routing and the most problematic under conventional approaches for resolving such bottlenecks. The "middle mile," or core of the Internet, is composed of widespread telecommunications networks known as "backbones." "Peering points" are nodes where the backbone networks are joined together. Peering points have been under-built structurally and tend to be areas of congestion for data traffic. Conventional data pathing problems over backbone networks and peering points include routing delays and latencies, transmission obstacles or obstructions, authentication and security filtering, filtered addresses, and other forms of data congestion. Generally no incentives exist for backbone network providers to cooperate to alleviate such congestion. Given that over about 95% of all Internet traffic passes through multiple networks operated by network service providers, just increasing core bandwidth and introducing optical peering, for example, will not provide adequate solutions to finding an efficient data route or path between a data source and a destination.

Peering is when two Network Service Providers ("NSPs"), or alternatively two Internet Service Providers ("ISPs"), connect in a settlement-free manner and exchange routes between their subsystems. For example, if NSPI peers with NSP2 then NSPI will advertise only routes reachable within NSPI to NSP2 and vice versa. This differs from transit connections where full Internet routing tables are exchanged. An additional difference is that transit connections are generally paid connections, peering points are generally settlement-free. That is, each side pays for the circuit, or route, costs to the peering point, but not beyond. Although a hybrid of peering and transit circuits (i.e., paid-peering) exist, only a subset of full routing tables are sent and traffic sent into a paid-peering point generally does not affect a route change, thus increasing the volume of data transmitted and hindering route control.

Routes received through peering points are defined as a single AS away from a BGP routing perspective. That makes these routes highly preferable by BGP (and by the provider because the connections are cost-free). However, when there are capacity problems at a peering point and performance through it suffers, traffic associated with BGP still passes through the problematic peering point and thus, the end-to-end performance and routing of all data traffic will suffer.

Structurally, the Internet and its peering points include a series of interconnected network service providers. These network service providers typically maintain a guaranteed performance or service level within their autonomous system (AS). Guaranteed performance is typically specified in a service level agreement ("SLA") between a network service provider and a user. The service level agreement obligates the provider to maintain a minimum level of network performance over its network. The provider, however, makes no such guarantee with other network service providers outside their system. That is, there are no such agreements offered across peering points that link network service providers. Therefore, neither party is obligated to maintain access or a minimum level of service across its peering points with other network service providers.

Invariably, data traffic becomes congested at these peering points and inefficient data paths result. And since, the Internet path from end-to-end is generally unmanaged, uncontrolled, and typically inefficient, the Internet can occasionally be a non-optimal data transport mechanism for mission-critical applications. Moreover, other factors exacerbate congestion such as line cuts, planned outages (e.g., for scheduled maintenance and upgrade operations), equipment failures, power outages, route flapping and numerous other phenomena in addition to those problematic effects mentioned above.

In some common approaches, it is possible to determine the service levels being offered by a particular network service provider. This technology characterizes candidate paths in which to route data over and includes at least two types. Active probes are the first type, which are near real-time active calibration of the data path, using tools such as ICMP, traceroute, Sting, and vendors or service providers such as CQOS, Inc., and Keynote, Inc. Another traditional approach is real time passive analysis of the traffic being sent and received, utilizing such tools as TCPdump, and vendors such as Network Associates, Inc., Narus, Inc., Brix, Inc., and P-cube, Inc. A significant drawback of these conventional methods of passive analysis of data traffic flow, however, is that these systems are not "topologically" aware of the various networks, peering points, nodes, and network conditions that can affect data route control. Consequently, conventional systems cannot readily adjust to changing environmental network conditions to select an optimized data path between particular nodes, without employing large amounts of probing. In other words, candidate paths cannot be assessed in near real-time to determine availability of alternative routes based upon a change in the network topology.

Traditional route control techniques rely on probes or other additional traffic to be transmitted over the network to provide candidate path information to form the basis of an intelligent route update. Active probing relies upon the use of numerous probes being sent to individual destination IP addresses. This results in increased amounts of traffic that contribute to network degradations by lowering data routing efficiency. This additional data traffic over large scale deployments, can clog nearby network circuits, is difficult to configure and maintain, and causes potential security notifications near a remote probe destination. These notifications result in administrative overhead due to interactions with the remote security departments. Common probing methods include but are not limited to ICMP Echo Request (ping), Traceroute, TCP probes, UDP probes, and embedded content probes initiating measured HTTP GET Requests for that content. By using probes to determine network degradations, additional data traffic further retards the efficiency of particular data routes, slowing mission-critical data applications and resulting in excessive costs.

Traditional route control techniques generally routes data based on prefix lengths that exist in an Internet routing table such as a prefix length of /24. These advertisements are not topologically aware, that is they do not know, in a geographic sense, where the destinations are located. The length of the prefix describes the level of specificity of a particular address for a "node" or point along the network. Advertisements or announcements are generated by conventional data flow and route control systems to "advertise" or "announce" a particular data path, from routing information received in response to probes. If the prefix length is short (/19 or shorter), this can result in a single advertisement affecting data traffic to multiple geographically diverse destinations. In other words, an advertisement or announcement for a shorter prefix length will direct data traffic to an increased number of multiple nodes or points, as opposed to the use of a longer prefix length that directs data traffic to specific points. With the increased number of multiple nodes over which data is sent, the more susceptible a shorter prefix is to geographically-related problems. However, using arbitrarily long prefix lengths such as /24 can result in many specific advertisements to numerous specific destinations to solve a single problem.

In particular, inefficient data routing and control can lead to significant expenses as high rates and volume of data are often metered on a per unit basis. In other words, a company using an internet or network service provider that enables access for data traffic over telecommunications networks may assess charges based upon data throughput, data volume, or time-connection charges. Greater data traffic and usage will result in higher costs charged to the organization providing the data. In an organization where tremendous amounts of data traffic need to be routed to destination sources, costs may become too expensive to efficiently use active probes without significantly increasing data volume. Further, if time and network condition-sensitive applications are used among distributed and/or multi-homed enterprises, then inefficient route control will result in significant costs and lowered financial performance within an organization. Another significant disadvantage associated within conventional data route control techniques is cost.

Another common problem with active probes is the impact they can have on the remote destination, especially with respect to security policy. Given the volume of active probes that often must be sent to collect sufficient performance information, these active probes can often be mistaken for denial of service attacks. Often times the port numbers used by the active probes can be mistaken for a port scan. These common Internet "attacks" are often detected automatically by security devices such as firewalls and intrusion detection systems. Often these devices are not sophisticated enough to distinguish a harmless network probe from a legitimate attack. As such, route control can often trigger false security alarms at the destination being optimized. This results in administrative overhead in handling security alerts incurred as a result of the probing.

Yet another drawback to conventional route control technique is that existing networks must be configured to allow the probes to override default routing behavior. A network engineer is forced to configure all existing network infrastructure to support probe based route control. Such configurations require increased manpower to accomplish. In addition, as the underlying network changes, the configuration of the route control probes may need to change along with it, thus creating maintenance overhead costs.

Still another drawback to common approaches to route control include the unrestricted use of active probes. These probes represent excessive additional traffic and increased overhead costs in sending data over a network. This overhead can be significant if the number of destinations being probed is large. For example, common probe techniques for 10,000 destinations can fill an entire T1 circuit. This overhead is wasted bandwidth that is not communicating relevant application information.

Therefore, what is needed is the ability to optimize network and route control performance without compromising performance by directing data to meet address allocations requirements. In other words, what is needed is a system and method of topology-based route control that can determine candidate paths for data traffic with minimal increases in data traffic volume, minimal effects on network security, and minimal maintenance and overhead costs. Moreover, what is needed is a system and method that can adapt data paths or paths in response to changes in a network topology.

SUMMARY

The present invention meets the needs described above by providing topology aware route control. In particular, the present invention uses proxy points for measuring different routes so that measurements are more accurate and can be meaningfully compared. Traditional route control techniques are based upon end-to-end measurements or measurements that are essentially end-to-end, i.e. within one or two hops of the end. A drawback of using end-to-end measurements is that the measurements can be misleading. For example, comparing end-to-end measurements of two paths that share a significant non-diverse section does not provide a valid comparison because the portion of the measurements related to the non-diverse section distorts the comparison.

In contrast the present invention uses proxy points to eliminate or minimize the inclusion of a non-diverse section. The terms proxy point, probe point and convergence point are used interchangeably herein. A proxy point is a point that is used instead of an end point to measure a path. In one aspect of the invention, the proxy point is a convergence point. In other aspects of the invention the proxy point is identified using other intermediate hops on the data path, common addresses inside a destination address block, such as the broadcast address, well-known common network infrastructure elements, such as DNS servers or gateway routers, or techniques such as triangulation of third-party measurements. A proxy point can be any intermediate point between the source and the end point and includes a point that is N−1 hops from the end point.

Convergence point analysis represents a simple and effective method of identifying proxy points. Convergence point analysis can run using only local information and can identify proxy points that are more specific than other methods. In addition, convergence point analysis is effective in identifying path diversity. With convergence point analysis, the eventual measurements to the identified proxy point are the most accurate while still obtaining all of the benefits that measurement proxies entail (security, aggregation, accuracy, relevance, diversity). However, the invention is not limited by the method used to identify the proxy points, as all methods deliver some, if not all, of the benefits mentioned above.

In one aspect of the invention that uses convergence points, multiple paths are identified to the desired destination address space. Each path begins at a source and terminates at the destination address space. The source can be associated with a router, an entity or a location. The paths can be identified using active path trace probes in connection with a passive flow analyzer. Convergence points are identified either as the paths are identified or once each path is identified. A convergence point is a point or a node where two or more paths converge. Beyond the convergence point the paths are non-diverse.

Once a convergence point is identified the path performance from each source to the convergence point is measured and compared. Because the measurements are to the convergence point rather than to the destination address space, the measurements reflect the performance of the diverse portions of the different paths. Based on the measurements, an optimum route or path is identified. The measurements of the path performances can be performed periodically so that the routing can be dynamically changed as network conditions change.

To further optimize routing, the address spaces associated with the convergence point can be aggregated. The identification of the paths provide information regarding the topology of the network. This information can be used to aggregate address space. Specific addresses associated with a single convergence point are compared to determine which addresses can be aggregated. In some aspects of the invention, it is possible to aggregate specific addresses associated with different convergence points so long as the paths to the specific addresses share a common next hop.

In another aspect of the invention that uses proxy points that are identified using DNS servers, third-party measurements or any other identification methods, multiple paths are identified to the desired destination address space. Each path begins at a source and terminates at the destination address space. Proxy points are identified either as the paths are identified or once each path is identified. A proxy point is a point between the source and the destination address space. Different proxy points can be associated with different paths. Preferably the proxy point is located within the middle mile of the path.

Once the proxy points are identified the path performances from each source to the appropriate proxy point are measured and compared. Based on the measurements, an optimum route or path is identified. The measurements of the path performances can be performed periodically so that the routing can be dynamically changed as network conditions change. As with the aspect using convergence points, address aggregation is possible.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIG. 19, illustrate network topologies including convergence points and destinations in accordance with an exemplary embodiment of the present invention;

FIG. 20, are a further illustration of FIG. 19, with five destination subnetworks associated with IP address prefixes of 24 bit length in accordance with an exemplary embodiment of the present invention;

FIG. 21, are graphical representations illustrating an exemplary data structure for relating convergence point information to address space in accordance with a specific embodiment of the present invention;

DETAILED DESCRIPTION

Figure 1A:
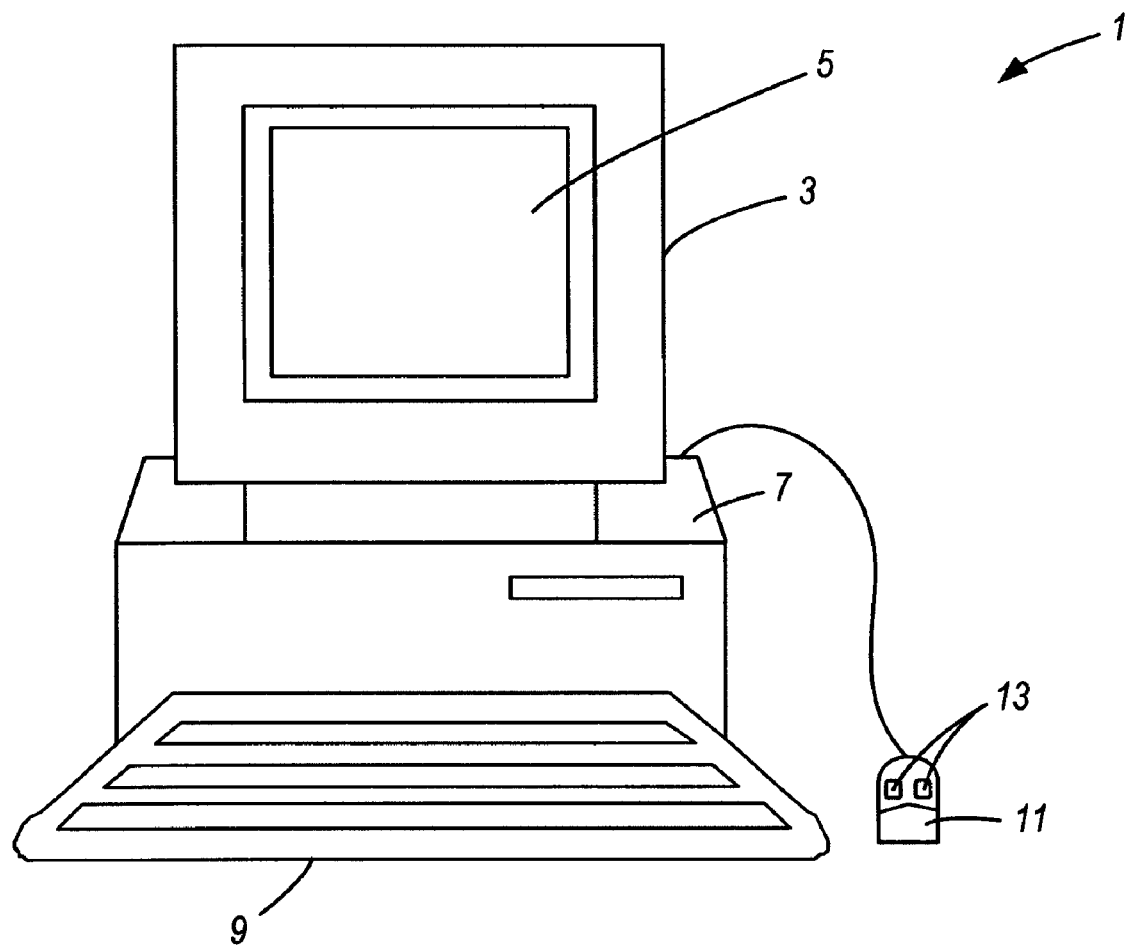
FIG. 1A is an exemplary computer system for presenting to a user a user interface suitable to practice an embodiment of the present invention.

Detailed descriptions of specific embodiments of the present invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

The present invention relates generally to routing of data over networked communication systems, and more specifically to a system and method for topology-based route control over data networks using, for example, convergence point analysis. Some embodiments of the present invention utilize network topology information to pinpoint the precise location of middle-mile performance problems and target route control decisions that affect only an address space, or a subset thereof, experiencing performance problems. Data transmission in a network uses protocols to standardize sharing of resources between communications devices. Border Gateway Protocol (BGP) is such a protocol that is used between autonomous networks, particularly multi-homed networks (i.e., networks that rely upon more than one service provider to access the Internet). In many instances, data routing relies upon the use of protocols such as BGP. Other examples of protocols include Exterior Gateway Protocol, Transmission Control Protocol/Internet Protocol (TCP/IP), RIP v2, EIGRP, and the like can be used to standardize communication among data networks.

Specific embodiments of the present invention analyze nodes along data routes using convergence point analysis. Convergence point analysis, using active probing techniques and passive data analysis, can construct efficient data routes or "paths" between a source and a destination. By probing nodes or points, the present invention can assemble an efficient data route from responsive information received and stored in response to active probes. Embodiments of convergence point analysis and route control techniques employing a specific embodiment of the invention will be described in greater detail below.

In some embodiments of the present invention, segments of a data route (e.g., the intermediate route between two consecutive nodes) between two consecutive nodes form a "hop" and one or more hops can compose a data route. Data routes can also be referred herein as "paths." Nodes where two or more data routes converge are herein referred to as "convergence points." Using some embodiments of the present invention, efficient data routes can be constructed from data generated by analyzing convergence points, as described herein. Convergence points are analyzed for network degradations that may reduce the efficiency of a particular data route. Network degradations such as transmission latencies, missing/damaged/offline network equipment, line breaks, filtered addresses, security firewalls, and the like may render a particular route prohibitively expensive and inefficient to use when routing data.

The present invention increases the efficiency of routing data between a source and a destination point and vice versa over a network by adjusting a data route with near-real time frequency. Topological maps are created by embodiments of the present invention using data stored in a repository (e.g., characteristics of nodes such as IP addresses, latency, RTT, etc.), received in response to active probes generated by a system in accordance with one embodiment of the present invention. By probing convergence points and, if necessary, sub-convergence points, some embodiments of the present invention can establish a topological map by which efficient data routes can be constructed and modified in near real-time.

A data path as described herein can be a route, or path, from a first point (e.g., source) to a second point (e.g., destination), and is divided into path portions or "hops," each of which connects two or more peering points or nodes along a contiguous path between a source and a destination point. Data control techniques generally use address prefix lengths that exist in a routing table, typically identified using length designations such as "/24." The longer the prefix, the more specific the address. A /19 prefix represents an address space that is a larger subset of addresses than that of a /24 prefix. If a problem occurs with an address with a /19 prefix, a larger number of addresses would be affected than a point with a prefix of /24. Thus, a /19 prefix would affect more destinations and/or addresses than a /24 prefix. Such techniques assign arbitrary-length prefixes to route announcements. By creating topological network maps using convergence point analysis some embodiments of the present invention, as described below, permit fewer announcements to be used, but with greater specificity. Thus, data traffic volume is reduced and the efficiency of data routing and control is improved.

Although the term "prefix" is used herein to describe the subdivision of IP addresses into one or more address spaces, it is noteworthy that the present invention is not limited to the use of a prefix. Rather, any suitable "address set" can be substituted for "prefix," "sub-prefix," etc. to describe how an address of interest (i.e., destination) can be categorized. The addresses need not be contiguous in a prefix boundary and can be as small as a single active address (i.e., "/24"). Active probes are sent to obtain candidate path measurements to network points up to, and sometimes including the destination, or to one node removed from any network point that cannot be probed due to disabling measures such as firewalls or filters.

Some of the embodiments of the present invention significantly reduce the number of active probes so as to not inhibit the efficiency of data routing by increasing the amount of traffic between the destination and the source. Some embodiments of the present invention can also provide a system and a method using a data structure that can store information, such as IP addresses, for announcing route changes and updates to a particular data path. The stored data within the data structure then can be modified in response to changes over time that occurs in a network or data route.

Figure 1B:
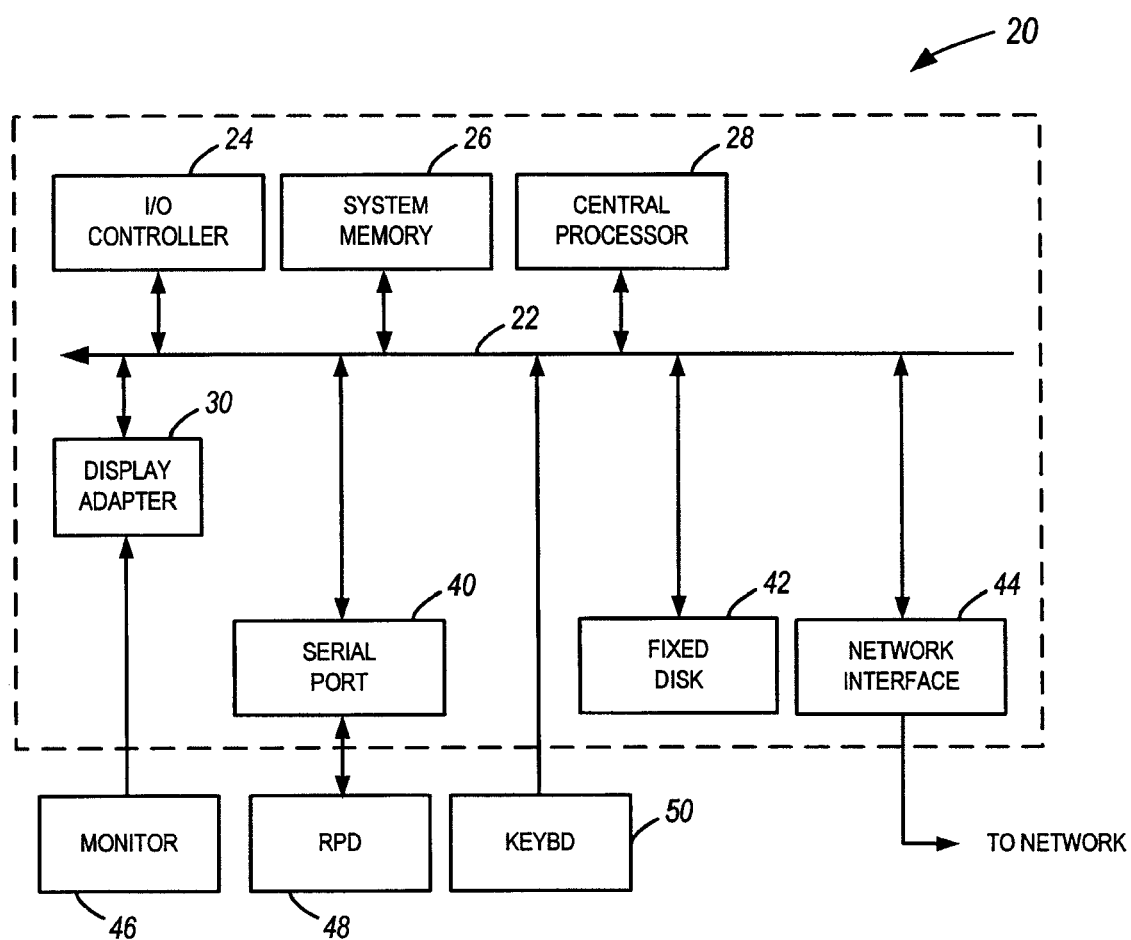
FIG. 1B shows basic subsystems in the computer system of FIG. 1A.
Figure 1C:
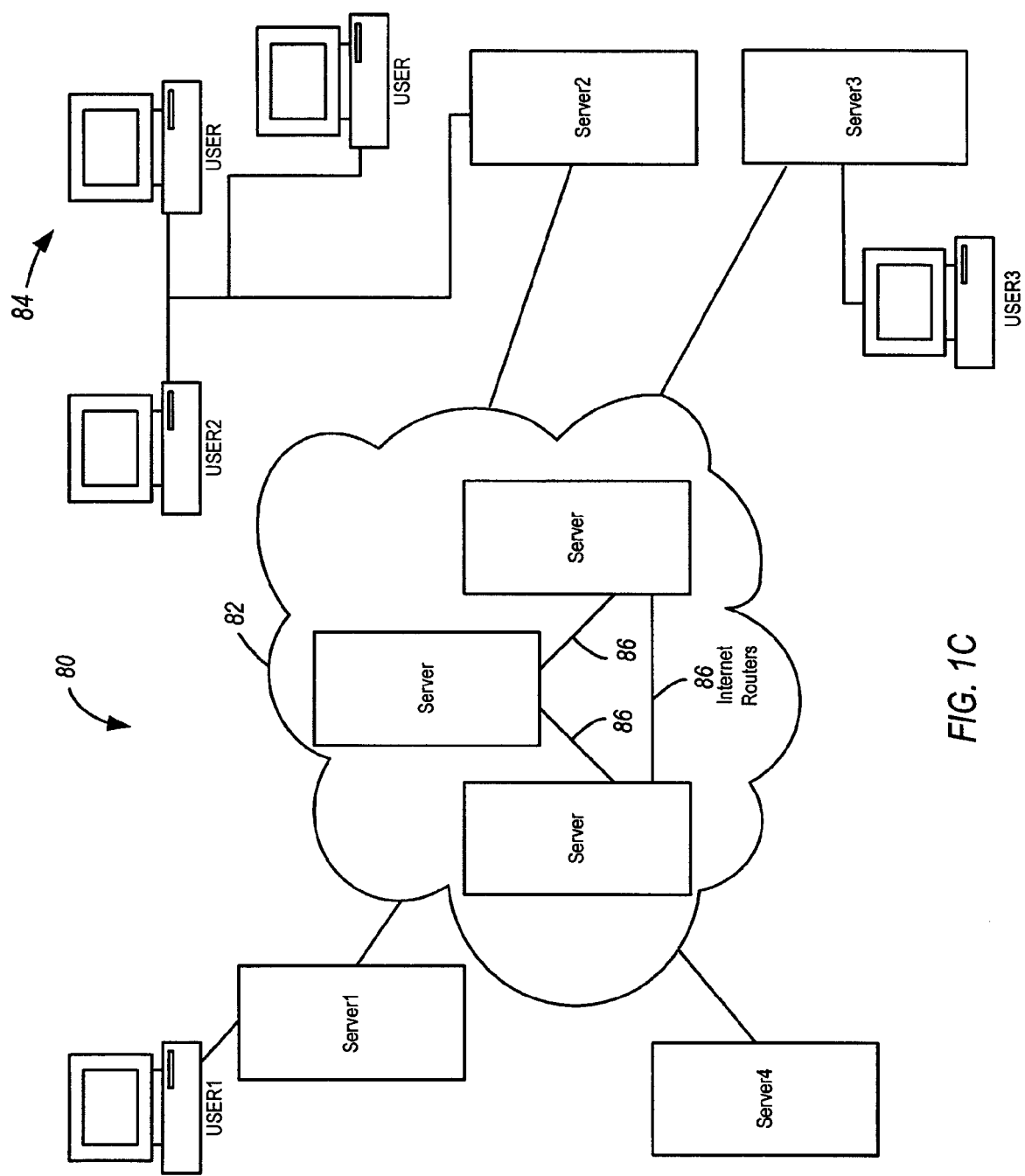
FIG. 1C is a generalized diagram of one exemplary computer network suitable for use with the present invention.

FIGS. 1A, 1B, and 1C illustrate basic hardware components suitable for practicing a specific embodiment of the present invention. FIG. 1A is an illustration of an exemplary computer system 1 including display 3 having display screen 5. Cabinet 7 houses standard computer components such as a disk drive, CD-ROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, voice or visual recognition, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44 (e.g., Network Interface Card, or NIC), which in turn is configured to communicate with a network, such as by electrical, radio, or optical means known in the art. The use of bus 22 allows each of the subsystems to transfer data among subsystems and, most importantly, with the CPU, where the CPU might be a Sparc™, an Intel CPU, a PowerPC™, or the equivalent. External devices can communicate with the CPU or other subsystems via bus 22 by interfacing with a subsystem on the bus. Thus, Monitor 46 connects with Display Adapter 30, a relative pointing device (e.g. a mouse) connects through a port, such as Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system also can be achieved using fewer than all of the sub-systems shown in FIG. 1B. For example, a standalone computer need not be coupled to a network so Network Interface 44 would not be required. Other subsystems such as a CD-ROM drive, graphics accelerator, etc. can be included in the configuration without affecting the performance of the system of the present invention.

FIG. 1C is a generalized diagram of a typical network that might be used to practice an embodiment of the present invention. In FIG. 1C, network system 80 includes several local networks coupled to computer data network 82, such as the Internet, WAN (Wide Area Network), or similar networks. Network systems as described herein refer to one or more local networks and network service providers that make up one or more paths from a source to a destination and vice versa. Network systems, however, should be understood to also denote data networks that include one or more computing devices in communication using any networking technology. Although specific network protocols, physical layers, topologies, and other network properties are presented herein, the present invention is suitable for use with any multi-path network relying upon more than one Internet/network service provider (e.g., a multi-homed network interconnected to other networks), especially those networks that employ Internet Protocol (IP) for routing data, such as flows having one or more packets of information according to the protocol. Furthermore, although a specific implementation is not shown in FIG. 1C, one having ordinary skill in the art should appreciate that a data flow control system according to the present invention can be deployed within one or more data networks 82 or configured to operate with network system 80.

In FIG. 1C, computer USER1 is connected to Server1, wherein the connection can be by any network protocol, such as Ethernet, Asynchronous Transfer Mode, IEEE standard 1553 bus, modem connection, Universal Serial Bus, etc. The communication link need not be a wire but can be infrared, radio wave transmission, etc. As depicted, Server1 is coupled to the data network 82, such as the Internet or, for example, any other data network that uses protocols such as Transmission Control Protocol/Internet Protocol for data communication. The data network is shown symbolically as a collection of server routers 82.

The exemplary use of the Internet or another data network for distribution or communication of information is not strictly necessary to practice the present invention but rather is merely used to illustrate a specific embodiment. Further, the use of server computers and the designation of server and client machines are not crucial to an implementation of the present invention. USER1 Computer can be connected directly to the Internet. Server1's connection to the Internet is typically by a relatively high bandwidth transmission medium such as a T1 line, a T3 line, Metro Area Ethernet, or the like, although it might be connected in a similar fashion as with USER1. Similarly, other computers 84 are shown utilizing a local network (e.g., Local Area Network, or LAN) at a different location from USER1 Computer. The computers at 84 are coupled via Server2 to the Internet. Although computers 84 are shown to include only a single server (e.g., Server2), two or more servers can be connected to the local network associated with computers 84. The USER3 and Server3 configuration represent yet a third network of computing devices.

Figure 1D:
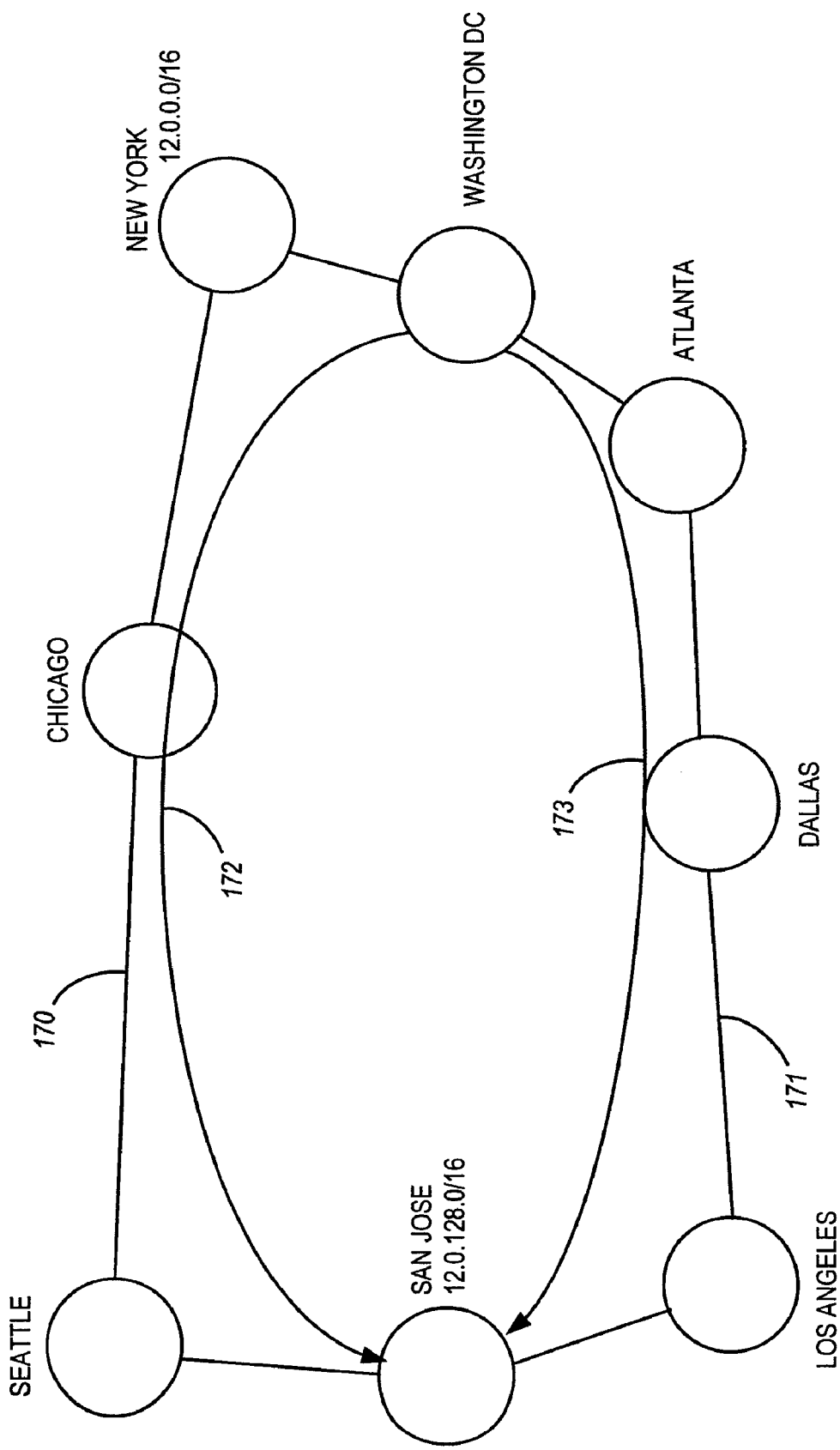
FIG. 1D depicts a typical data network using multi-path.

FIG. 1D, as discussed earlier, shows the effects of typical multi-path (e.g., ECMP) techniques on a route control system using active calibration alone. Two possible paths exist between Washington D.C. and San Jose, Calif. for a given network service provider. The first path 170 traverses New York, Chicago and Seattle. The second path 171 traverses Atlanta, Dallas and Los Angeles. Suppose that the cost of using either of the paths is equal in the routing protocol. Most router vendors, when presented with two equal costs paths, load share the traffic between them making sure that paths in the same flow will follow the same path. The path selection process is typically vendor-specific and generally relies on known source and destination IP addresses as well as other metrics such as vectors, available bandwidth, transmission latencies, and distance.

Distance in a router and/or networking context can refer to metrics other than physical distance, such as bandwidth or time latencies between routers thus characterizing hops. Unless the source IP address and destination IP address are the same, the traffic may take a different equal-cost path. The implications for path calibration are that the active probes sent across the network between Washington D.C. and San Jose may take the northern path through Chicago 172 while the customer's traffic may take the southern path through Dallas 173, because while the destination IP address is the same, the source IP address is different. Thus, the path measured may not be the path that is actually taken by the customer's traffic. The present invention, among other things, intelligently controlled routes containing data traffic using a system and a technique to assure service levels of customer data traffic in accordance with the present invention.

Figure 1E:
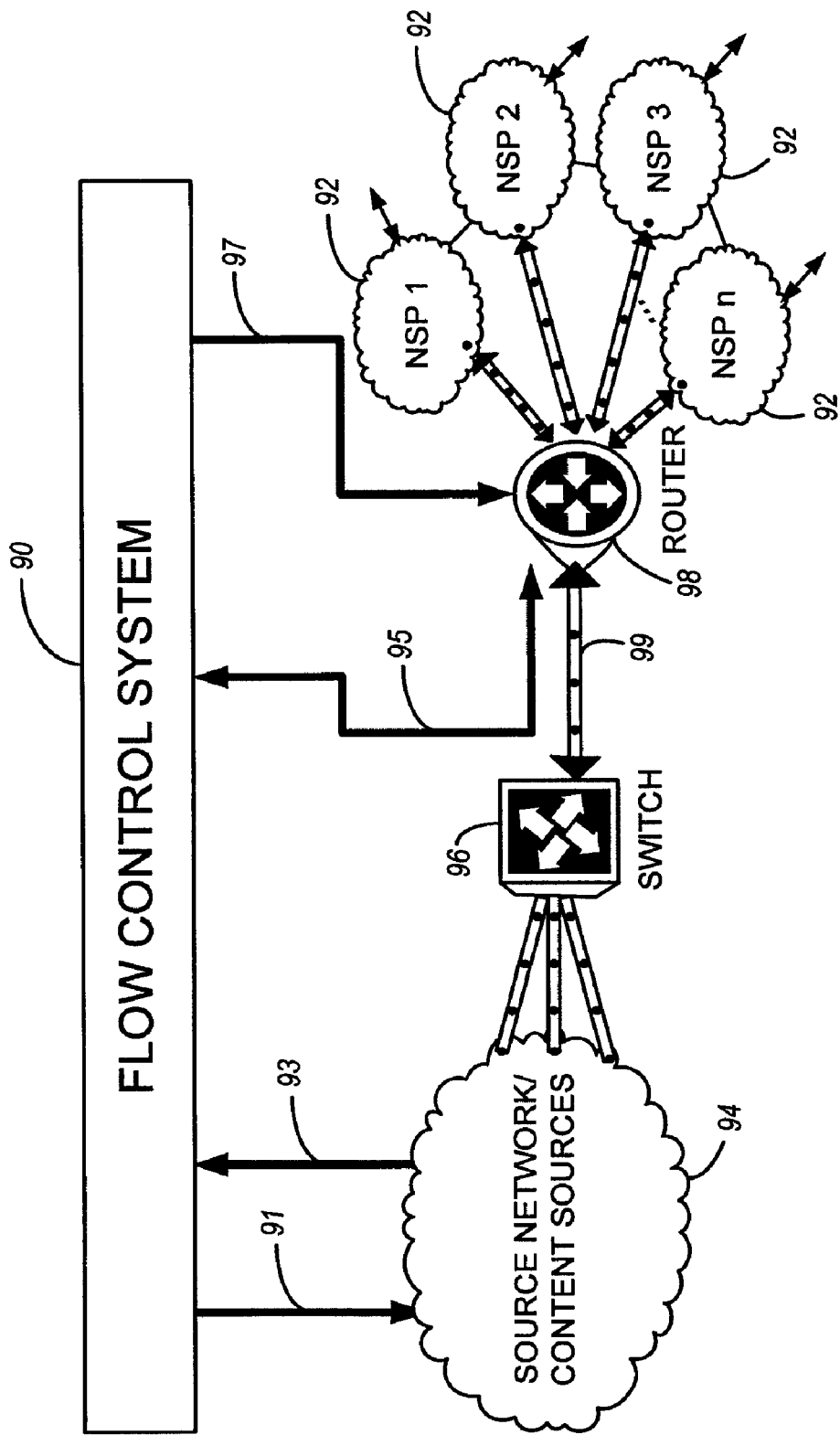
FIG. 1E illustrates a simplified data network and flow control system in accordance with a specific embodiment of the present invention.

FIG. 1E illustrates an exemplary data network within a portion of a network system 80 of FIG. 1C including NSPs 92, and a flow control system in accordance with a specific embodiment of the present invention. Exemplary flow control system 90 is configured to communicate with one or more network elements of the data network. Although flow control system 90 is shown external of and in communication with the elements of source network 94, switch 96, and router 99, flow control system 90 can be wholly embodied in any of the elements shown, or alternatively, can be distributed, in portions, over each of the elements. In another embodiment, flow control system 90 resides on one or more servers or network elements within exemplary source network 94.

An exemplary data network includes one or more source networks 94. A source network 94 typically is a local network including one or more servers owned and operated by application service providers, managed service providers, content delivery networks, web hosting companies, individual enterprises, corporations, entities and the like. Such service providers typically communicate information to users that are further removed from the multi-homed network service providers 92, such as NSP 1, NSP 2, NSP 3, ... and NSPn. In one example, network service providers 92 are coupled to a source network or source node, point, or address so as to be considered a first set of data networks. These NSPs, or first set of data networks, are in turn coupled to a second set of networks, wherein the second set is connected to multiple other networks, thus establishing one or more paths from a source to a destination and vice versa.

The multiple connections between router 98 and multiple network service providers 92 provide an operator of source network 94 with information to direct data traffic according to the best performing network service provider. Switch 96 operates to transfer bidirectional data 99, such as IP data, bi-directionally from source network 94 to router 98. Although a single router and switch is shown, one having ordinary skill in the art will appreciate that either additional routers and switches or other suitable devices can be substituted according to another embodiment of the present invention. Moreover, switch 96 need not be used to practice the subject invention. In a specific embodiment, router 98 includes one or more routers running an exemplary protocol, such as TCP/IP, UDP, or BGP (e.g., BGP4, used between autonomous systems implementing networking equipment manufactured by companies such as CisCO™ or Juniper™ implementations), for example, and preferably has route visibility across multiple network service providers ("NSPs").

In an embodiment of flow control system 90, system 90 operates to measure end-to-end (i.e., source to destination and destination to source) data traffic 95 in terms of flow characteristics, such as performance, cost, bandwidth, and the like. Flow control system 90 also generates statistics associated with data paths across multiple network service providers in real time, or near-real time. Such statistics are communicated to source network 94 for providing network engineering personnel, for example, with report information 91 such that on-the-fly reports are created to provide information related to route-change activity, traffic performance as delivered to selected destinations and transit provider usage (i.e., bandwidth), cost, and the like.

In one embodiment of the present invention, a local computing device uses report information 91 from system 90 to generate visual representations on, for example, a graphical user-friendly interface ("GUI") where the representations are indicative of data traffic along one or more paths (e.g., paths between a source and a destination). Network or systems administration personnel, or any entity responsible with flow control, with access to source network 94 can provide control information 93 (including, for example, flow characteristics) to flow control system 90 to modify system operation by, for example, changing data traffic flow from an under-performing current, or default, path to a better performing path. Intervention by network administration personnel, however, is not necessary for flow control system 90 to operate in accordance with the present invention.

Flow control system 90 further functions to compare specific data traffic flows (i.e., both uni- and bi-directional traffic flows outbound from and inbound into the data network) to determine whether a particular traffic flow meets one or more rules of an associated flow policy. A flow policy, as referred to herein, includes a set of one or more rules that is associated with a particular data traffic flow related to particular system user (e.g., as denoted by IP address prefix).

Minimum criteria can represent the lower levels of a range of values that defines acceptable routing behavior associated with a particular traffic flow characteristic. For example, a rule can set: the maximum acceptable cost, with or without regard to network service provider cost; the maximum load or bandwidth usage associated with traffic flows through specific providers; a range of acceptable (or non-acceptable)

service providers; the maximum acceptable latency or loss over one or more paths across multiple network service providers; acceptable ranges of performance for each network service provider, such as maximum burst limits, minimum performance commitments and range of costs (i.e., cost structures with regards to time of day, type of traffic, etc.); and any other data flow characteristic that can influence the measurement or the control of data traffic.

Flow control system 90 further operates to detect when one or more rules, or flow policies, are violated and then to take remedial action. That is, flow control system 90 enforces policies associated with data traffic flow by correcting detrimental deviations in performance (i.e., service level assurance), costs or bandwidth (i.e., load in terms of percent capacity available per path). Flow control system 90 makes such corrections based on real- or near-real time traffic analysis, local path diversity (i.e., modifying one or more egress paths from a data network), and visibility (as determined, for example, by active probing) into downstream available paths. For example, for a destination related to a specific traffic flow, flow control system 90 directs, or re-directs, traffic to one or more alternative paths to resolve a particular flow's deviation in terms of flow characteristics, from its flow policy.

Figure 2:
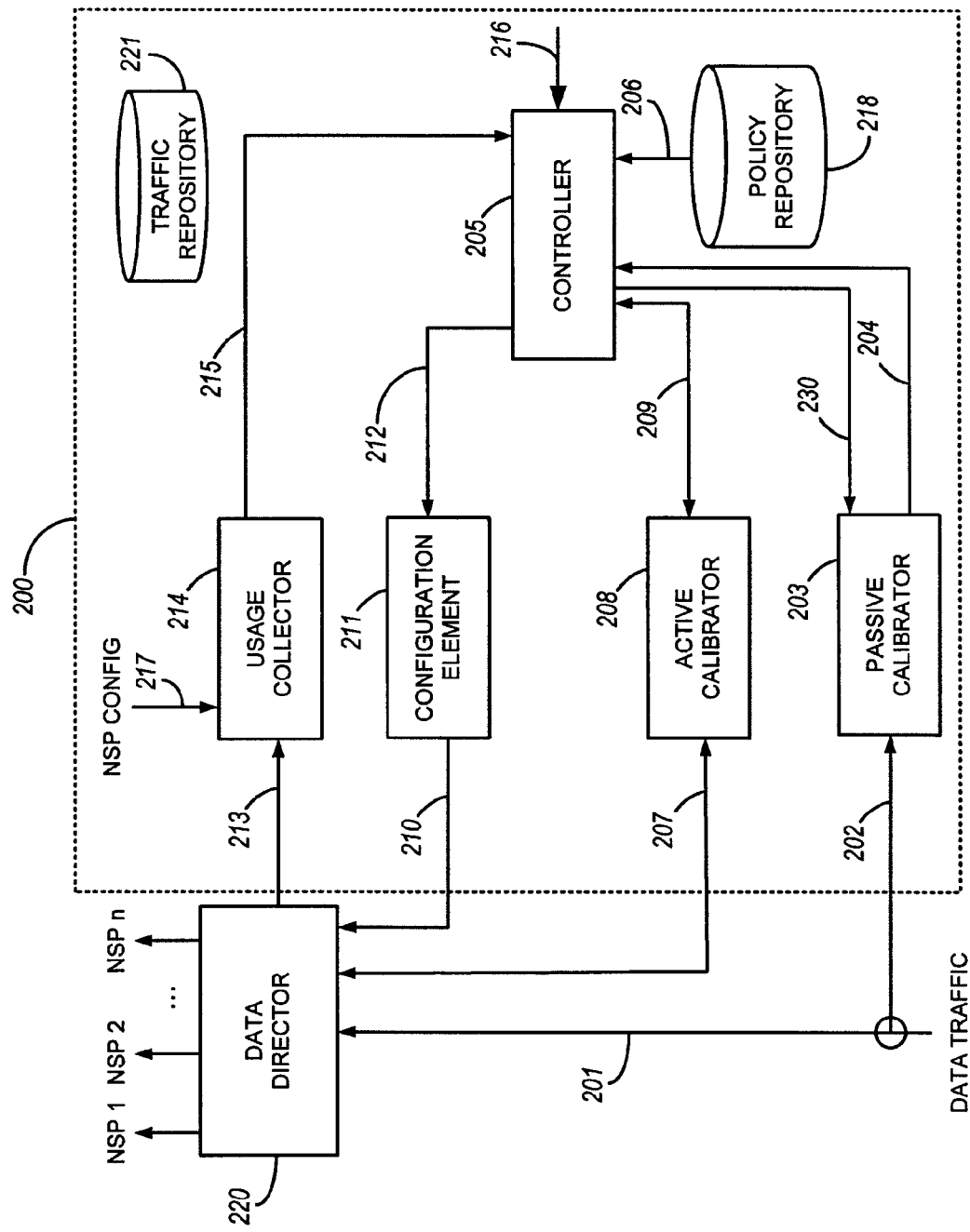
FIG. 2 is a simplified block diagram of one embodiment of a flow control system according to one embodiment the present invention.

FIG. 2 illustrates a specific embodiment of flow control system 90 of FIG. 1D. In another embodiment, flow control system in FIG. 2 is a reactive flow control system. That is, a reactive flow control system is designed to react to policy violations indicating sub-standard routing of data traffic over one or more data networks or service providers (i.e., addresses pass-fail criteria) rather than optimizing performance at some targeted level of acceptable operation. In yet another embodiment, flow control system of FIG. 2, as described below, operates to optimize performance and/or usage by selecting the path having the most desired specific performance characteristic, for example, that at least meet the minimum level of service.

Flow control system 200 can include controller 205, passive calibrator 203, active calibrator 208, configuration element 211, and usage collector 214, each of which can be realized in hardware, software, or a combination thereof. For example, controller 205, passive calibrator 203, active calibrator 208, configuration element 211, and usage collector 214 are software modules designed to perform specific processes, as described herein, in accordance to the present invention. Such modules can reside in one or more computing devices, such as the computing devices shown in FIG. 1A, or alternatively, over one or more user-type machines (i.e., servers) coupled over a data network or network system.

Exemplary passive calibrator 203, active calibrator 208 and usage collector 214 are coupled to controller 205 to, in part, provide flow characteristics of data traffic. Controller 205 receives monitored flow characteristics as well as flow policies to be enforced. User or machine-generated rules pertaining to the flow policies 206 for route control are provided to controller 205. Specific parameters or operating guidelines for the present invention can be entered at controller 205 to ensure flow control system 200 maintains an appropriate level of operation, monitoring, and alarm status. Controller 205 is configured to determine if a flow policy is violated, and upon detection of such a violation, then to select a remedial action to resolve the violation. Configuration element 211 is coupled to controller 205 to receive information to initiate remedial actions and is configured to communicate such actions to data director 220. Thereafter, data director 220 implements the corrective action to resolve the pending violation, for example, by changing the traffic flow from the current path to a better performing path.

Additionally, flow control system 200 can include traffic repository 221 and flow policy repository 218. Exemplary traffic repository 221 and flow policy repository 218 are databases, such as a storage device, configured to store a large number of records in one or more data structures. Traffic repository 221 is designed to store and to communicate information related to traffic flow and route characteristics, and flow policy repository 218 is designed to store and to communicate policy information or rules to govern the performance and cost of each of the data traffic flows. One having ordinary skill in the art of database management should appreciate that many database techniques may be employed to effectuate the repositories of the present invention.

In operation, flow control system 200 of FIG. 2 monitors egress and ingress data flow 201, such as IP data traffic, to determine whether data flow 201 to and from source network is within the performance tolerances set by the associated flow policy. Flow control system 200, in one embodiment, receives data flow 201 by replication, such as by a network switch, by using a splitter, such as an optical splitter, or any other tapping means know to those having ordinary skill in the art. Data flow 202, which is exactly, or near exactly, the same as the information contained within data flow 201, is provided to passive calibrator 203.

Passive calibrator 203 monitors the data traffic of data flow 201 and communicates information 204 related to the traffic and traffic performance to controller 205. Controller 205 is configured to receive policy data 206 representing one or more policies that correspond to a particular traffic flow, such as a particular data flow. Moreover, the particular data flow can be associated with a certain user identified by a destination prefix, for example. By using policy data 206, controller 205 determines the levels of performance, cost, and/or utilization that the particular traffic is to meet. For example, controller 205 determines whether a particular traffic flow of data flow 201 is meeting defined performance levels (i.e., service levels) as defined by one or more requirements or criteria, such as inbound and outbound network latency, packet loss, network jitter, and the like.

Active calibrator 208 functions to send and to receive one or more active probes 207, of varying types, into and from the data networks. These probes are designed to measure network performance including, but not limited to, the path taken across one or more available providers (i.e., to determine if a provider is a transit AS rather than peer AS), next hop-in-use, and other network parameters. To activate active calibrator 208, controller 205 sends an active probe request 209 to active calibrator 208. Such a request is required if controller 205 determines that additional information regarding alternative paths or network system characteristics are necessary to better enforce policies in reactive flow control systems, or alternatively, to prevent such policy violations in optimized flow control systems.

Usage collector 214 is configured to receive NSP data 217 representing one or more network provider configurations. Generally, such configurations include the number of paths ("pipes") associated with each provider and the size thereof. Additionally, NSP data 217 can relate to a provider's cost or billing structure and can also include each provider's associated set or subset of addresses, each provider's billing methods (i.e., byte/min, etc.), etc. Moreover, usage collector 214 is configured to collect usage information 213 from the network elements, such as switches, border routers, provider gear, and other devices used to transport data over data networks. Usage collector 214 is configured to provide controller 205 with provider utilization and billing information 215, which represents aggregated data based upon NSP data 217 and usage information 213. Usage data or utilization data (not limited to those embodiments described herein) can be measured in various ways to include connection or link time, data packet volume, and/or other metrics not included here specifically. Other utilization and billing information 215 includes data that represents cost, billing, utilization, etc., for each network service provider of interest.

One having ordinary skill in the art should appreciate that NSP data 217 can be provided to usage collector 214 in a variety of ways. For example, data describing, defining, controlling, or modifying data paths as used for the data flows described herein can be provided by an entity having authority to do so, such as a network engineer entering the data into a computing device using a GUI in source network 94 of FIG. 1E, which for example, can represent information displayed in FIG. 27.

Moreover, usage collector 214 is configured to monitor usage characteristics defining a network service provider's data traffic capacity, costs, etc. Usage data 213 provided to usage collector 214 includes usage information and characteristics from network elements, such as switches, border routers, routers, provider gear, and other devices used to transport data over data networks. Usage refers to the data (i.e., data such as X Mb samples at time (0)) that represents instantaneous or near instantaneous measurement of characteristics (i.e., usage characteristics, data volume, etc.) that define, for example, the load and available capacity of each network service provider. Utilization is the usage rate over time. For example, suppose the usage collector monitoring NSP1 measures the system's utilization of NSP 1, or capacity over time, as X Mb at time(0) and Y Mb at time(1). This raw data, or usage, is used to calculate utilization, or usage rate for NSP1 (e.g., Y−X/time(1)−time(0)). Bandwidth is the total capacity for each path or hop available for traffic flow. In one embodiment, the usage can be measured in any hop in any path at any number of hops or networks from a first point. Load is typically defined as the amount of capacity a particular path is used to carry data traffic and can be expressed as load/bandwidth.

Usage collector 214 is designed to generate utilization and billing information 215 based upon usage information 1213 and NSP data 217. Since each of the providers has different cost and billing structures, as well as methods of determining usage costs, usage collector 214 operates to aggregate usage information 213 accordingly to provide controller 205 with utilization and billing information 215. Software applications or other means (e.g., by human manipulation) may be used to implement utilization and billing information for financial accounting purposes.

Usage collector 214 then provides the utilization billing information 215 to controller 205 for each network service provider of interest. One having ordinary skill in the art should appreciate that the usage collector can provide additional information based upon the provider usage information, to the controller, as needed to better effectuate route control.

Controller 205 collects information (e.g., aggregated performance and usage characteristics) from each of passive calibrator 203, active calibrator 208, usage collector 214, and optionally traffic repository 221. Based upon the information collected, controller 205 determines a course of action that best alleviates the policy violations in respect to the information represented by policy data 206 that is conveyed to controller 205. Once the course of action is determined, controller 205 initiates and sends a network routing change request 212 to configuration element 211. In a specific embodiment, controller 205 also provides data representing one or more alternate data paths that can be used to resolve a policy violation.

Configuration element 211 is designed to communicate routing changes in the network to data director 220. Once configuration element 211 sends one or more routing changes, data director 220 then moves the subject data flow 201 from a current path to another path (e.g., from NSPI to NSP2 to NSPn or a first path of NSPI to a second path of NSPI). Data director 220 thus operates to distribute traffic to these destinations across multiple network service provider links based on, for example, the cost and performance measured across each link.

In operation, configuration element 211 communicates one or more routing changes 210 with data director 220, for example, by using a routing protocol such as BGP. Configuration element 211 functions to dynamically control routing behavior by modifying the source address, for example, of the traffic passing through configuration element 211. The source address is modified in a way that improves application performance as well as cost requirements.

The following discussion is a more detailed description of each of the elements of an exemplary control system 200. Referring back to active calibrator 208, active calibrator 208 provides active mechanisms within system 200 for determining the nature of downstream or upstream paths. This information is typically not available in any conventional protocol used on data networks such as the Internet, and is collected external to the normal processes of networking. As shown in FIG. 2, active calibrator 208 is coupled to controller 205 to provide at least a destination prefix that is not meeting the policy requirements, such as minimum performance level. Once received, active calibrator 208 then initiates a calibration process that determines some, most, or all of the available network paths to the destination address as well as performance levels. Controller 205 is designed to select the most suitable probes that active calibrator 208 is to use, based on the particular policy requiring enforcement or correction, and thereafter to initiate active probing of network paths using active calibrator 208.

In one embodiment, active calibration probes are communicated to available network or Internet paths via probe path 207. The returning active calibration probes enter via probe path 207 into active calibrator 208. Active calibrator then forwards probe information 209 to controller 205, which contains or has access to performance information including alternate available paths. Controller 205 then determines how best to enforce the specifics of the policy associated with the subject traffic flow. Exemplary active calibrator 208 employs active calibration mechanisms to provide, for example, long term statistics describing flow characteristics.

In another embodiment of the present invention, active calibrator 208 resides in data director 220 within, or alternatively, can be integrated into controller 205. There are several proprietary implementations of commercially available routers suitable to practice the present invention. One example of suitable active probes is the RMON probe. Cisco systems use Service Assurance Agent ("SAA") that is derived from the remote monitoring ("RMON") probes to send out active probes. SAA allows routers to measure and report network-originated application round trip times ("RTT"). Although not every probe mentioned below is available in SAA for network calibration, one skilled in the art would appreciate how each of the following might be implemented to practice one or more embodiments of the present invention.

An exemplary active calibrator 208 can use ICMP (Internet Control Message Protocol) echo request or other ping-type probes, lightweight TCP-based probes, Sting probes, "pathchar" probes, lightweight probes using User Datagram Protocol ("UDP") packets with a predefined TTL (time to live), traceroute probes, or other active probes that are suitable for use by active calibrator 208 in accordance with the present invention. As used herein, "weight," whether heavy or lightweight, is a local measure of whether a particular data route is preferred over another. A weight is given to a data route by a particular router using a route map and is intended for use only by that router. Thus, the lightweight probes referred to herein indicate that they are intended for a specific predetermined router, per a route map created in accordance with an embodiment of the present invention.

These probes are received by active calibrator 208 of FIG. 2 and can be sent out by their source addresses. Such probes can be sourced and received on an exemplary stats computer system resident, for example, in the local premises, or as a stats process on a router. The active calibrator and its use of probes operate in accordance to probes described in a U.S. Patent Application, entitled "System and Method to Assure Network Service Levels with Intelligent Routing," having U.S. patent application Ser. No. 09/833,219 and filed on Apr. 10, 2001, and is incorporated by reference for all purposes.

Exemplary passive calibrator 203 of FIG. 2 is configured to receive, without interfering with, network communication data 201, such as customer network or Internet traffic. Network communication data path 201 (i.e., including one or more IP data traffic flows), as monitored by passive calibrator 203, includes the default or currently routed path of the data traffic that is provided to passive calibration element 203 from data director 220. The currently routed path is, for example, the path (e.g., hop-by-hop) between routers that a packet would take, as determined by standard routing protocols, flow control policy, or other performances parameters. Passive calibrator 203 is coupled (i.e., electrically, optically, by radio waves, etc.) to controller 205 to provide information which indicates whether the specific IP data traffic is within the range of acceptable performance metrics, such as determined by a flow policy. Passive calibrator 203 operates to instantaneously monitor all traffic received via data flow 202 and is designed to overcome the complications of relying solely on active traffic analysis, such as EMCP, as shown with respect to FIG. 1D. When the controller addresses policy violations, for example, passive calibrator 203 operates to overcome the complications of performing only active traffic analysis in the presence of multi-path (e.g., ECMP).

In another embodiment of the present invention, passive calibrator 203 examines the traffic stream in both directions (i.e., ingress and egress) and classifies each of the traffic streams into flows. The data traffic flows can be monitored within passive calibrator 203 according to the underlying protocol state (e.g., such as regarding TCP sessions) over time. As another example, passive calibrator 203 classifies the traffic flow according to round trip latency, percentage of packets lost, jitter or another data flow characteristic for each of the traffic paths. Such traffic flow information is used to characterize the "end-to-end" performance of the paths carrying the traffic flows, which includes flow rates, and is aggregated into a series of network prefixes.

As described above, passive calibrator 203 is coupled to store, fetch and update traffic and route information stored in traffic repository 221 (connection not shown). Exemplary traffic repository 221 is a database configured to store and to maintain data representing traffic and route information, which is useful to the end user employing a flow control system, such as system 200 of FIG. 2, as well as the operators of, for example, a network service provider. The data within traffic repository 221 includes long term statistics describe the flow characteristics of the data traffic. These statistics can be used for reporting, analysis purposes, and providing general feedback to a user of a flow control system according to the present invention.

Such feedback can consist, for example, of types of traffic being sent, source addresses, destination addresses, applications, traffic sent by ToS or DSCP ("DiffServ Code Point") setting (which might be integrated into a differentiated billing system), volume of traffic, and the like. These statistics are fed into traffic repository 221 where, for example, a reporting engine or some other analysis application can access to the statistics. The information stored in traffic repository 221 includes data representing such traffic route characteristics arranged in any suitable data structure as would be appreciated by one skilled in the art.

Figure 3:
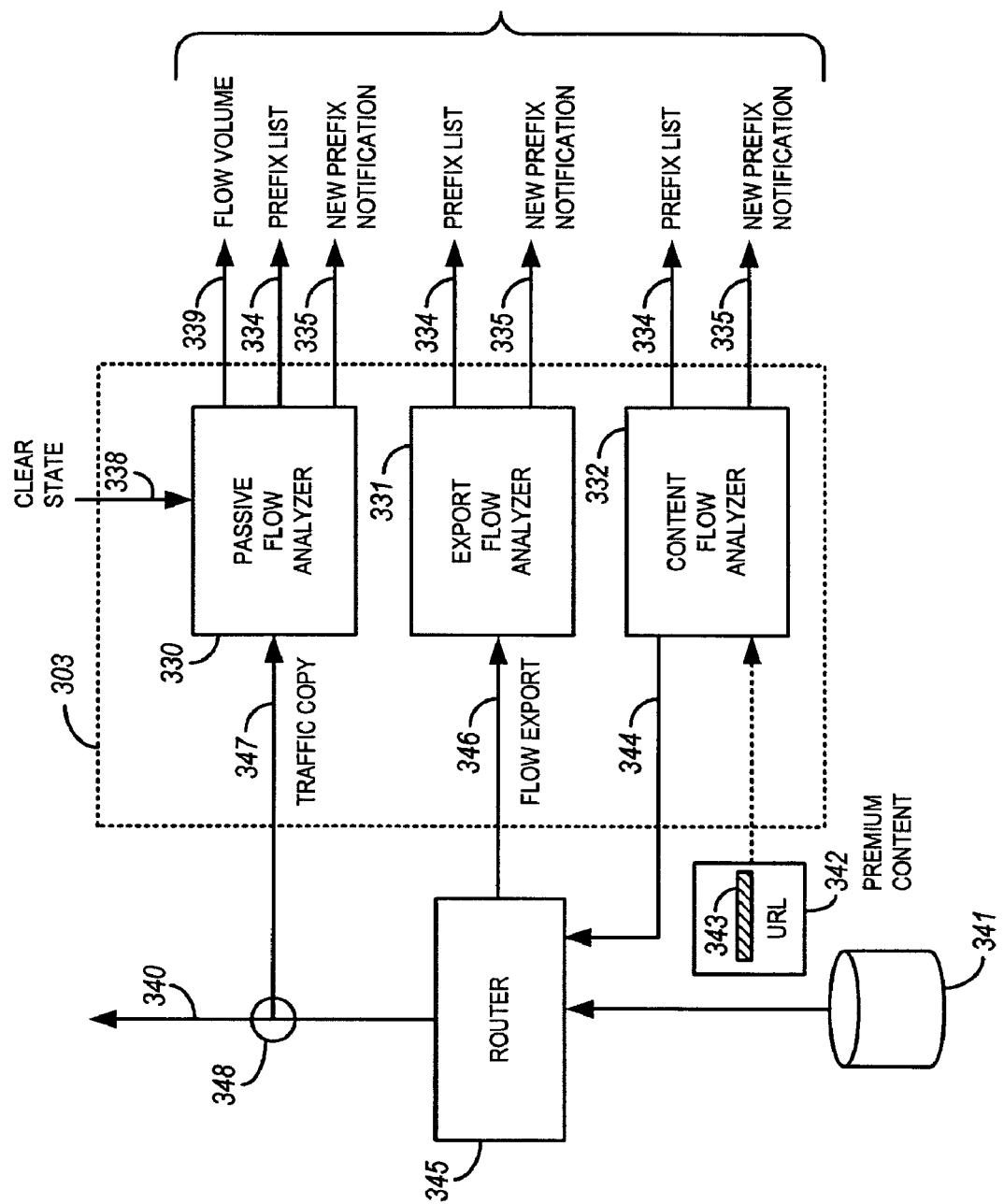
FIG. 3 is a functional block diagram of an exemplary passive calibrator of FIG. 2.

FIG. 3 is a detailed functional block diagram showing exemplary elements of a passive calibrator 303 according to an embodiment of the present invention. Passive calibrator 303 includes, for example, passive flow analyzer 330, export flow analyzer 331, and content analyzer 332.

In one embodiment, passive flow analyzer 330 performs passive analysis on the traffic to monitor current traffic flow characteristics so the controller can determine whether the monitored current traffic flow meets associated policy requirements. Export flow analyzer 331 performs passive analysis on exported flow records from a network device, such as from those devices (e.g., router) that advertise traffic type, source and destination addresses, and other information related to the traffic that it travels across service provider links. An example of such a network device is Cisco's NetFlow™ product. In another embodiment, passive flow analyzer 330 operates in accordance to the passive flow analyzer described in the above-mentioned U.S. patent application of Ser. No. 09/833,219.

Content Flow Analyzer 332 performs passive analysis of specific elements of data content, such as web site content. Export flow analyzer 331 and content flow analyzer 332 determine a set of relevant prefixes or a prefix list 334 that is associated with a specific user's policy. Prefix list 334 is sent as data representing such prefixes to an active detection process in the controller. Prefix list 334 can be one or more lists or data structures configured to store data representing performance and usage characteristics and are designed to be receive a query, for example, by the controller. Once queried, the passive flow analyzer provides the one or more prefix lists, or portions thereof, to the controller for use in determining a policy violation, for determining which routes or path comply with the flow policy, which path is the optimum path for routing data, and the like. An exemplary prefix list that can be generated by export flow analyzer 331 and content flow analyzer 332, as well as passive flow analyzer 330.

Figure 17:
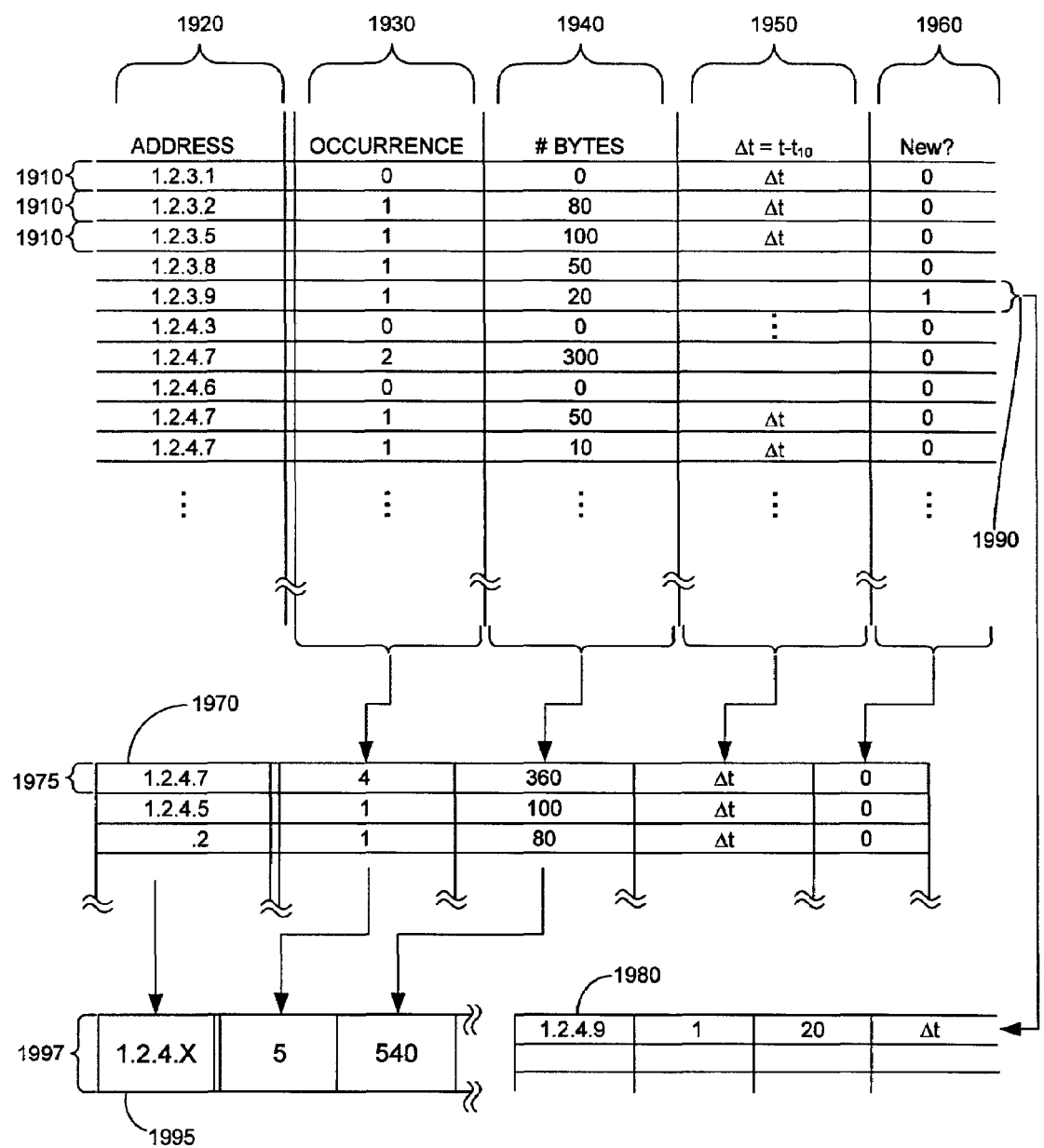
FIG. 17 is a representation of an exemplary address or prefix list according to an embodiment of the present invention.

FIG. 17 shows an exemplary data structure 1900 suitable for providing for one or more of the prefix lists described herein. Data structure, or list, 1900 includes many IP addresses 1920 with many records 1910 associated with each address (e.g., destination) or prefix of variable granularity. Each record 1910 includes an address 1920 (or prefix), a number of occurrences during a time period 1930, number of bytes sampled 1940, time interval in which sampling occurred (delta t) 1950, new prefix flag 1960 (1 represents new prefix, 0 represents old prefix), or the like.

List 1970 includes aggregate flow information for each address 1920 and/or prefix. For example, record 1975 include the following data: for address 1.2.4.7, this address was monitored four times during the sampling time interval (delta)t with a total flow volume of 360 bytes. With record 1990 having a new prefix flag set (i.e., first time this address has been monitored), new prefix list 1980 includes address 1.2.4.9 having one occurrence (first time) over (delta)t interval. One having ordinary skill in the art should appreciate that other relevant data may be monitored and can be stored in list 1900. Moreover, the data representing address, occurrence, number of bytes, time interval, etc., can be used to manipulate the data such in a way that the controller can easily obtain.

For example, the data stored within a list 1920 can be aggregated according to address or prefix. As shown in FIG. 17, aggregate list 1995 includes the group of addresses corresponding to 1.2.4.X. For example, the record 1997 of aggregate addresses contains data indicating that the aggregation of addresses had been monitored five times during the time interval and had a total volume of 540 bytes. One having ordinary skill in the art should appreciate that addresses or prefixes can be grouped or aggregated in many ways.

Export flow analyzer 331 and content flow analyzer 332 also are configured to notify controller 305 when a previously unseen prefix has been added to the prefix list 334. New prefix notification signal 335 enables the control element 1005 to establish a new baseline performance for this prefix and to seed the routing table with a non-default path, or alternative path (which can be non-BGP), if necessary. In one embodiment, export flow analyzer 331 and content flow analyzer 332 provide for monitoring of performance characteristics.

Content flow analyzer 332 is typically used when the main source of traffic flow 340 is web site or other content. Content source 341 can be configured such that special or premium content 342 that must be optimized can be identified by the flow control system by using, for example, an embedded URL 343. URL 343 redirects the client to a content server running on the content flow analyzer 332. Content flow analyzer 332 receives a request for the content element, which is generally an image file (e.g., 1×1 GIF) and is invisible or imperceptible in relation with the main original content, and responds to the client with the content element 344. Content flow analyzer 332 then stores or logs this transaction in log files and, by using the log files, content flow analyzer 332 is able to perform aggregation and assemble content prefix list 334. The list 334 is passed along to controller 205, for example, for active service level monitoring and policy enforcement.

Figure 4:
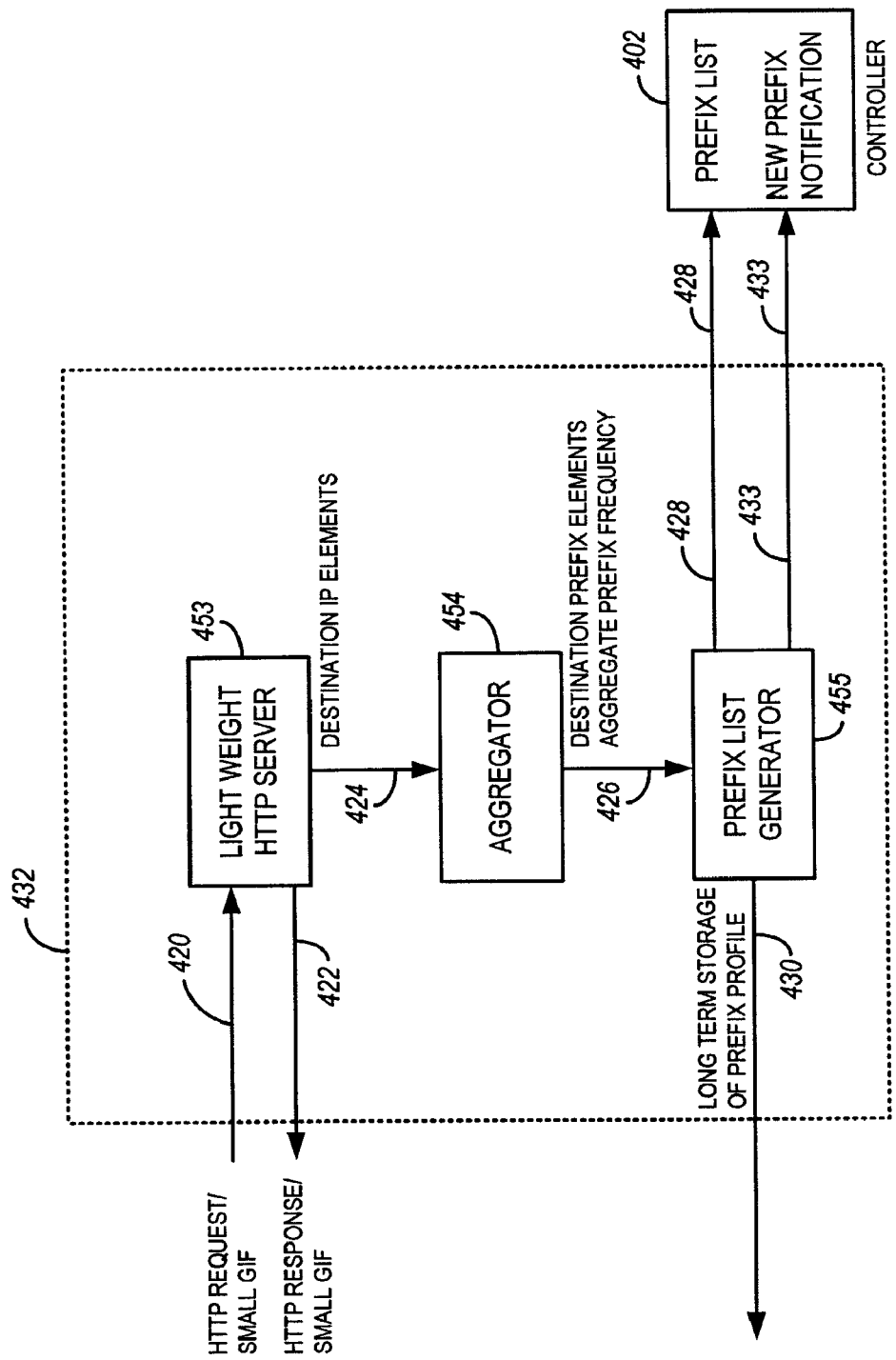
FIG. 4 is a functional block diagram of an exemplary content flow analyzer of FIG. 3.

FIG. 4 illustrates a functional block diagram of an exemplary content flow analyzer 432. Content flow analyzer 432 handles requests 420 for a small element of content, which is, for example, a 1×1 pixel image file that is imperceptible (although it need not be) on the resulting page. The small element is associated with the premium or generally specific pages of a larger set of content. The small element is, for example, a small redirect URL embedded within the content.

The small redirect URL acts to generate an HTTP request 420 in response to the small element of content. Content flow analyzer 432 sees this request 420 and responds 422 to it with, for example, a lightweight HTTP server 453. This server is fast and lightweight, and does nothing other than respond with the image file. The lightweight web server 453 logs the IP address of the client requesting the web page, and sends one or more IP addresses to aggregator 454. Aggregator 454 aggregates individual IP elements 424 into prefixes of varying granularity (e.g., /8 through /32) and also aggregates the frequency that each prefix is seen over an interval of time.

That is, aggregator 454 classifies prefixes according to frequency of occurrence and provides aggregated (i.e., grouped) prefixes 426 to prefix list generator 455. Prefix list generator 455 creates destination prefix list 428 according, for example, to a prefix's importance in relation to the overall operation of the system as defined by the aggregated or grouped prefixes 426. For example, each monitored traffic flow is examined to determine the performance characteristics associated with a destination prefix or address.

Aggregate prefixes 426 can be generally classified in terms of flow frequency, and average or total flow volume. Prefix list generator 455 sends updates to current prefix list 428 to controller 205 of FIG. 2, and also notifies other elements of the system with new prefix notification signal 432 when a new prefix is observed. Prefix list generator 455 stores the prefix information 430 to persistent storage for reporting and analysis purposes. A new prefix provides an additional alternate path or path segment that was unknown until a certain point of time. The new alternate path or path portion associated with the new prefix can provide for flow policy compliance, and thus can be used to re-route or modify the routing of data in accordance with am embodiment of the present invention to correct a policy violation.

Referring back to FIG. 3, export flow analyzer 331 operates in conjunction with network elements that can export (i.e., communicate) flow information in a format useable by analyzer 331. One exemplary format is the Cisco NetFlow™ export format. Any network element designed to export flow information, such as router 345 or a layer 2 switch, thus is also configured to passively monitor the traffic it is processing and forwards export records 346 to export flow analyzer 331. Export flow analyzer 331 functions to process export flow records 346, aggregates the flows into prefix elements, and generates prefix list 334. The prefix list 334 is generally a subset of all prefixes observed by the flow control system. A prefix can be selected from prefixes in the prefix list 334 based upon flow volume and flow frequency over an observation period. The selected prefix is placed into prefix list 334 before the list passed along to controller 205 of FIG. 2, for example.

Figure 5:
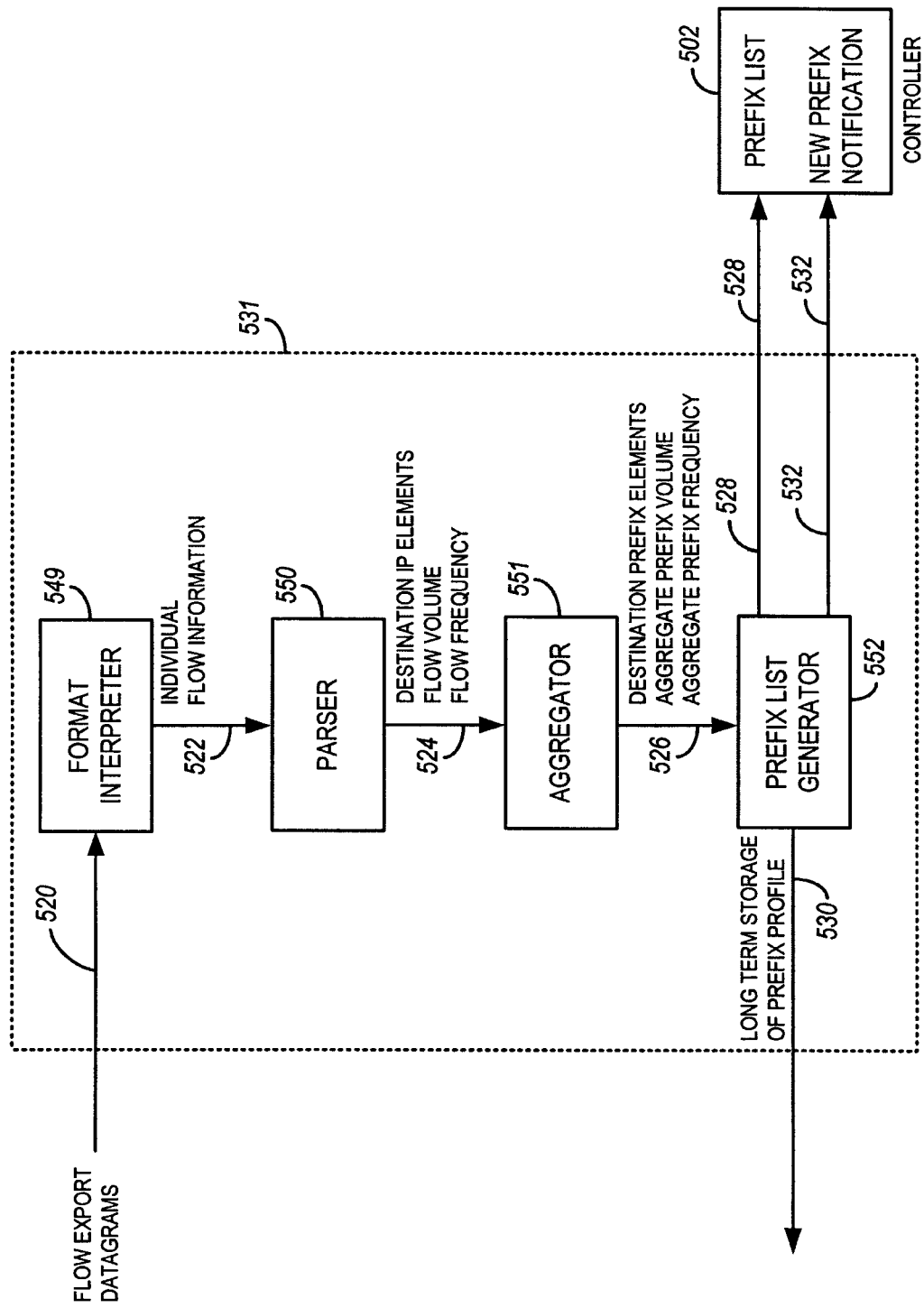
FIG. 5 is a functional block diagram of an export flow analyzer of FIG. 3 in accordance to one embodiment of the present invention.

FIG. 5 illustrates a functional block diagram of exemplary export flow analyzer 531. Export flow analyzer 531 includes format interpreter 549, parser 550 and prefix list generator 552. Format interpreter 549 is configured to receive export flow datagrams 520 from the network elements designed to send them. Format interpreter 549 then communicates individual flow information 522 to parser 550. Parser 550 operates to interpret destination IP elements from the flows monitored by the passive calibrator. Parser 550 also aggregates traffic flow according to total flow volume or transportation rate (e.g., in bytes/time unit) as well as flow frequency of destination addresses, for example, into aggregate elements. Thereafter, parser 550 sends the aggregate elements 524 to aggregator 551. Aggregator 551 then generates prefix-level destination information 526 (i.e., aggregate prefix volume and frequency) at a variety of prefix granularities (e.g., from /8 up through /32). In other words, aggregator 551 determines the frequency, session, etc. or for a specific prefix and the aggregate volume of occurrences related to that prefix over an observed time interval.

Destination prefix list 528 is generated by prefix list generator 552 by, for example, ranking and organizing traffic flow characteristics related to prefixes in order of relative importance. List 528 contains data representing an aggregation of prefixes and is organized by relevance, as determined by the system or an entity to ensure policy enforcement. For example, one or more prefixes can be ordered in terms of flow frequency and average or total flow volume in relation to prefixes available in the overall system. Prefix list generator 552 sends updates to the current prefix list to controller 205 of FIG. 2 and also notifies other elements of the system when a new prefix is observed via a new prefix notification signal 532. Prefix list generator 552 stores prefix information 530 to persistent storage for reporting and analysis purposes.

Figure 6:
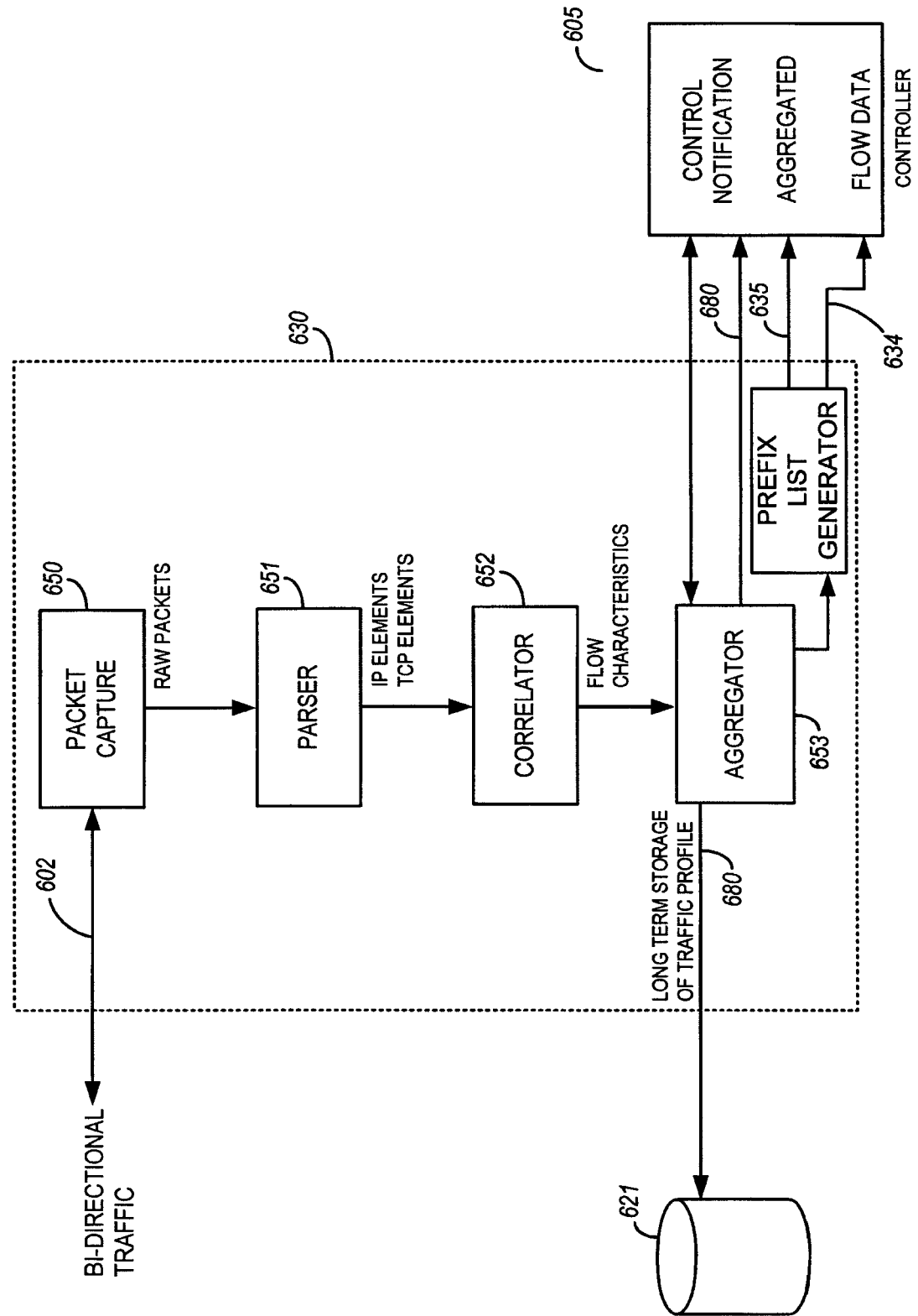
FIG. 6 is a functional block diagram of a passive flow analyzer of FIG. 3 according to a specific embodiment.

FIG. 6 illustrates a function block diagram of an exemplary passive flow analyzer 630 of FIG. 3. In one embodiment, passive flow analyzer 630 is designed to generate prefix list 634 and new prefix notification signal 635 and generates aggregated flow data 680, including network performance and usage statistics (e.g., data) grouped into relevant characteristics. For example, prefixes of a certain size can be aggregated, or grouped, from highest traffic volume to lowest as observed over time. The aggregated flow data 680 is communicated to controller 605 and are used by the controller to determine whether the current traffic flow violates or fails to conform to an associated flow policy for a given destination. The passive flow analyzer 630 also functions to store aggregated flow data 680 in traffic repository 621, where it can be used for characterizing historical route and traffic flow performance. In another embodiment of the present invention, a prefix list generator is not included in the passive flow analyzer of FIG. 6.

Passive flow analyzer 630 uses a copy of the traffic 602 via a passive network tap or spanned switch port, as shown in FIG. 2, to monitor the network performance for traffic. Passive flow analyzer 630 also can monitor and characterize UDP traffic patterns for detection of anomalous behavior, such as non-periodic traffic flow, or the like. Passive flow analyzer 630 can use various neural network techniques to learn and understand normal UDP behavior for the application in question, and indicate when that behavior has changed, possibly indicating a service level violation which can be verified or explained with well known active probing techniques.

Additionally, passive flow analyzer 630 is designed to be "application-aware" according to how each of the particular traffic flows is classified. Traffic can be classified according to the classifier described in the above-mentioned U.S. patent application Ser. No. 09/833,219. Passive flow analyzer 630 can inspect the payload of each packet of traffic 602 to interpret the performance and operation of specific network applications, such as capture and interpretation of the Realtime Transport Control Protocol ("RTCP") for voice over IP ("VoIP"), for example.

In FIG. 6, passive flow analyzer 330 includes packet capture engine 650, packet parser 651, correlation engine 652, and aggregator 653. Packet capture engine 650 is a passive receiver configured to receive traffic (e.g., IP data traffic) coming into and out of the network. Control signals are exchanged between aggregator 653 and controller 605 (e.g., requests from controller 605). Capture of traffic is used to facilitate traffic analysis and for determining whether a current traffic route meets minimum service levels or policy requirements. Packet capture engine 650 is designed to remove one, several or all packets from a traffic stream, including packets leaving the network and entering the network. Packet capture engine 250 operates to remove certain packets up, for example, from the network drivers in the kernel to user space by writing custom network drivers to capture part of a packet. Using DMA, the partial packet can be copied directly into user space without using the computer CPU. Such packets are typically removed according to one or more filters before they are captured. Such filters and the use thereof are well known in the art and can be designed to, for example, remove all types of TCP traffic, a specific address range or ranges, or any combination of source or destination address, protocol, packet size, or data match, etc. Several common libraries exist to perform this function, the most common being "libpcap." Libpcap is a system-independent interface for packet capture written at the Lawrence Berkeley National Laboratory. Berkeley Packet Filter is another example of such capture program.

Parser 651 is coupled to receive captured raw packets and operates to deconstruct the packets and retrieve specific information about the packet from each in the traffic flow. Exemplary parser 651 extracts information from the IP and TCP headers. Such extracted information from the IP headers include source and destination IP addresses, DSCP information encoded in the ToS (i.e., "type of service") bits, and the like. DSCP carries information about IP packet QoS requirements. Each DSCP defines the Per Hop Behavior of a traffic class. DiffServ has 64 code points so that it can define 64 different types of traffic classifications. TCP header information includes source and destination port numbers, sequence number, ACK number, the TCP flags (SYN, ACK, FIN etc.), the window size, and the like.

TCP elements parsed from the TCP headers are especially useful in determining whether a policy is being enforced, in terms of performance. An increasing amount of traffic, however, does not rely on TCP and instead uses UDP. UDP does not contain the necessary information to determine service levels according to conventional approaches.

To determine service levels to these destinations, the present invention might employ a statistically relevant amount of collateral TCP traffic going to the same prefix or a series of active probes to the same destinations, and/or have the analyzer parse deeper into the packet and understand the traffic at the application layer (e.g., layer 7), for example. There are some protocols running on UDP that have very specific requirements, which are different from most other data traffic on the network. These protocols can be loosely classified as "real-time" protocols and include things like streaming media and Voice over IP. Packet loss and latency, below a certain level, can be secondary concerns for real-time protocols.

In some cases, however, reducing the variance in inter-packet arrival times (i.e., network jitter) might be desirable. Many real time protocols and standards such as H.323 as defined by the International Telecommunications Union (ITU) can report the jitter in back channel communication known as the RTCP ("Real-Time Transport Control Protocol"), which is used to distribute time-dependent media data via IP multicast with feedback. If passive flow analyzer 630 of FIG. 3 is "application-aware," it can capture and observe the contents of the RTCP and be aware when the underlying network path is not meeting minimum jitter requirements. This can trigger an SLA violation in the same manner that 30% packet loss would when monitoring packet loss.

Correlator 652 operates to interpret and to group the packet elements (e.g., TCP and IP) from the packets to determine the current service level of the flow and then groups the packets into a specific traffic flow. Flows are reconstructed, or grouped, by matching source and destination IP addresses and port numbers, similar to the process of stateful monitoring of firewalls. Correlator 652 determines the current service level by measuring several traffic characteristics during a TCP transaction. For example, correlator 652 determines the round trip time ("RTT") incurred on a network, and hence, this serves as a measure of latency for the network traffic.

Figure 7:
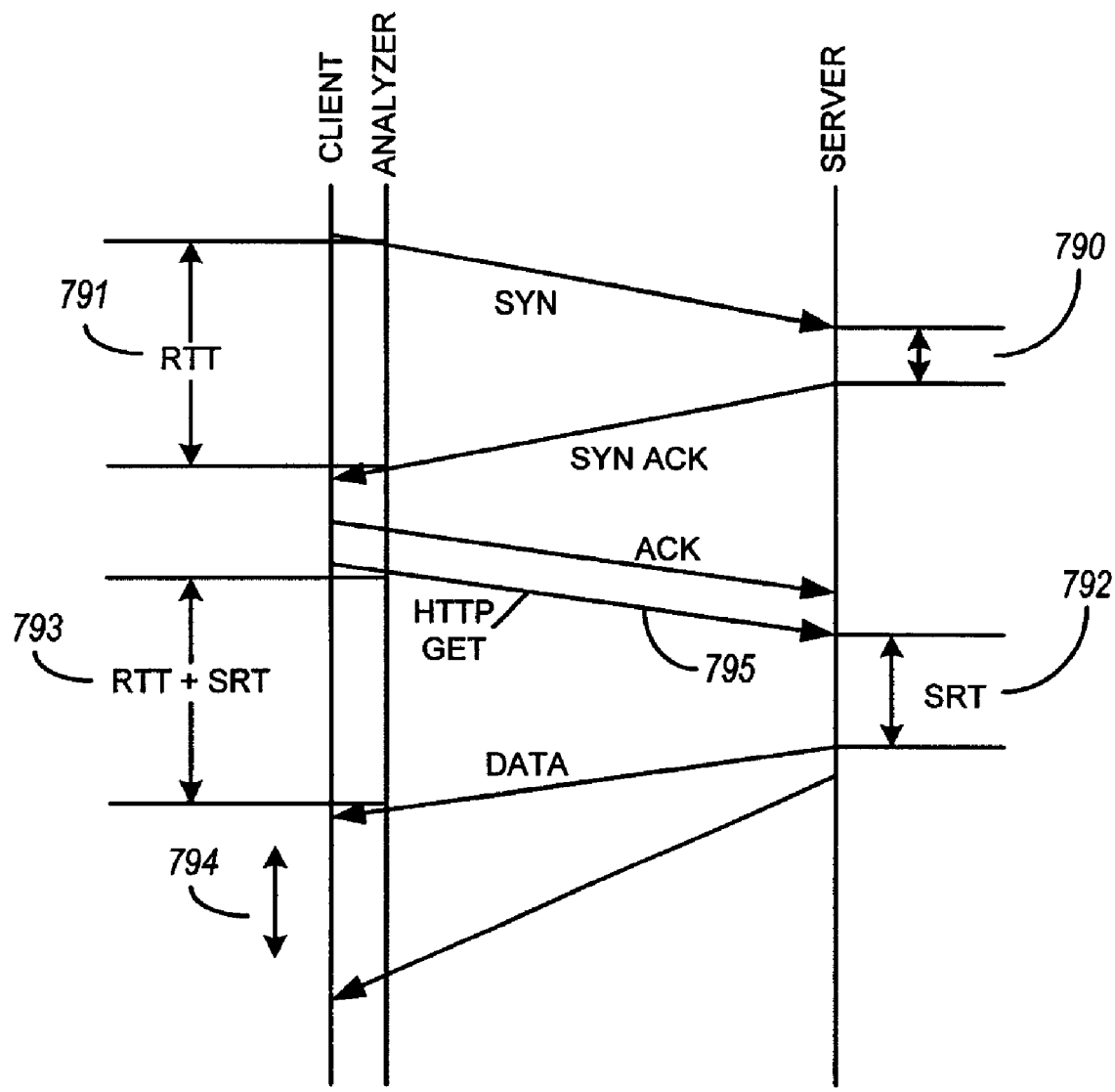
FIG. 7 is a simplified timing diagram of determining network performance metrics with an exemplary flow control system located near a client or a source.
Figure 8:
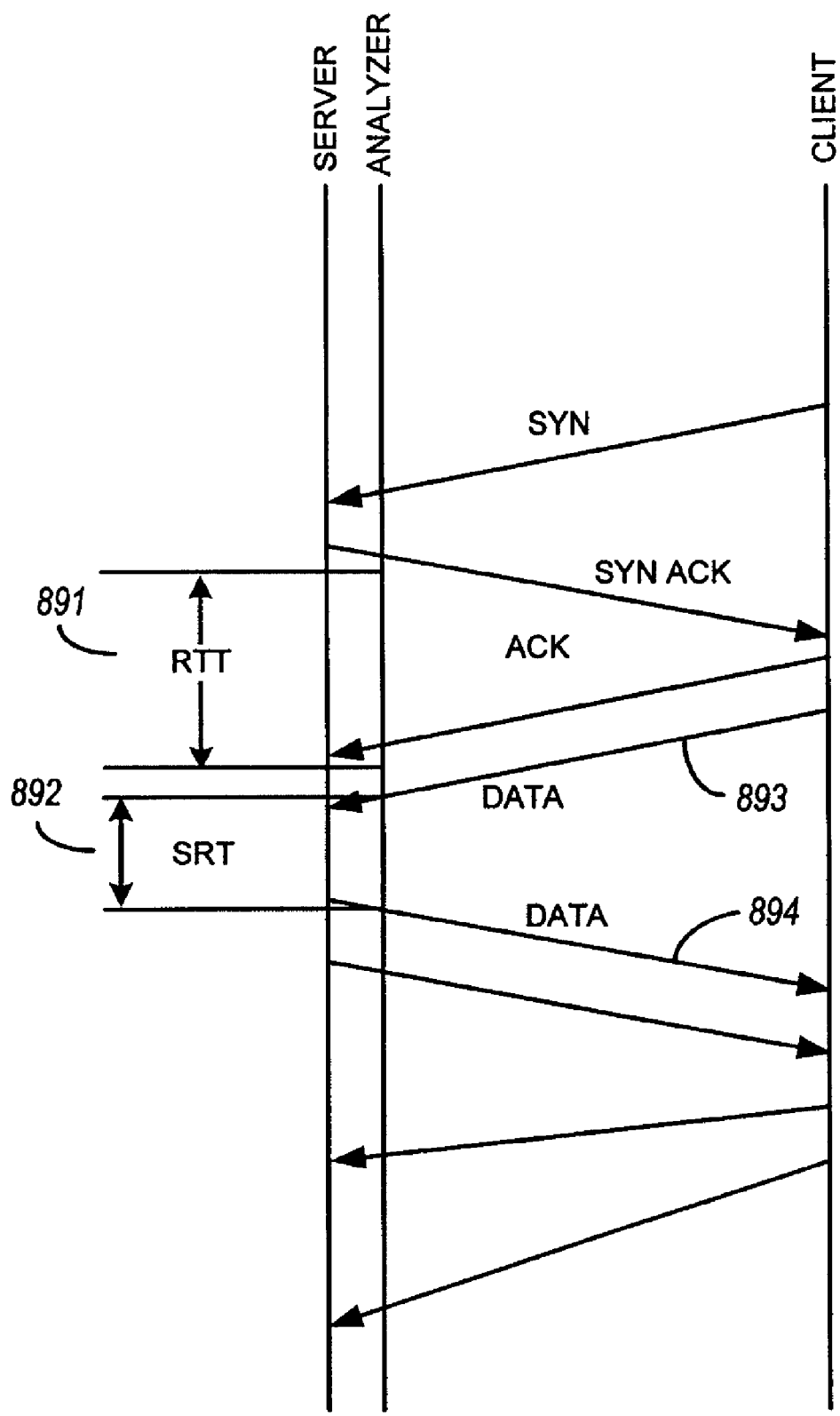
FIG. 8 is a simplified timing diagram of determining network performance metrics with an exemplary flow control system located near a server or a destination.

FIG. 7 shows how correlator 652 of passive flow analyzer 630 of FIG. 6, placed near a source (e.g., client having a source address), can determine the network latency ("NL") and server response time ("SRT") for a TCP traffic stream. FIG. 8 shows how correlator 652 of passive flow analyzer 630 of FIG. 6, placed near a destination (e.g., server having a destination address), can determine the network latency ("NL") and server response time ("SRT") for a TCP traffic stream Correlator 652 of FIG. 6 determines NL, for example, by estimating the difference 791 of FIG. 7 in time between a TCP SYN packet and its corresponding TCP SYN ACK packet. The difference in time between SYN and SYN ACK 791 is a rough estimation of the RTT excluding the small amount of time 790 that the server takes to respond to SYN. The SYN ACK packet is handled in the kernel of most operating systems and is generally assumed to be near zero. For each new TCP stream that is initiated from the source, correlator 652 can observe a time instantaneous value for network latency.

Packet loss is calculated, as a percentage, by correlator 652 by maintaining the state of all of the retransmitted packets that occur. From this value, correlator 652 calculates percentage packet loss from a total count of segments sent.

Correlator 652 also determines SRT 792 of FIG. 7, for example, by estimating the delta time (i.e., difference) 793 between, for example, the HTTP GET message 795 and the first data segment received and then by subtracting the previous value for the RTT. This assumes that the previous value for the RTT has not changed beyond an operable range since the TCP handshake occurred. The measurement shown by 794 indicates that measured congestion increases in the path as SRT 792 correspondingly increases. For purposes of this example, it is assumed that the data segments in the initial HTTP GET are sent back to back. In FIG. 7, the passive flow analyzer 630 is deployed close to (i.e., minimal or negligible latency due to geographically different locations) the clients requesting content from the IP data network, such as the Internet.

Correlator 652 also determines SRT 892 of FIG. 8, for example, by estimating the delta time between the HTTP GET message 893 and the first data segment 894. In FIG. 8, the passive flow analyzer 630 of FIG. 6 is deployed on the server end as will occur for most content delivery installations.

Referring back to FIG. 8, SRT 892 determined by correlator 652 depends on its location along the path that the traffic traverses. If passive flow analyzer 630 of FIG. 6 is on the client side, server response time 792 of FIG. 7 can be estimated as the delta in time between the HTTP GET Request message and the first data segment returned minus the RTT observed before the GET Request as shown in FIG. 7. If passive flow analyzer 630 of FIG. 6 is closer to the server side, the estimation is essentially the delta in time between the GET Request and the response as shown in FIG. 8. Congestion estimations are also possible by using the TCP Congestion Window ("cwnd") and by identifying the delta in receive time between segments that were sent back to back by the server, where the TCP congestion window controls the number of packets a TCP flow may have in the network at any time. Correlator 652 is coupled to provide the above determined exemplary flow characteristics to aggregator 653.

Referring back to FIG. 6, aggregator 653 primarily operates to group flows going to (or alternatively, coming from) each set of specific destinations together into one grouping. Aggregator 653 uses the service level statistic for each of the individual flows, received from Correlator 652, to generate an aggregate of service level statistics for each grouping of flows that are to go to the same destinations in the data network, such as the Internet. Aggregator 653 is also coupled to traffic storage 621 to store such aggregated (i.e., grouped by address prefix) traffic flow characteristics. Traffic flow characteristics (or traffic profiles) are then used for future statistical manipulation and flow prediction. In a specific embodiment, storage 621 is the equivalent, or the same, as storage 221 of FIG. 2.

The granularity of the destinations is the same as the granularity of changes that can be made in the routing table. Nominally, flow control system of FIG. 2 can install routes with prefixes of any length (i.e., 0/ to /32), though the general practice is not to do so. Aggregator 653, therefore, can start aggregating flow statistics at the /32 level (i.e., class C networks) and continue all the way up to the /8 level (i.e., class A networks) into a data structure, such as a patricia or radix trie, or a parent-child data structure, or the like. In this way, it is possible to seek very quickly the necessary granularity of the routing change that needs to be made to ensure the service level is met.

Aggregation techniques employed by aggregator 653 are used. to maintain the system 200 of FIG. 2 to acceptable performance service levels, such as determined by one or more flow policy requirements. Since network performance has been shown not to generally follow conventional statistical distribution, such as Gaussian or Poisson distribution, average calculations for service levels across all flows are not as reliable a measurement of a typical performance behavior during a time interval. If the service level agreement (SLA) or policy, however, states that the average service level must be maintained, then the outlying occurrences of poor performance will cause the average to be skewed, thus requiring corrective action to restore the minimum service levels being offered. A meaningful way to describe typical service levels being offered across data flows can be to use median values, rather than average values, in some embodiments of the present invention. A person having ordinary skill in the arts will appreciate that either technique is possible and will depend on the definition of the service level that must be maintained.

Figure 9:
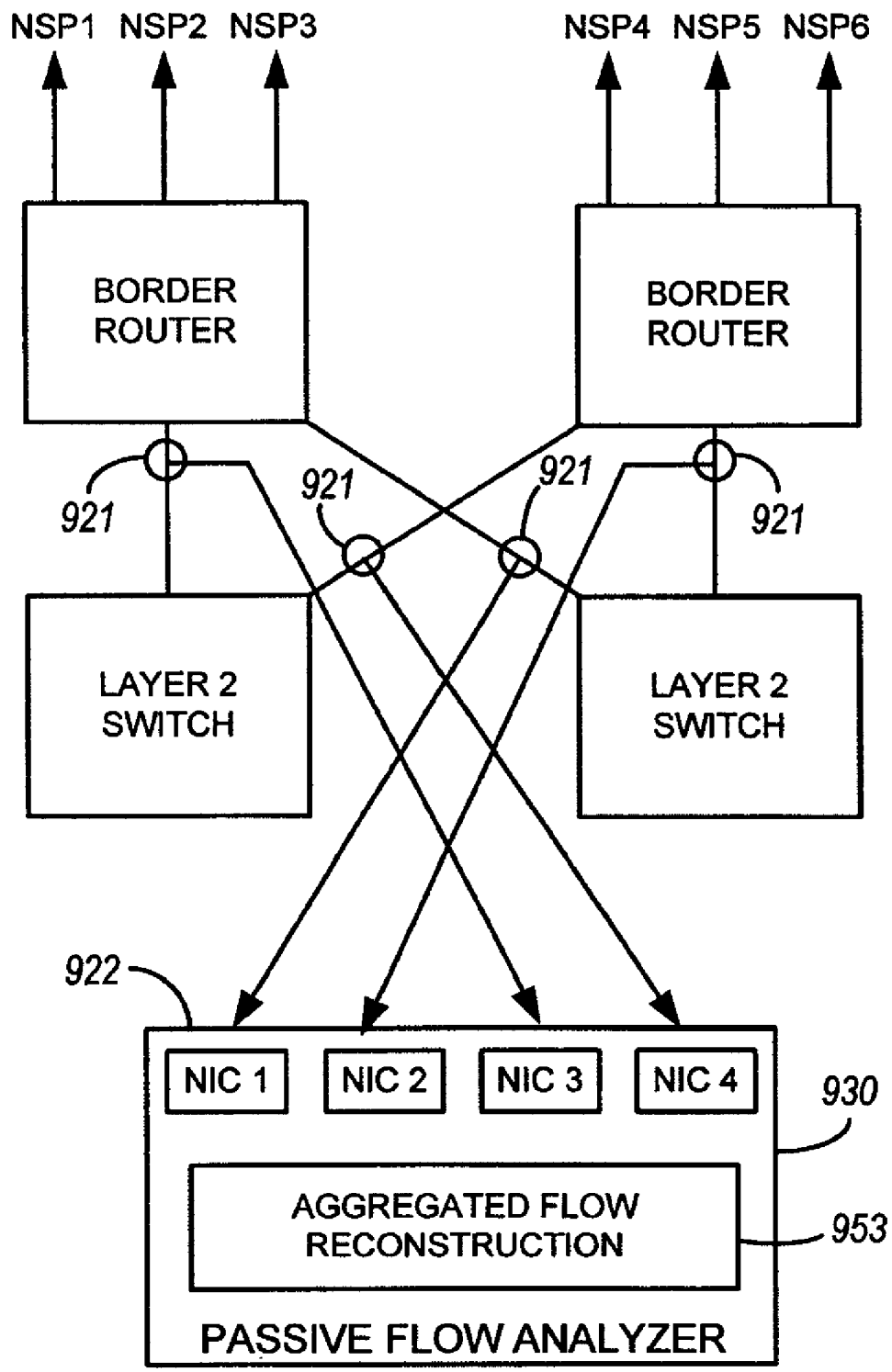
FIG. 9 is a network diagram of an exemplary passive calibrator with distributed packet capture according to another embodiment of the present invention.

FIG. 9 illustrates how passive flow analyzer 930, according to another embodiment of the present invention, is capable of packet capture and flow reconstruction across more than one network interface, each interface represented by a network interface card ("NIC"). In practice, many switch fabrics are constructed in a manner by tapping into a single point in the data stream or replicating a single port. The switch does not guarantee that passive flow analyzer 930 will see all of the traffic in both directions. Bi-directional traffic is required for optional flow reconstruction for passive analysis. In FIG. 9, the switch fabric shown can be passively tapped at tap points 921 at four places (as shown) and connected to passive flow analyzer 930 at four different network interface cards (NIC) 922. Passive taps at tap points 921 can be mirrored switch ports, optical/electrical passive taps, or the like. Passive flow analyzer 930 can include either a single or combined aggregated flow reconstruction element 953 that can collect captured data from multiple network interfaces in order to perform flow reconstruction.

Figure 10:
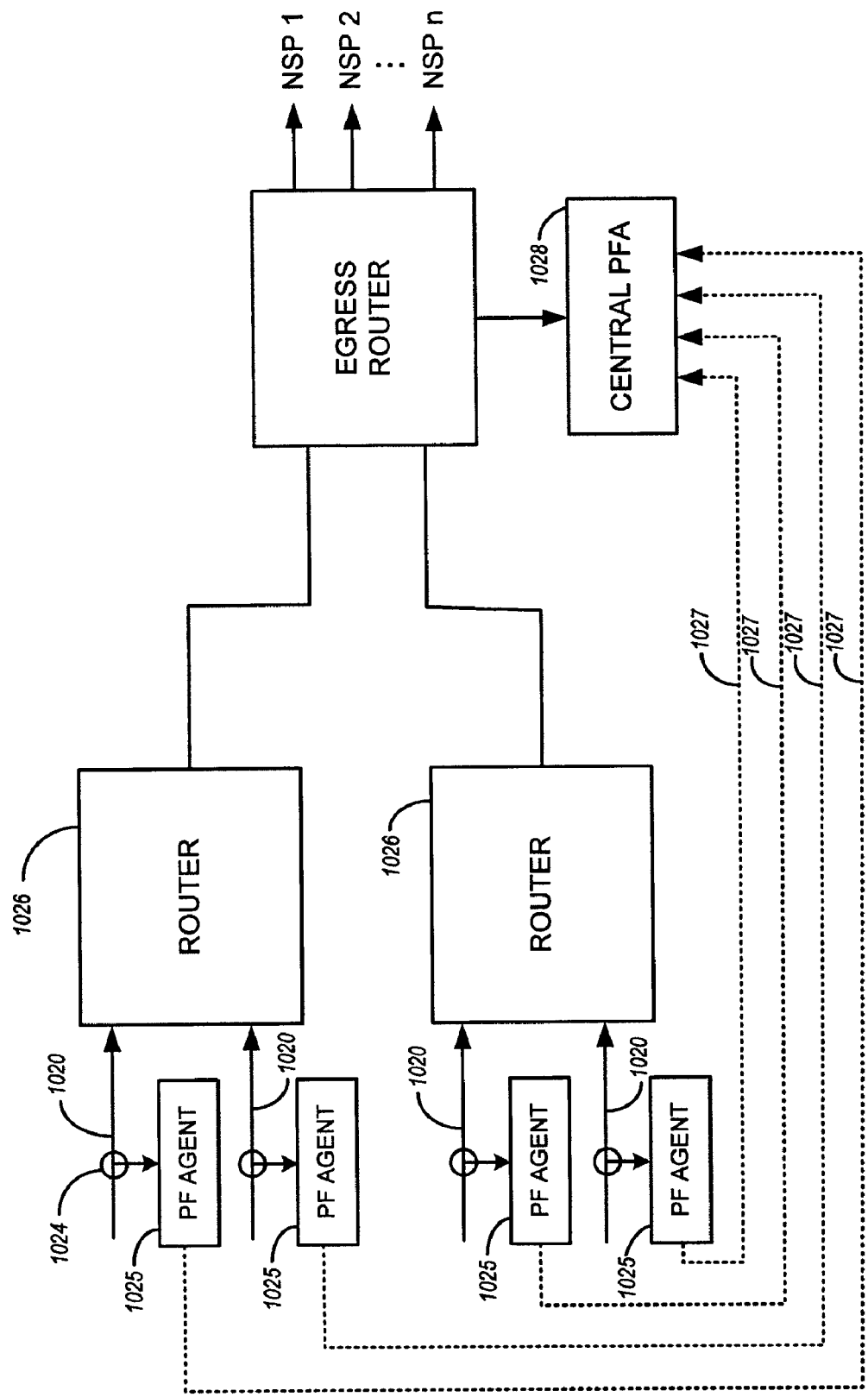
FIG. 10 is a network diagram of distributed passive flow elements according to yet another embodiment of the present invention.

FIG. 10 illustrates yet another embodiment of the present invention where passive flow analyzer 630 of FIG. 6 is distributed in nature. FIG. 10 shows traffic flow 1020 bi-directionally traveling via several local traffic source points. Distributed local passive flow agents 1025 can be tapped passively at tap point 1024 into traffic flow 1020. Passive flow agents 1025 are distributed such that each agent monitors and conveys individual flow characteristics. The traffic sources are distributed across a layer 3 infrastructure, for example, and are separated by one or more routers 1026. This arrangement prevents the passive flow analyzer 930 of FIG. 9 from collecting information across the same layer 2 switch fabric as in FIG. 9. Each of the passive flow agents 1025 performs local flow reconstruction and then exports flow data records 1027 over the network to a central passive flow analyzer 1028, performs flow aggregation and service level analysis across all of the distributed passive flow agents 1025.

Figure 11:
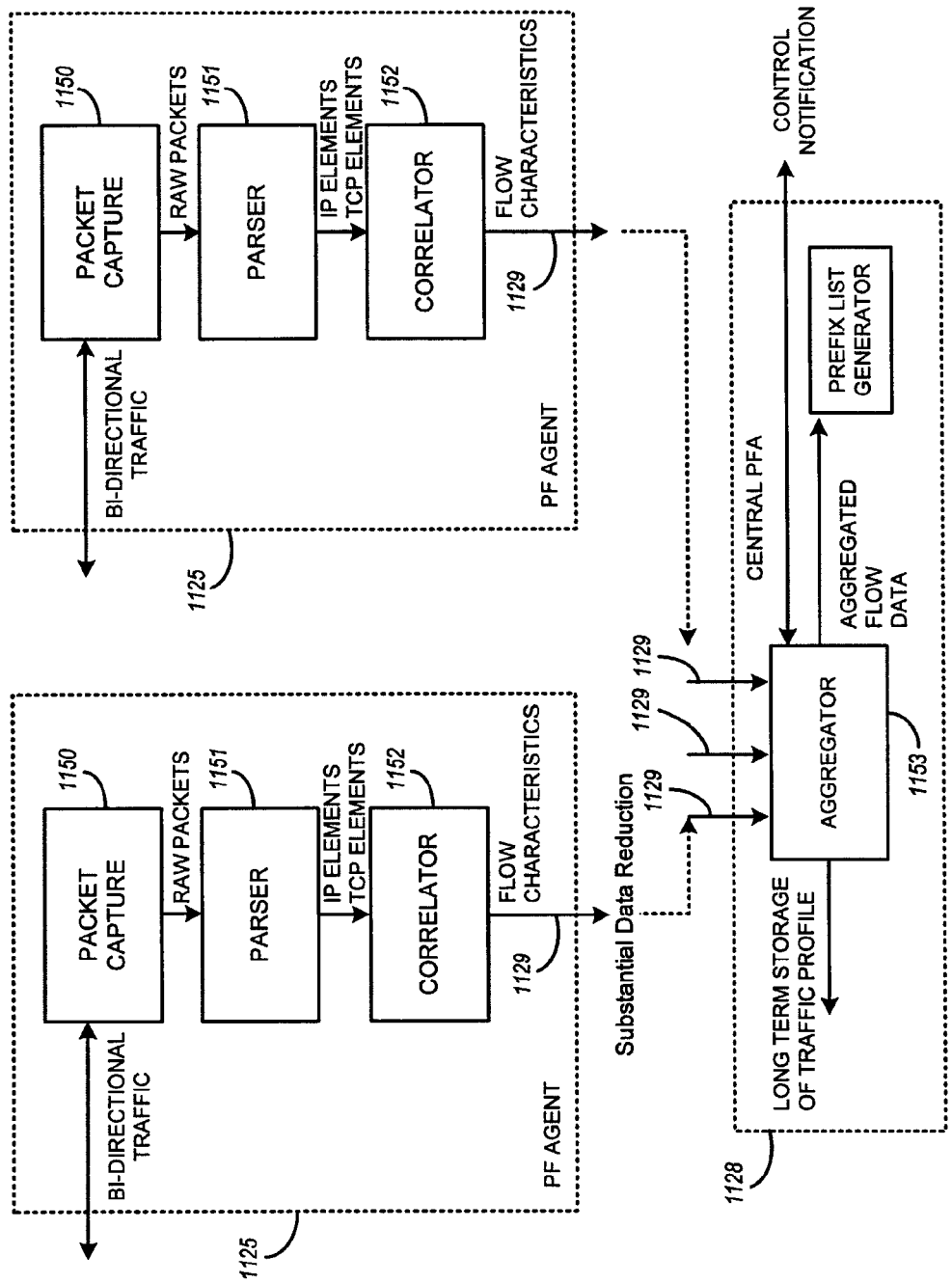
FIG. 11 is a functional block diagram of the distributed passive flow elements of FIG. 10 according to still yet another embodiment of the present invention.

FIG. 11 illustrates a more detailed functional block diagram depicting multiple passive flow agents 1125 separately distributed and a single central passive flow analyzer 1128. Each passive flow agent 1125 includes packet capture 1150, parser 1151 and correlator 1152 functions on each of the local traffic flows. Correlator 1152 exports flow records 1129 with substantial data reduction to central passive flow analyzer 1128. Substantial data reduction reduces the amount of information forwarded to the central passive flow analyzer, which can be effectuated by using well-known encoding techniques. Central passive flow analyzer 1128 accepts flow export records 1129 from each passive flow agent 1125 and central aggregator 1153 performs prefix aggregation on each of the exported flows. Thus, the centrally aggregated flow information can be used to determine if a particular policy violation is occurring.

Figure 12:
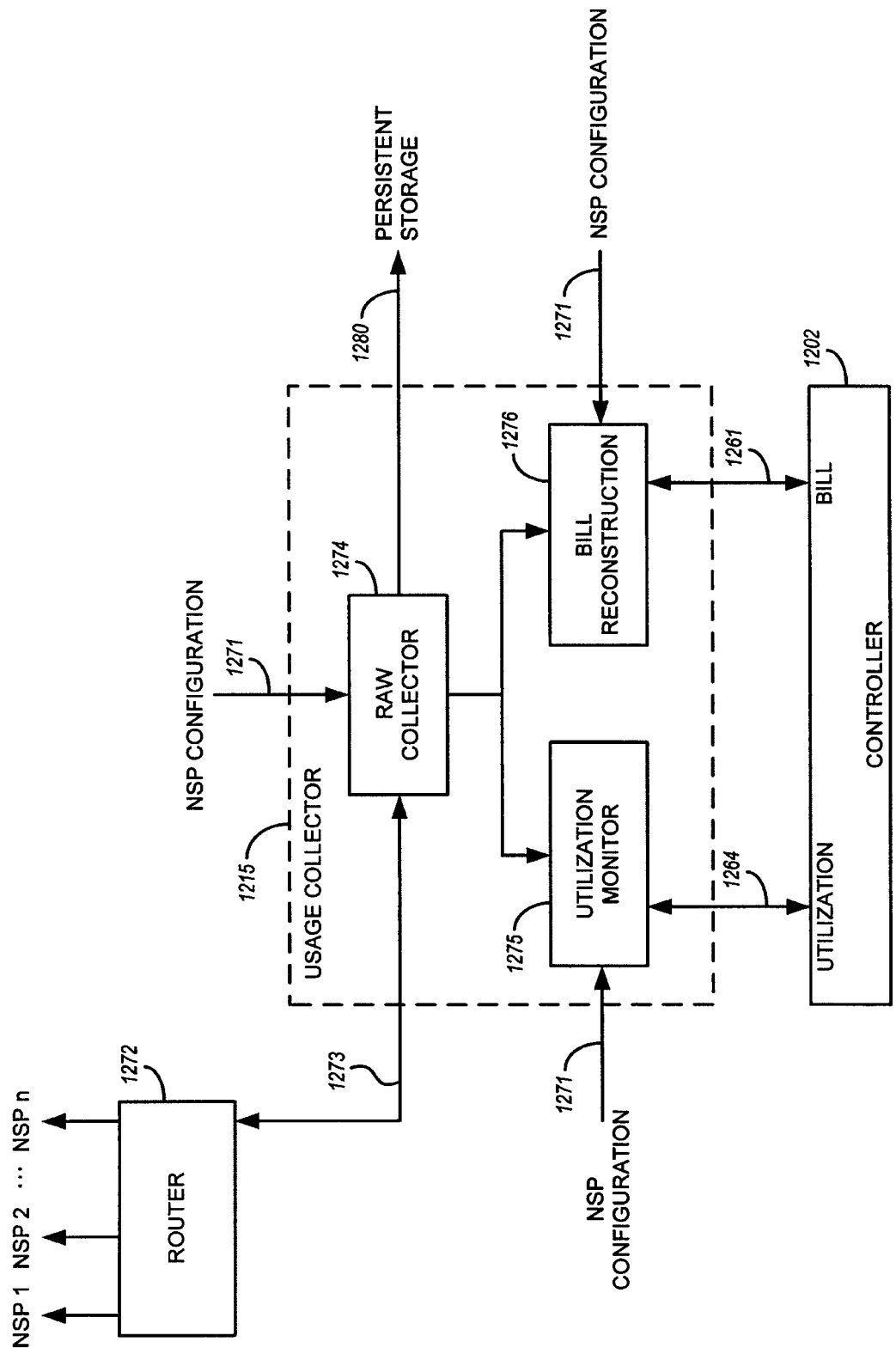
FIG. 12 is a detailed block diagram of an exemplary usage collector according to a specific embodiment of the present invention.

FIG. 12 illustrates a detailed block diagram of usage collector 214 of FIG. 2. Usage collector 1215 operates to collect usage information 1273 from network providers, such as byte counters (i.e., the amount of traffic transmitted to and received from network service providers). Usage collector 1215 uses this information to calculate network service provider utilization, load, etc., of data paths associated with the provider.

Usage collector 1215 also operates to reconstruct provider billing records. Usage collector 1215 accepts provider configuration information 1271 related to each network service provider (NSP) connection. This NSP configuration information 1271 details provider interfaces on the various routers 1272 (e.g., egress routers), provider next-hop IP addresses traceroute probes (to verify the current provider in use with trace probes), billing period start and end dates, circuit bandwidth for calculating the utilization and price per megabit/sec, minimum bandwidth commitment, burstable rates, provider sampling interval, provider billing algorithm, a utilization alarm threshold and the like.

In operation, exemplary raw collector 1274 sends a query 1290 (e.g., SNMP) to collect interface raw byte counters from routers 1272 on each of the provider circuits at a specified sampling interval. Provider circuits include paths, pipes (virtual and/or physical), T1, and the like. Raw Collector 1274 places the raw byte counters 1280 into persistent storage for later reporting and analysis. Raw collector 1274 sends the raw information to two other components: utilization monitor 1275 and bill reconstructor 1276.

Utilization monitor 1275 calculates the ingress and egress circuit utilization for each provider using the raw byte counts and the NSP configuration information 1271. In one example, NSP configuration information 1271 includes the bandwidth of the provider's circuits. Utilization information 264 includes data representing utilization trends for use with short range forecasting models (e.g., ARIMA, exponential smoothing, etc.) such that utilization monitor 1275 can determine whether bandwidth is trending up or down (i.e., increasing or decreasing in size) for a given service provider.

Figure 15:
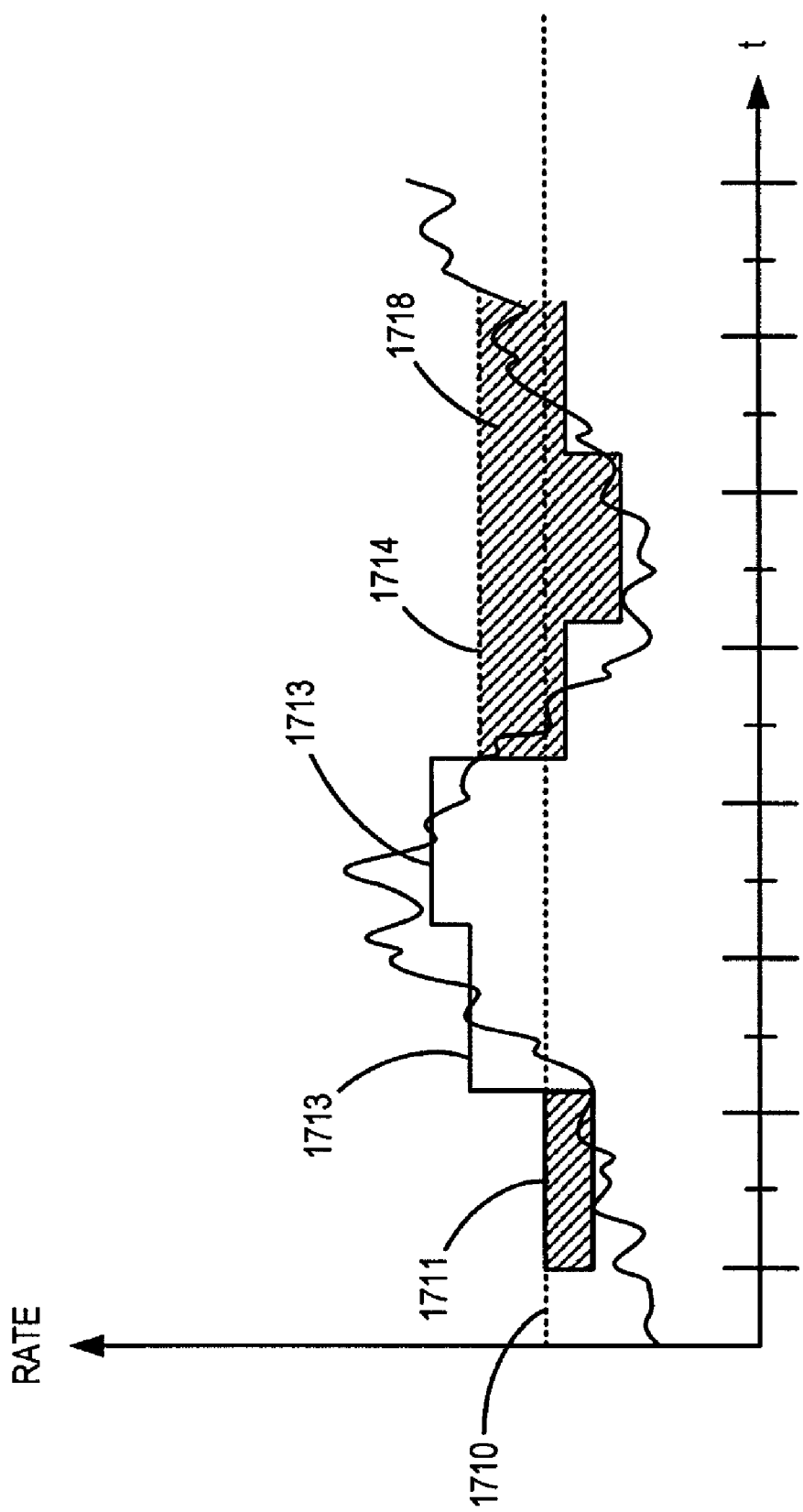
FIG. 15 is a graphical representation illustrating an exemplary method to calculate billable rates in accordance to the present invention.

Bill reconstructor 1276 uses the billing information from NSP configuration data 1271 to reconstruct the current provider billable rate for the current billing period. Billing information includes information explaining the methods that specific providers use to calculate costs, such as a billing rate. Such methods of calculating bills for using a network provider are well known in the art. Bill reconstructor 1276 applies similar provider billing methods to the raw byte counters from raw collector 1274 to generate the bill and related billing rates, etc. The generated bills, which can be mapped into dollar amounts, are typically estimates since the sample times between the provider and usage collector 1215 generally do not match exactly. Bill reconstructor 1276 will send billing information 1261 to controller 1202 for use in peak avoidance and least cost routing. Peak avoidance can be defined as a method of avoiding using a path or path portion at a higher a billing rate, such as shown in FIG. 15. Least cost routing refers to a method of using or defaulting traffic to the least expensive provider.

Additionally the information can be sent to controller 1202 for use in the least cost fix method of selecting the cheapest if performance is of negligible or no consequence. That is, controller 1202 uses data from billing message 1261, including billing rates, to determine an alternate path based in part on a path's free bandwidth (i.e., path does not incur additional cost to use), in accordance with the flow policy.

Referring back to FIG. 2, configuration element 211 is coupled to controller 205 and to data director 220. Controller 205 provides the best path, as defined by a particular flow policy, to reach a destination prefix to configuration element 211. Configuration element 211 operates to change the default routing behavior (i.e., current path) for the destination requiring corrective action. Configuration element 211 changes the routing behavior by, for example, sending a modified routing table of addresses to data director 220.

Once data director 220 receives this information, data director 220 informs controller 205 that a route change has been implemented. Thereafter, controller 205 communicates signal 230 back to passive calibrator 202 to clear its state and to resume monitoring the destination. The destination is monitored to ensure that the updated path of the routing table, or path, meets minimum service levels (e.g., no violations of SLA, or no unacceptable deviations from agreed upon performance metrics as defined by the associated flow policy).

In one aspect, configuration element 211 resides in a route server. In another aspect, configuration element 211 resides in a router and is configured to modify a route map or table. In yet another aspect, configuration element 211 is adapted to provide configuration information, or routing table. In still yet another aspect, the path information is stored within the configuration element 211 according to whether it is related to inbound or outbound traffic.

Figure 13:
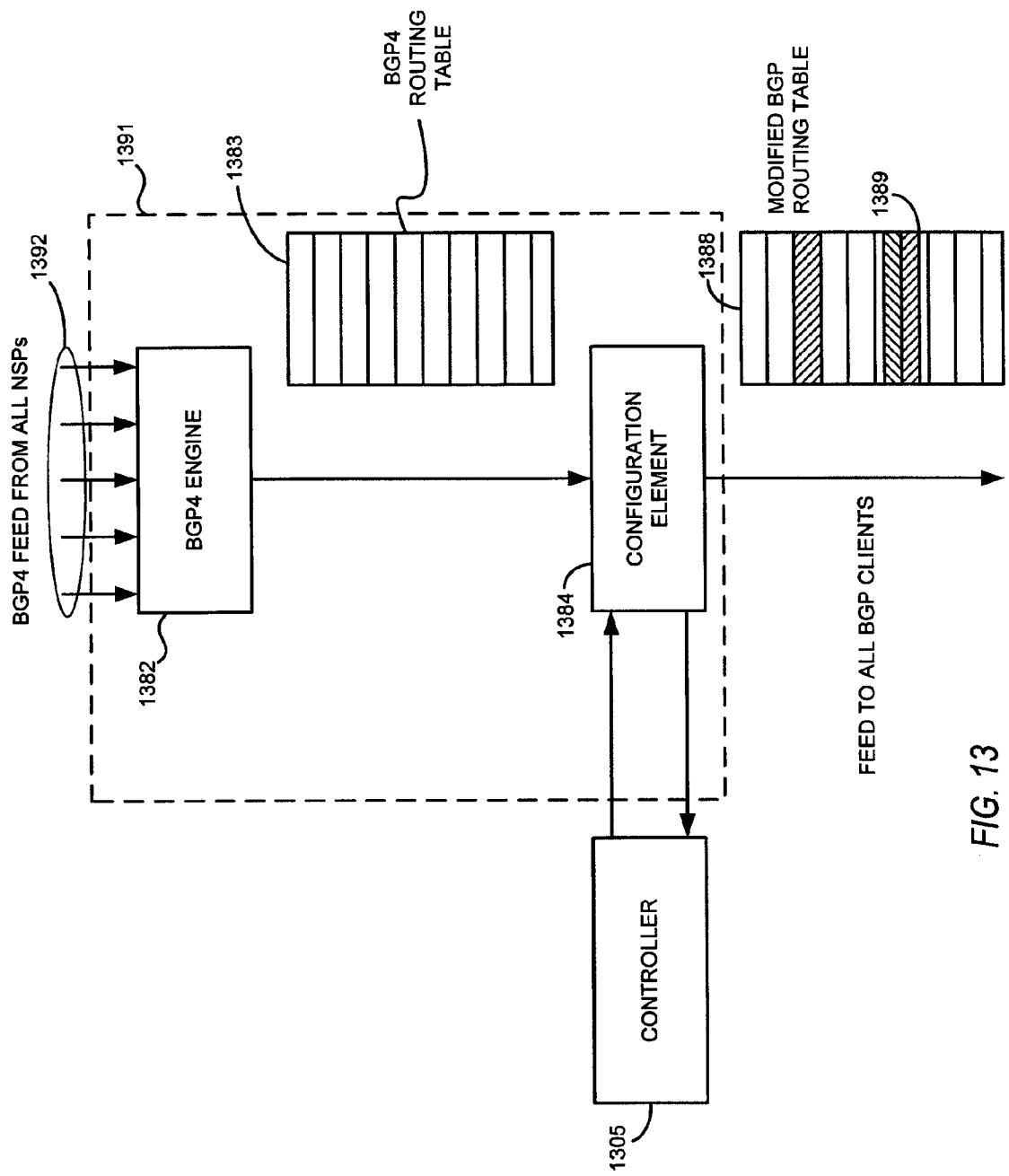
FIG. 13 is a block diagram of a routing server using an associated configuration element receiving one or more protocol feeds, according to one embodiment of the present invention.

FIG. 13 shows an example of yet another embodiment of the present invention, where configuration element 211 of FIG. 2 resides in a network element, such as route server 1391. Configuration element 1384 of FIG. 13 operates similarly to other adaptations of configuration elements described herein. That is, configuration element 1384 modulates the current or default routes of data traffic and thus modifies the default routing behavior, for example, in a local deployment (e.g., Point of Presence, or "POP"). Route server 1391 ("RS") receives a full set or subset of routing tables from the data networks of interest.

In one embodiment, the routing tables are received into route server 1391 by way of one or more default BGP4 feeds 1392 into BGP4 Engine 1382 from a full set or subset of the local transit providers. BGP4 Engine 1382 integrates, or merges, the routes into a single BGP4 routing table 1383 of best available routes. In another embodiment, route server 1391 maintains an iBGP session with all of the internal BGP capable routers rather than maintaining the BGP4 sessions as shown in FIG. 13. With a single iBGP session there is no need to configure all of the BGP sessions with the network service providers before making route changes.

Configuration element 1384 is designed to receive one or more BGP4 routing tables 1383 from BGP4 engine 1382 and can be adapted to receive one or more control signals and data resulting from the control processes of controller 1305. In operations, configuration element 1384 receives, from controller 1305, the necessary routing changes to be implemented in default routing table 1388. Then, configuration element 1384 incorporates one or more changes in modified routing table 1389.

Thus, configuration element 1384 operates to modify BGP4 routing table 1383 and to generate one or more modified BGP4 routing tables 1388. Modified BGP4 routing table 1388 includes changed routing 1389, advertisements of more specific routes, etc. New modified BGP4 routing table 1388 is then fed to all BGP clients in the network, which then is used to guide traffic to the destination.

For a given source address, the ingress point into a network is determined typically by the advertisements of routes made to downstream providers and a provider policy (set of rules that is set up by such providers). Eventually, the network service provider (e.g., "ISP") that is hosting the destination will receive such advertisements.

Controller 205 of FIG. 2 is designed to receive performance characteristics, such as latency, loss, jitter, etc., as monitored by the calibrator elements as well as usage characteristics, such as bandwidth, costs, etc., as monitored by the usage collector. Controller 205 is coupled to policy repository 218 to receive flow policies, which typically include service level agreement ("SLA") performance metrics. These metrics, or requirements, are compared against the monitored performance and usage characteristics. If a particular policy is violated (i.e., one or more performance metrics are outside one or more expected ranges or values), controller 205 determines a subset of one or more alternate data paths that conform to the associated flow policy. In another example, controller 205 selects a best or optimized path as an alternate data path that best meets the performance requirements and usage requirements, as defined by the policy.

The active calibrator and the passive calibrator provide performance characteristics. Regarding the active calibrator, controller 205 initiates active calibration by request active probing. The active calibrator sends one or more calibration probes on probe path 207 out into the one or more data networks. The returning probes on probe path 207 provide information back to controller 205, which contains the identities of available paths and performance information related thereto.

Regarding the passive calibrator, controller 205 is designed to receive real- or near-real time network performance characteristics (i.e., loss, latency, jitter, etc.) from passive calibrator 203 as monitor in traffic flows in which it has access. After, controller 205 provides a routing change, or update, to configuration element 211, it also communicates a signal 230 to passive calibrator 203 when an updated route change is made to a specific destination. Signal 230 initiates the clearing of the state of passive calibrator 203 so that the calibrator resumes monitoring the specific destination to ensure that the updated route of the routing table, or path, is flow policy compliant. Clear state signal 338 of FIG. 3 depicts the signal that comes from the controller to initiate the resetting of the passive flow analyzer's state.

In one example, controller 205 operates to interpret the aggregated flow data over an interval of time for each of the groupings of destination prefixes. And if a policy violation occurs, controller 205 determines which of the alternate paths is best suited for the prefix or traffic type associated with the current traffic flow. Controller 205 then sends the necessary routing changes to configuration element 211. That is, controller 205 resolve policy violations relating to non-compliant network performance characteristics, in accordance with the associated flow policy. This process can be repeated until the policy violation is resolved.

In another example, controller 1202 of FIG. 12 is designed to receive real or near-real time data representing network usage characteristics from usage collector 1215, such as usage rate, billing rates, etc. Controller 1202 uses this information to resolve policy violations relating to non-compliant usages characteristics, in accordance with the associated flow policy. That is, prior to or during a route change, controller 1202 not only does the controller consider the performance of alternate paths, but also whether those alternate paths either avoid peak data traffic over a specific provider's path (i.e., adequate bandwidth related to time-of-day) or are the least cost paths in view of the flow policies.

To resolve usage-type policy violations, controller 1202 is configured to receive routing tables, for example, to determine which of the current traffic flows or routing of data on certain paths, or path portions thereof, are congested (i.e., loaded) with respect to a particular provider path or paths. Controller 1202 also is designed to receive data representing flow volumes for each of the alternate provider paths to determine which subset of flows of a set of traffic flows to or from a given destination prefix are in compliance with the associated flow policy in terms of traffic flow volume.

An exemplary controller of the present invention thus is designed to obtain information related to the performance and usage of data networks and the make corrective action to effectively and efficiently route data over paths or path portions that meet at least associated policy requirements.

The following discussion relates to flow policies and the application of such policies in resolving policy violations and in enforcing the policy requirements or metrics. Referring back to FIG. 2, controller 205 is coupled to policy repository 218 for receiving one or more policies. As described above, a policy is a set of rules or threshold values (i.e., maximums, minimums, and/or ranges of acceptable operations) that controller 205 uses these rules to compare against the actual flow characteristics of a specific traffic flow. For example, a policy can be the user-defined mechanism employed by controller 205 to detect specific traffic flows that are to be monitored and acted upon, if necessary. As an example, a policy can also specify how the particular policy should be enforced (i.e., in includes a hierarchical structure to resolve violations from highest to lowest precedence). Although an exemplary policy includes requirements, or rules, related to detection, performance, cost, and precedence, one having ordinary skill the art should appreciate that less, or additional parameters, can be measured and enforced according the present invention.

Detection is defined as the techniques or mechanisms by which flow control system 200 determines which traffic should be acted upon in response to a policy violation. The traffic flow can be identified, by name, by source or destination addresses, by source or destination ports, or any other known identification techniques. For example, a policy can be identified by address prefix. That is, system 200 will monitor the traffic flow to and/or from a specific prefix, and if necessary, can enforce the associated flow policy in accordance to its requirements. Further regarding detection, a policy defined for more specific prefixes can take precedence over more general prefixes. For example, a policy defined for a /24 prefix can take precedence over a /16 prefix even if the /16 prefix contains the specific /24.

Performance can be a policy requirement that describes one or more target performance levels (i.e., network/QoS policy parameters) or thresholds applied to a given prefix or prefix list. Although more than one performance-based policy requirement may be defined, in this example only a single policy is applied to a given prefix or prefix list. Exemplary performance requirements include loss, latency, jitter, and the like.

Moreover, such requirements can be configured either as, for example, an absolute, fixed value or as an Exponentially Weighted Moving Average ("EWMA"). Absolute value establishes a numerical threshold, such as expressed as a percentage or in time units over a configurable time window. The EWMA method establishes a moving threshold based on historic sampling that places an exponential weighting on the most recent samples, thereby asserting a threshold that can take into account current network conditions as they relate to historic conditions.

Cost is expressed in the policy definition in terms of precedence and whether the policy is predictive or reactive. Costs also can be characterized by usage collector 214 of FIG. 2 through bill reconstruction and reconciliation of bandwidth utilization in both aggregate and very granular levels (e.g., by /24 destination network). Cost predictive requirements are used to proactively divert traffic from one provider to another in order to avoid establishing a peak (i.e., "peak avoidance") that may trigger a new or higher billable rate. Cost reactive requirements are used to reactively divert traffic from one provider to another when a minimum commit rate or current billable rate is exceeded or when like cost requirements are not in compliance.

Typically, both cost predictive and reactive requirements result in a binary decision (i.e., a circuit or path, for example, is either in compliance with or in violation of a flow policy). In the case of predictive cost, the transit circuit is either in compliance, or soon to be violation of a flow policy. Regardless, an action must be taken to resolve the situation, unless cost is preceded by performance (i.e., performance requirements are to be addressed prior to making a cost-based change).

Precedence is a policy requirement that describes one or more target usage or utilization characteristics or levels. Precedence can include provider preference and maximum utilization (i.e., load) requirements. The provider preference requirement is, for example, an arbitrary ranking of providers that is used when an action must be taken, but when two or more transits may be selected in order to enforce the policy. The flow control system can automatically set the provider or path preference requirement if it is not configured explicitly by the system's operator. This requirement is then applied as a tiebreaker in deadlocked situations such that the provider with the highest preference wins the tie and thus receives the diverted traffic flow.

The maximum usage requirement can be used as either may also be used an actual operational threshold not to be exceeded or as a tiebreaker. Maximum usage is configured, for example, in the transit provider section of the configuration and takes either a percentage argument (i.e., in terms of available bandwidth), or alternatively, can be set as an absolute value in terms of Mb/s (i.e., not to exceed available bandwidth).

The following is an example of a policy used with a controller to determine whether the specific policy is in compliance, and if not, to determine the course of action.

For example, consider the following policy as used for a particular traffic flow:

| Policy Requirement | Precedence | Value or Threshold |
|---|---|---|
| Loss | 10 | 2% |
| Latency | 20 | EWMA |
| Cost | 30 | Predictive |
| Maximum usage | 40 | |
| Provider Preference | 50 | |

Suppose that the traffic flow is associated with a prefix of 24.0.34.0/24, is currently carrying traffic at 240 kbits/sec, and is reached via provider 1 of 3. Provider 1 is currently carrying 2 Mbits/sec and has a minimum commit of 5 Mbits/sec.

The controller of the flow control system using the policy can monitor the alternate traffic routes, or paths, and can determine the following flow characteristics as they relate to the providers:

| Requirement | Value for ISP1 | Value for ISP2 | Value for ISP3 |
|---|---|---|---|
| Loss | 5% (violation) | Not available | Not available |
| Latency | 140 ms | Not available | Not available |
| Cost | In compliance | In violation | In violation |
| Max Usage/as | 5 Mb/s | 5 Mb/s | 5 Mb/s |
| Measured | 2 Mb/s | 4 Mb/s | 5.5 Mb/s |
| Latency | (compliance) 100 ms | (compliance) 100 ms | (violation) 100 ms |

In this case, ISP1 is in a violation state since loss of 5% exceeds the maximum loss requirement of 2% and since loss has been designated with the precedence of 10, with 50 being the lowest. Corrective action must be taken. The policy will be enforced without latency or loss information (i.e., because there is, for example, no visibility into the performance of the other links). In this case, the controller may initiate active probing using the active calibrator to determine whether the other ISPs (including ISP2 and ISP3) are in compliance. Alternatively, the controller might determine the course of action based on the next parameter in the policy where the requirement is known (e.g., cost in this case). Since ISP 2 is in compliance and ISP 3 is not, ISP 2 would be chosen by the controller. If the two were both in compliance, the controller would go to the next ranked requirement, which is MaxUtil. If this is the case, ISP2 is still selected.

In summary, the policy, such as the above exemplary policy, is input into the controller 205 of FIG. 2 and is associated with, for example, a specific prefix. The general detection method (absolute, baseline/historical, etc.) can be specified as per prefix, thus specifying hard or absolute thresholds for some destinations that are well known, while using a baseline method for other destinations. The policy also defines the resolution method (e.g. procedure) to be used in the combination with performance metrics that must be met before the violation is considered resolved. Other parameters such as cost and utilization thresholds can be set per prefix. This gives the controller an indication of which prefixes should not be moved for cost or utilization reasons and which prefixes should be moved under any circumstances.

In order for controller 205 to handle peering connections, controller 205 communicates with the data director 220 to retrieve reachability information (i.e., routing tables) for the specific prefix that is about to be changed. In the case of transit circuits, controller 205 uses active calibrator 207 to determine reachability information (i.e., routing tables) for a given destination by, for example, sending active probes to the destination and then waiting for the response. Although peering connections can often be unreachable, it is possible for active probes to succeed since some providers may not effectively filter traffic at a peering point and instead rely on an honor-like system to ensure that only traffic to those advertised destinations is received.

Figure 14:
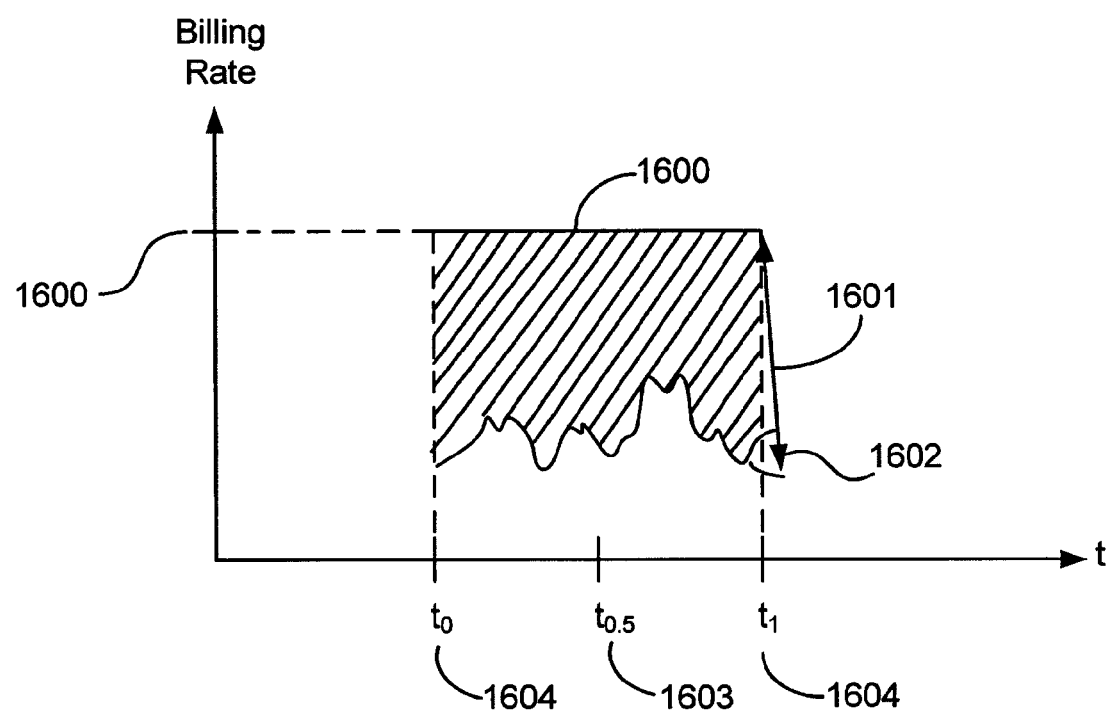
FIG. 14 is a graphical representation illustrating an exemplary method to determine the amount of bandwidth available that can be used without additional cost in accordance to the present invention.

FIG. 14 illustrates how the availability of "free" bandwidth is expressed for a given provider and as measured by usage collector 214 of FIG. 2. Over any given time period from t0 though t1, current usage rate 1602 and the current billable rate 1600 is determined. As shown, time point t0.5 1603 represents an over-sampled time point. Difference 1601 between these two values represents an amount of bandwidth available to be used without incurring any additional cost (i.e., "free" bandwidth). The free bandwidth per provider can be used to select a subset of compliant providers when a performance-based policy is in violation by the current or default provider. Additionally, this information can be used to apply cost and/or load-based policies for each provider.

FIG. 15 depicts how usage collector 214 calculates the time-continuous billable rate as shown in FIG. 14. Most providers start out with a minimum commitment level 1710. If the current usage starts out below that commitment, the free bandwidth 1711 is shown below level 1710. Samples are collected at twice the provider sampling rate, for example, to ensure that an accurate rate is being calculated (i.e., this is a conservative estimate and if the rate deviates from the provider rate, it will be higher and represent an overestimation of the billable rate). The small tick marks on the time axis represent the samples collected by the system (i.e., over-sampling). When enough samples are collected, the billable rate, which generally can be expressed as the $95^{th}$ percentile of most or all rate samples, may exceed the minimum commitment as shown by successively higher tiers 1713 of the billable rate in FIG. 15. When the traffic drops back down below this rate, a new billable rate 1714 is set and the system again has free bandwidth 1718 below level 1714 available for use.

Figure 16:
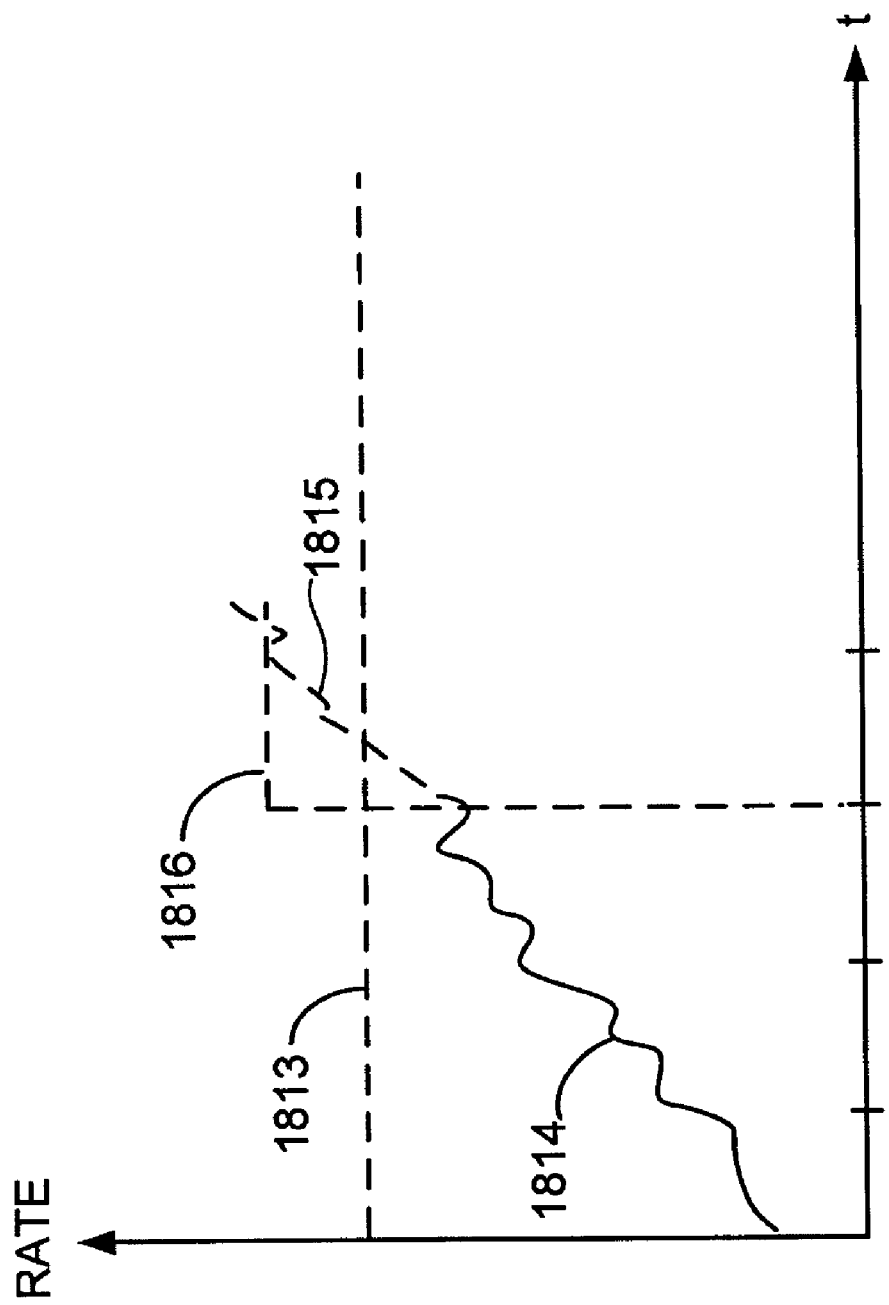
FIG. 16 is a graphical representation depicting an exemplary method to calculate billable rates using short range forecasting in accordance to the present invention.

FIG. 16 shows how an exemplary system 200 can detect a cost-based policy violation. Suppose the cost policy requirement is defined to be an absolute threshold, as shown by 1813. This threshold can be an absolute rate or a set dollar amount to spend (which is converted by the system to an average billable rate). On a sample-by-sample basis, the actual traffic rate 1814 should be such that a new billable rate above 1813 is never established. Using short range forecasting techniques, the traffic rate for the next few samples 1815 can be forecasted, and if this forecast predicts that a new billable rate 1816 will be established, controller 205 of FIG. 2 can react by moving traffic off of this provider. In some embodiments of the present invention, using data contained in a routing table enables data traffic flow to be altered between multiple providers in a multi-homed networking configuration. Using convergence point analysis, which is described below, some embodiments of the present invention can improve the efficiency of conventional data traffic flow techniques and technologies so as to maximize efficiency by reducing the amount of traffic, particularly where multi-homed networking configurations exist.

In accordance with one embodiment of the present invention, an exemplary method and system establishes a reference for monitoring the performance of candidate paths over which data flows between a source and a number of destinations within, for example, a particular address space. The paths are monitored to determine whether the associated flow characteristics, such as performance, cost, bandwidth, and the like, are suitable for routing data in accordance with a policy. As candidate path performance changes over time, such as degradations in performance, the method and system changes the routing of data.

To establish a reference, the topology of the network and its candidate paths are discovered by, for example, "path tracing." That is, the network topology is identified by the structural and/or functional features of the candidate paths, including nodes on each of the paths. In one embodiment, one or more discovery probes "trace" the paths of available candidate routes. To trace the paths, discovery probes generate data for distinguishing the candidate paths by identifying the nodes on the paths and by comparing path performance (e.g., in terms of flow characteristics). This data can be gathered and stored in the exemplary data structures of FIGS. 20C, 21A and 24, as described below, for route control purposes. The results of path tracing can yield data representing characteristics (e.g., RTT, loss, etc.) from which candidate paths can be described. Statistical analysis of the data gathered from path tracing can be used to construct (i.e., model) and identify available candidate paths in which to route data over. One having ordinary skill the art should appreciate that other methods of discovering candidate paths are within the scope of the present invention.

In one embodiment of the present invention, a discovery probe is a path trace probe configured to determine at least the performance characteristics associated with a candidate path. Path trace probes can also be used to identify nodes (e.g., network elements or the like), address spaces (e.g., subnetworks), specific destinations (e.g., identified by a unique network identifier, such as a "/32" IP address), and other aspects of a network. Once discovered, the information obtained from path traced probes can be considered in the decision on how to select appropriate paths for optimal route control.

In another embodiment, an exemplary flow control system is configured to use passive flow analysis, as described above, to identify and characterize the performance of candidate paths. Hence, passive flow analysis and discovery probe path tracing can both be used to obtain data flow information, such as data path latency, round trip times (RTT) in data pathing, and other like characteristics. This information is useful in generating a topological model or map of candidate paths from which to guide data routing decisions. As will be shown, by leveraging topology information aggregated in routing tables or other data structures, for example, according to an exemplary method of the present invention, the volume of monitoring probe traffic can be reduced, which, among other things, minimizes triggering security measures unnecessarily. Moreover, appropriate lengths of advertisements can also be determined to route data according to an optimized aggregation of destinations (e.g., destinations described by subset of addresses). With optimized aggregation of destinations, computational overhead (computing power, memory, etc.) is reduced.

Once candidate paths are discovered and described, each candidate path is evaluated to identify a reference to monitor data flows. For example, the reference could be any common node that is associated with two or more paths. A common point or node where at least two candidate paths intersect, or converge, is referred herein as a "convergence point." A property of most convergence points is that between a node designated as the convergence point and a destination each of the candidate paths share the same path. That is, the diversity in each of the candidate paths become non-existent (i.e., path diversity is zero). Since the nodes located between the convergence point and the destination are the same on non-diverse portions of the candidate paths, only the convergence point need be monitored (e.g., by active probing) to determine the flow characteristics along the candidate paths between a source and a destination.

Figure 18:
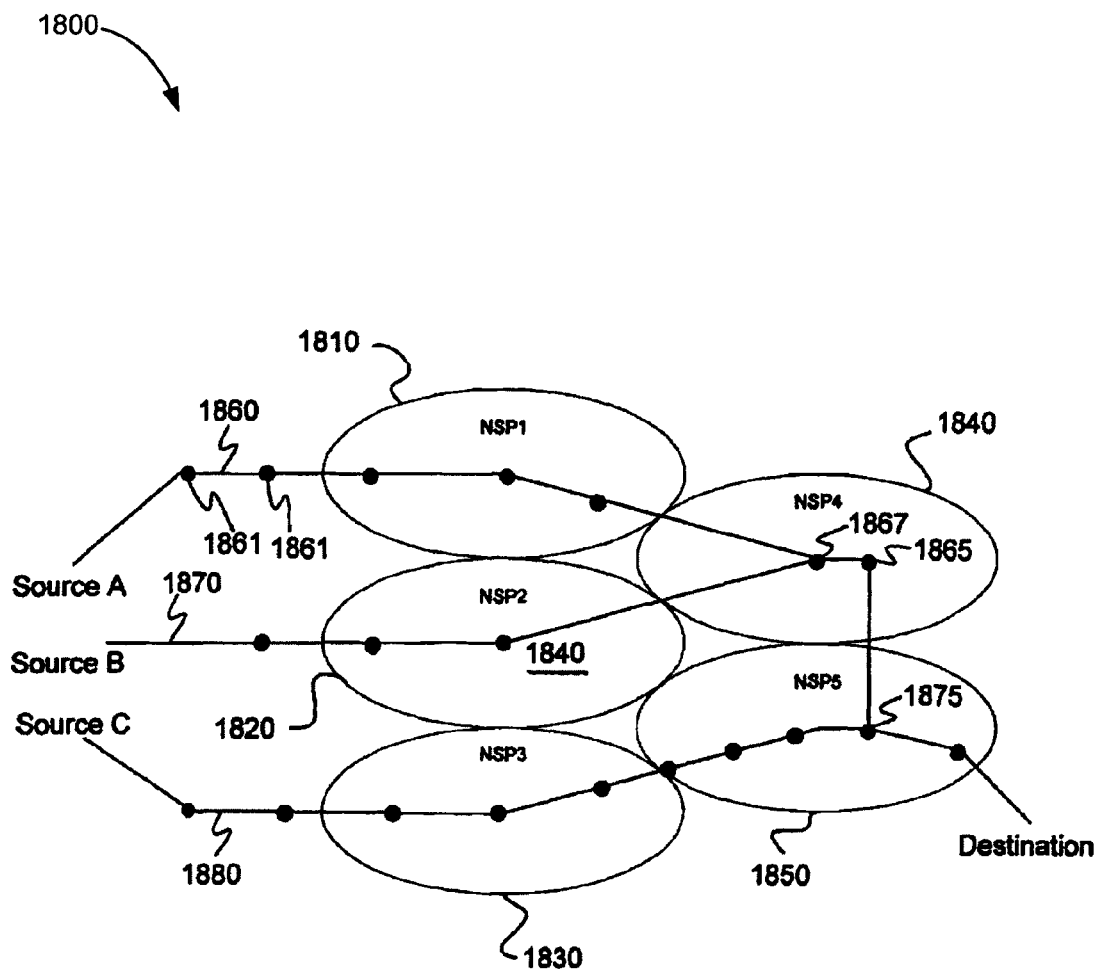
FIG. 18 illustrates an exemplary embodiment of a simplified data network path illustrating three data paths through several network service providers in accordance with the present invention.

In accordance with convergence point analysis methodologies of the present invention, convergence and sub-convergence points are identified and monitored to determine an efficient data route. Sub-convergence points are points that have less than the largest number of paths that converge into a non-diverse path portion. For example, node 1867 of FIG. 18 is sub-convergence point since only two paths of interest converge at node 1867, whereas three paths intersect at node 1875. With three paths (i.e., the largest number of converging paths) converging at node 1875, this node is denoted as the convergence point.

In one embodiment of the present invention, convergence points are used to monitor one or more addresses aggregated in a specific address space that can be identified by a destination prefix, which can be monitored by one monitoring probe, such as an active probe. In another embodiment of the present invention, a convergence point can be monitored for addresses associated with multiple destination prefixes. For example, a convergence point can be used to monitor a specific destination described by 10.0.1.124/32 as well as other destinations included in an address space identified as 10.0.1.0/22, which includes multiple subnetworks, one of which is 10.0.1.0/24. In some embodiments, multiple path traces to a convergence point over multiple paths can be employed to determine at what level of granularity is optimum at which to aggregate a set of addresses. The resulting aggregated set of addresses can also be referred to as an address space. An exemplary convergence point analysis methodology is further described below with regard to FIGS. 21A and 24, with particular use of convergence point and next hop information, respectively. Convergence point analysis is designed to at least reduce much of the overhead associated with sending numerous active probes to cover most or all of the destinations.

Once path trace probes discover candidate paths between a source and a destination, and the network topology is defined, convergence points can be established to provide a reference for monitoring path performance. By monitoring the reference as a probe point, the number of active measurements that encounter network security measures, such as filtered probes, are reduced. It should be noted that "a source" can refer to one or more entities that generally provide data flow. A source can also refer to a network element, such a router, for communicating data along the paths. Further, a source (such as Sources A, B, and C below) can also refer to egress routers associated with (and sometimes a hop within) a specific NSP. "A destination" can refer to a single destination (e.g., IP address) as well as an address space in which a subset number of destinations (i.e., subset of IP addresses) reside. The terms source and destination can be used interchangeably.

In some embodiments, convergence points can be used to provide a reference where nodes cannot be identified and/or are nonresponsive. Nonresponsive nodes hinders the development of a comprehensive understanding of the network topology. Without compensating for the loss of identifying nonresponsive, route control most likely will not be optimal.

Nonresponsive nodes are observed when a candidate path includes a data filter, a firewall, or any other security or traffic minimization mechanism. An example of a nonresponsive node is a node that filters traffic in accordance with a NSP's policy. By using convergence points as a reference probe point proximate (e.g., one node or hop from a nonresponsive node) to the nonresponsive node, paths downstream (i.e., between the convergence point and destination(s)) can be characterized for purposes of route control.

As will be described below in connection with FIGS. 22 and 23, for example, specific embodiments of the present invention provides for improved route control techniques over that of conventional route control techniques in that security features of destination networks are neither alarmed nor triggered in response to excessive active probing.

After candidate paths are discovered and convergence points identified, the convergence points are monitored to determine whether a path over which data is routed is compliant with at least one policy (i.e., flow characteristics are within acceptable service levels). Active probing of a convergence point application yields, for example, RTT, loss, latency, as well as other performance characteristics for the diverse portion (i.e., between the source and a convergence point) of the network path(s). Consequently, the result(s) from a single active probe can be reported for prefixes sharing a convergence point without actively probing nodes associated with each path related to a destination prefix.

Again, by actively probing convergence points where multiple paths intersect, the number of points that need to be actively probed is reduced. This is possible because the convergence points can represent an aggregation of many destinations, where one probe can characterize the path or paths associated with a destination related to the convergence point. Unlike path tracing, which can require diverse probing of numerous different points to discover available paths, active probing in accordance with an embodiment of the present invention monitors specific probe points to determine whether a path's performance has changed. Such changes can prompt a route change from the current path over which data is routed to another path that can alleviate at least the non-compliant performance characteristic associated with the current path. Such route changes can be implemented by an exemplary system described in connection with FIGS. 2, 25, etc.

In accordance with an exemplary convergence point analysis method of an embodiment of the present invention, active probes are generated by the active calibrator (FIG. 2) and are directed to probe a specific convergence point. In other words, this reduces the need to generate large numbers of probes for relevant addresses associated with shorter advertisements (again, shorter advertisements of addresses and netmasks are indicative of larger amounts of addresses that require probing) that otherwise are subject to probing. In conventional systems, by contrast, a large volume of active probes are required to determine acceptable, alternate candidate routes. The corresponding large volume of active probing can themselves thereby degrade network performance by congesting routes. Additionally, increased amounts of probes may be unwittingly generated if a point fails to respond to active probing. As discussed above, path trace probing can determine which probed nodes are convergence points. When discovered, the active calibrator of an exemplary flow control system generates and sends an active probe to a convergence point. When determined, the convergence point is monitored for changes using active probing (i.e., by periodically sending an active probe to the specific convergence point).

FIG. 18 is representative of several data networks for which route control in accordance with an embodiment of the present invention can be employed. An exemplary network arrangement 1800 of five network service providers (NSPs) 1810, 1820, 1830, 1840, 1850 is shown along with three distinct data paths 1860, 1870, and 1880. The three candidate paths 1860, 1870, 1880 represent data paths traversing NSPs 1810, 1820, 1830, 1840, 1850 to transfer data between a source and a destination. Along each data path are numerous nodes or "points" 1861 which represent connective points in the transmission of data via one or more network. The portion of a path between two nodes can be a "hop," but is not limited as such. A route can also be composed of several hops between a source and a destination node.

Again, convergence points, generally embodied as nodes on a network topology, are located at the intersection of two or more converging data routes. The use of convergence points, as described above, according with an embodiment of the present invention enables the determination of the most efficient data route or routes between a source and a destination along a network topology where multiple data paths are present. Convergence point analysis will be described in greater detail below in connection with FIGS. 18 through 28 below.

In FIG. 18, three distinct data paths are illustrated. Data path 1860 extends from the source through NSP1 1810, NSP4 1840, and NSP5 1850 to the destination. Data path 1870 extends from the source through NSP2 1820, NSP4 1840, and NSP5 1850 to the destination. Data path 1880 extends from the source through NSP3 1830 and NSP5 1850 to the destination. A source data flow is communicated first through NSPs 1810, 1820, 1830. Data then passes through NSPs 1840, 1850. In a multi-homed situation, source data flows can enter a data path through multiple NSPs which, although not shown in FIG. 18, is not meant to be a limitation of the present invention. In FIG. 18, though, data path 1870 intersects with data path 1860 at convergence point 1867. Path trace probes can be transmitted along data paths 1860, 1870, and 1880 to discover any convergence point, such as 1867 or 1875. Responsive probe data is received from path trace probing one or more points along data paths 1860, 1870, and 1880 to construct available candidate paths. In particular, active probing of convergence points and responsive data is analyzed by active calibrator 208 and controller 205 to efficiently control data routing, as described above with regard to controller 205 of FIG. 2. Multi-homed organizations such as a business enterprise with widely-dispersed geographic resources using multiple network service providers can be associated with sources A, B, and C in FIG. 18 from which to communicate data via the NSPs shown.

In other embodiments of the present invention, active probes can be sent to a node that is proximate to (e.g., one hop away from) the destination. In this embodiment, a destination (or intermediate node) may have failed to respond to active probing and answer packets, resulting from network administrative measures such as a firewall or filtering of packet data.

NSPs 1810, 1820, 1830, 1840, and 1850 can represent distinct communication networks that provide and operate backbone components of various electronic data networks such as the Internet, Arpanet, etc. Examples of NSPs include AT&T, Cable & Wireless, Sprint, UUNet, Verizon, Deutsche Telekom, British Telecom, and others, but the invention is not intended to be limited to these companies.

In the example illustrated in FIG. 18, data paths 1860 and 1870 converge at convergence point 1867. Moreover, the hop(s) and path portion between points 1867 and 1875, which include node 1865, has a network path diversity equivalent to zero because both paths no longer have diverse paths (i.e., both points share a hop). At a node in NSP5 1850, all three candidate paths converge at convergence point 1875. Where the remaining path to the destination is common, performance experienced on this segment of the data path will be common for candidate paths. That is, the network path diversity for each data path 1860, 1870, and 1880 is zero.

Figure 19A:
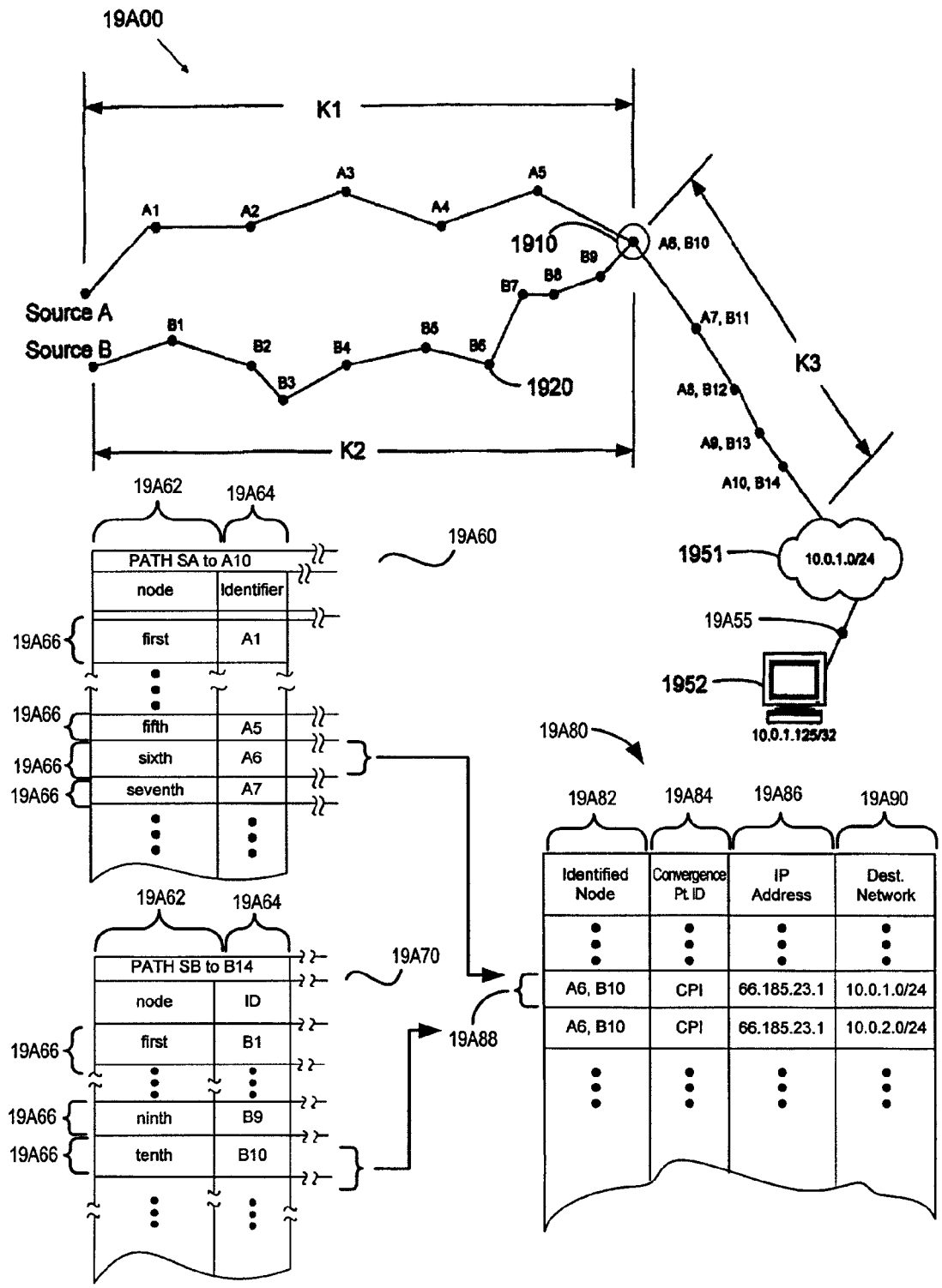
FIGS. 19A, 19B, 19C, 19D, 19E, and 19F, collectively

FIG. 19A is an illustration of nodes associated with exemplary network 19A00 including candidate paths A and B. Although individual nodes are represented, such as A1, B1, B2, etc., one or more nodes can be included in a single AS, thus representing a single hop across that AS. Typically, however, a single hop can be represented between each node along paths A and B. Although represented in FIG. 19A for purposes of illustration and explanation, one of ordinary skill in the art would comprehend that the path portion between each of the nodes need not necessarily limit its representation to a hop.

Exemplary network 19A00 of FIG. 19A illustrates two sources (Source A and Source B) and a specific destination computing device 1952 having a specific IP address of 10.0.1.125/32. Computing device 1952 is associated with address space 1951, which can be described as 10.0.1.0/24. Also shown are exemplary data structures 19A60, 19A70 and 19A80, which can reside in repository 2511 of FIG. 25 (but are not limited thereto), for relating data representing nodes characteristics, such as node identifiers. Although each node in 19A60 and 19A70 is represented as a number, such as "first, second, etc.," the nodes can also be distinguished by their relative distance from the source, hop count, by TTL values over each path to reach a convergence point (e.g., convergence point 1), or any other known method of distinguishing such nodes.

Data structures 19A60, 19A70 and 19A80 illustrate but one possible way to determine which nodes on candidate paths are convergence points. Data structures 19A60 and 19A70 are designed to store data representing relationships in records 19A66 between each node 19A62 on a path and a node characteristic, such as a node identifier 19A64. In a process similar to that in with respect to 2220 of FIG. 22, a path trace probe is sent to each node encountered along that path, with the results recorded. For example, along the Path A (e.g., from SA to node A10), each node 19A62 such as the " ... fifth, sixth, seventh ... " nodes on Path A will be associated with an identifier 19A64. In this case, identifiers "A5, A6, and A7" are associated with the " ... fifth, sixth, seventh ... " nodes. Similarly, Path B (e.g., from SB to node B 14) is discovered and corresponding nodes identified. The results of discovery can be stored in data structure 19A70.

Figure 22:
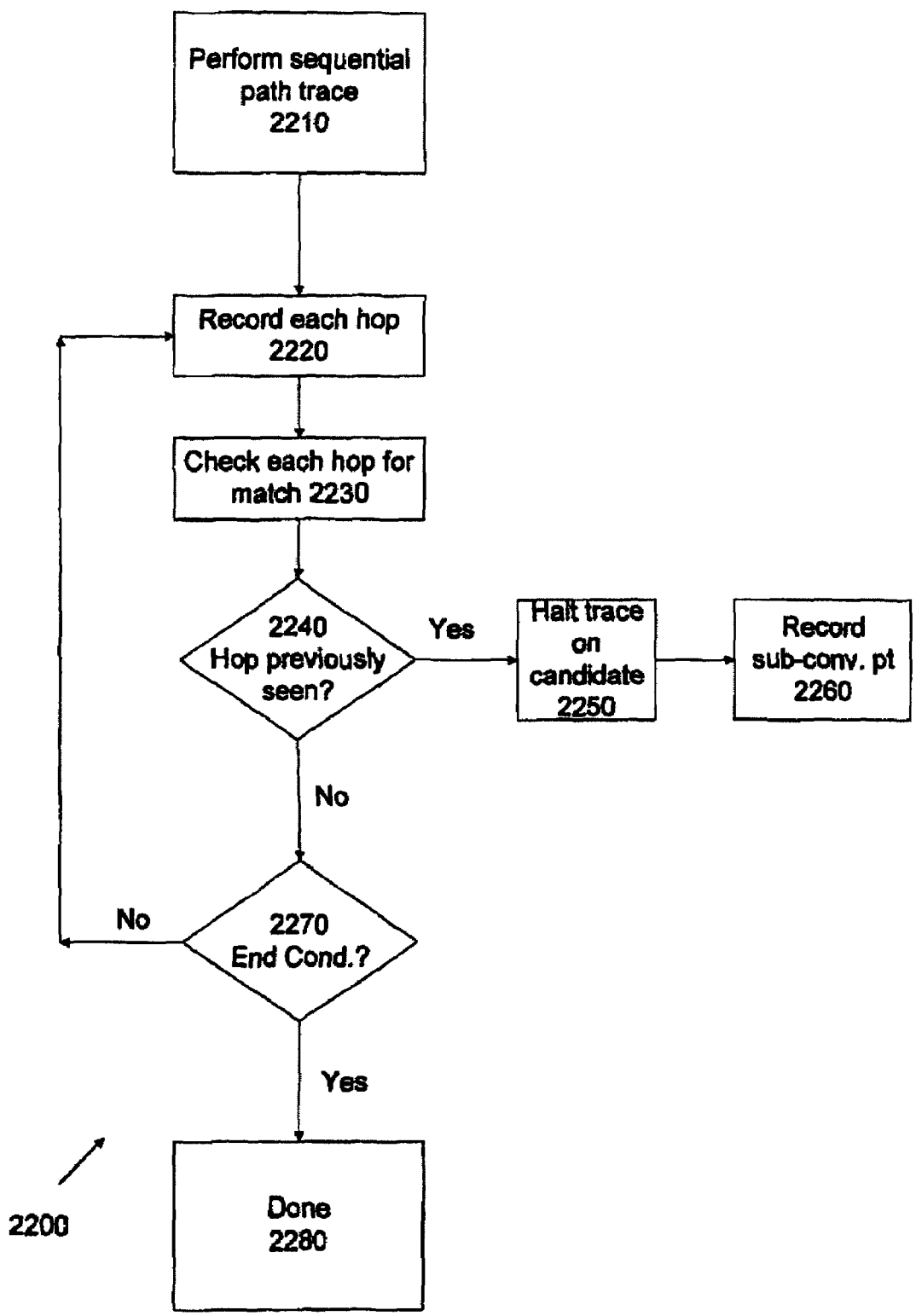
FIG. 22 is a flowchart depicting an exemplary method of collecting path trace information to determine convergence points in accordance with a specific embodiment of the present invention.

Logic within an exemplary flow control system (not shown) is configured to compare each node to determine whether it has been identified, such as described in regard to 2230 of FIG. 22. Data structure 19A80 is used to record an instance when a node on one path is found to lie on another path. In this case, a common point between paths are recorded as an identified node 19A82, such as "A6, B 10" in record 19A88. If the flow control system determines that "A6, B10" is a convergence point, it is so identified and recorded as "CPI" as a convergence ID 19A84 in record 19A88. In this case, if the node identifier is an IP address, the IP address of CP I (i.e., A6 and B 10) can be recorded in 19A86 as "66.185.23.1." Also, data structure 19A80 shows that a convergence point CPI can be associated with one or more destinations 19A90 (e.g., destination network). Here, convergence point CPI is shown to be related to both destination networks 10.0.1.0/24 and 10.0.2.0/24 and thus can be a reference probe point for both. It is noteworthy that identifiers 19A64 can employ an IP address (rather than the alphanumeric label shown in this example) or any other known identification means.

After node 1910 is identified as a convergence point, this node can be actively probed periodically, or as deemed necessary, to determine whether a path to destination 1952 is performing in accordance with the relevant policy. In this example, no other convergence point has been discovered and the path portion from node 1910 to address space 1951 is determined to be non-diverse. And since computing device 1952 resides the address space defined as 10.0.1.0/24, then node 1910 is a suitable probe point to monitor traffic flows between address space 1951 and Sources A and B. Hence, an active probe sent to node 1910 can at least ascertain the performance of a path of interest.

Consider the following example, which illustrates when active probing of node 1910 is performed to monitor traffic flows between a source and a destination. In this case, assume that K1 represents the RTT of 30 milliseconds (ms), K2 represents the RTT of 20 ms and K3 represents a RTT of 20 ms. Further, suppose the policy governing route control in this example has a margin or tolerance of 5 ms. That is, a current route's performance will not trigger corrective action until the performance degrades beyond 5 ms. In practice, such margins are configurable by a user. Note that K3 is common to both Paths A and B and cannot be avoided (data communicated along both paths must traverse the corresponding path portion), since the K3 is associated with a non-diverse path. These RTTs can be determined by actively probing each path from Source A and B to node 1910. With all other flow characteristics begin equal, a flow control system will direct the traffic flow of interest over Path B (i.e., between SB and destination) because its total RTT is measured to be 40 ms (K2+K3), which is more desirable than the RTT of 50 ms (K1+K3) over Path A (i.e., between SA and destination).

At some time later, the convergence point at node 1910 is actively probed and K2 is determined to have increased to 70 ms. But K1 remains unchanged. Since Path B is now less desirable with a RTT of 90 ms than Path A, the flow control system will take appropriate action to route data flows of interest over Path A rather than Path B. For example, the flow control system (not shown) will announce that packets destined to address space 1951 should be routed via a router at Source A. Although RTT was monitored, any other flow characteristic, or combination thereof, can be monitored in accordance with the present invention.

In view of FIG. 19A, and as a further example of the use of convergence points and their relationship to one or more destinations (e.g., address space), consider the following. In this case, node 1910 is no longer a convergence point and node 19A55 is determined to be the only convergence point associated with destination computing device 1952 having an IP address of 10.0.1.125/32. That is, both Path A and Path B converge at a node 19A55. Since node 19A55 is uniquely related to destination device 1952, the active probing of this node does not provide flow characteristics of paths between the source(s) and any other destination. Thus, in this example, active probing with respect to this destination cannot be reduced as is the case when node 1910 serves as a reference for address space 1951.

Figure 25:
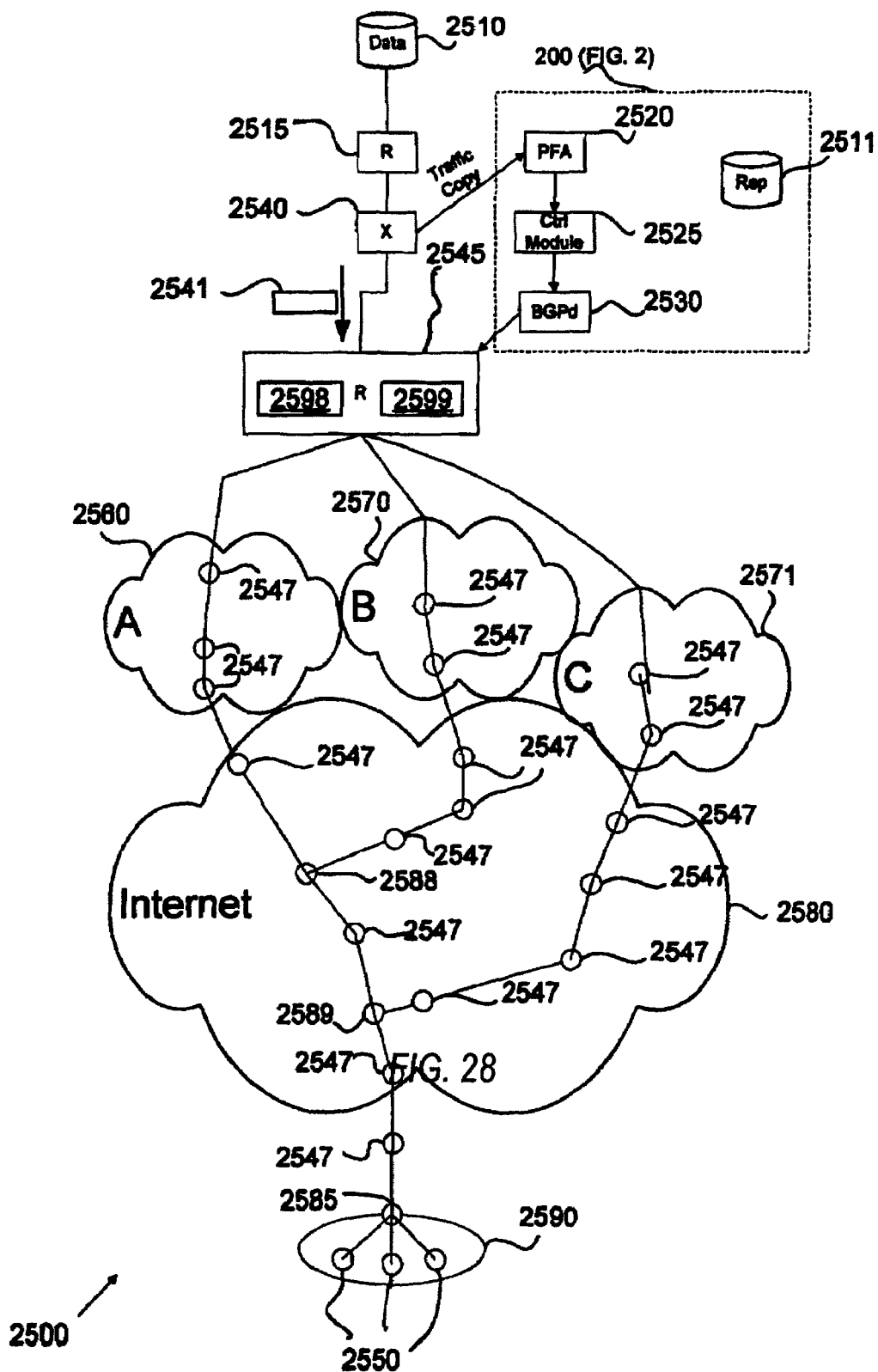
FIG. 25 is a block diagram of an exemplary system for routing data over one or more networks based on convergence point analysis in accordance with a specific embodiment of the present invention.

An artisan of ordinary skill should appreciate that although only two sources are depicted in FIG. 19A, any number of sources is suitable to practice the present invention. Further, each source node Source A and Source B can be, in some embodiments, routers designed to receive announcements from an exemplary flow control system. Sources A and B can be associated with or more entities and/or locations. FIG. 25 illustrates an exemplary flow control system 200 where three source nodes (not shown) each are associated respectively with NSPs A, B, and C. In this case, the sources are associated with a single entity. Further, although machine 1952 is shown as a computer, one skilled in the art should recognize that any network element (e.g., router), subnetwork (e.g., LAN), server, or other destination item can be substituted for destination computing device 1952. Although FIG. 19A (and FIG. 19B) describe specific addresses that in practice may not be used in a manner described herein (e.g., aggregated two address to form a /31 subnetwork), these Figures are for purposes of illustration and explanation. Further the present invention is not restricted to /32 addresses and prefixes, and can accommodate any number of addresses, such as /128.

Figure 19B:
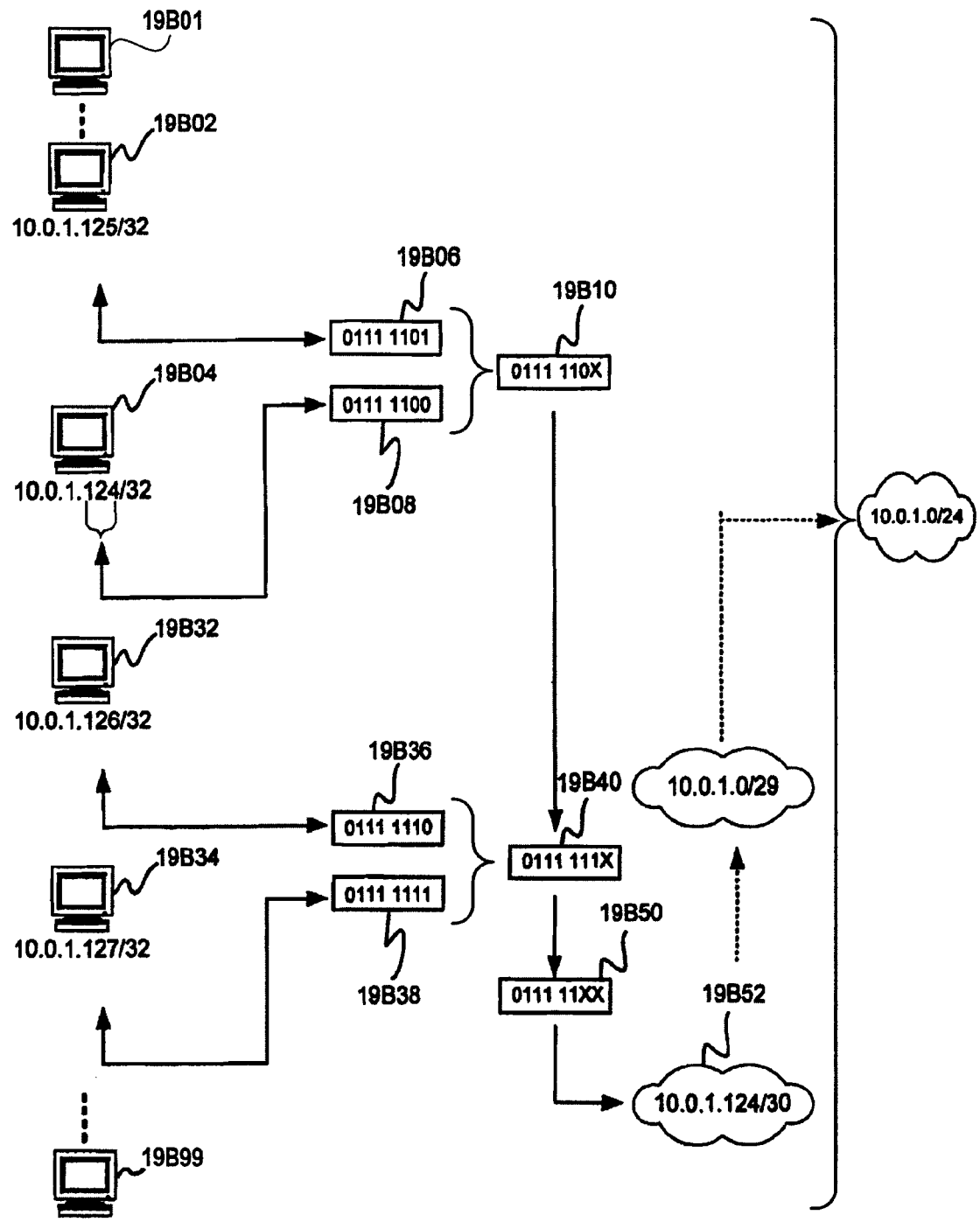

FIG. 19B depicts a relationship of destination devices and/or networks and an exemplary addressing scheme, such as IP addressing, to further illustrate how convergence points can provide a reference for a set of addresses. Although FIG. 19B shows only four computing devices, it should be understood that many more computing devices and/or destinations are possible. Destination devices 19B02, 19B04, 19B32, and 19B34 are respectfully designated with specific addresses 10.0.1.125/32, 10.0.1.124/32, 10.0.1.126/32, and 10.0.1.127/32. Also, destination devices 19B01 and 19B99 represent the first and last machines of 256 computing devices that comprise an aggregated subnetwork identified as 10.0.1.0/24. Generally, contiguous specific addresses such as these are distributed within a common subnetwork address prefix, but for purposes of this example they are not.

In one embodiment, subsets of address (i.e., a smaller address space) are related to supersets of addresses (i.e., a larger address space) in a binary manner. The least significant byte 19B06 of address 10.0.1.125/32 is 01111101 and the least significant byte 19B08 of 10.0.1.124/32 is 01111100. It therefore can be said that the bit boundary (i.e., where the addresses differ only at one bit location) is the least significant bit of both bytes. If this bit is disregarded as "don't care," or "X," then both addresses can be described by a least significant byte 19B10. Similarly, the least significant byte 19B36 of address 10.0.1.126/32 is 01111110 and the least significant byte 19B38 of 10.0.1.127/32 is 01111111. And if the least significant bit is also disregarded here as "don't care," or "X," then both addresses can be described by least significant byte 19B40. Moreover, if the first two least significant bits can be disregarded, then all four specific addresses can be represented by least significant byte 19B50 and designated by address space 19B52 having an address/prefix of 10.0.1.123/30. Collectively, these addresses (i.e., address space) can be monitored by a convergence point. FIG. 19B also shows that all 256 computing devices can be aggregated in increasingly larger networks, such as from 10.0.1.0/29 to 10.0.1.0/24. It should be noted that address spaces related to a convergence point need not be of contiguous addresses or limited to only single bit boundaries (e.g., aggregation can occur for every even prefix, such as /30, /28, /26, etc.).

Figure 19C:
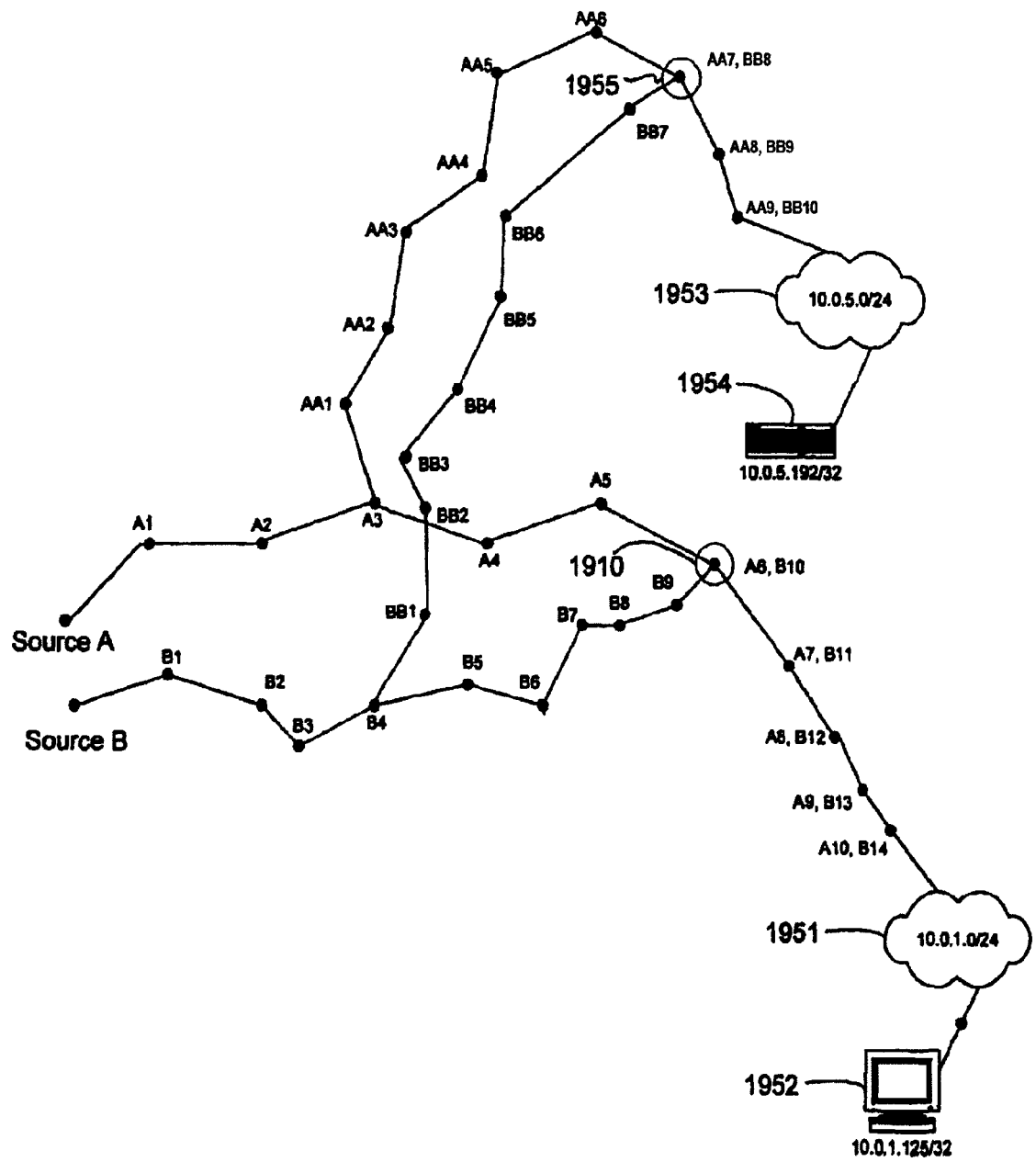
Figure 20A:
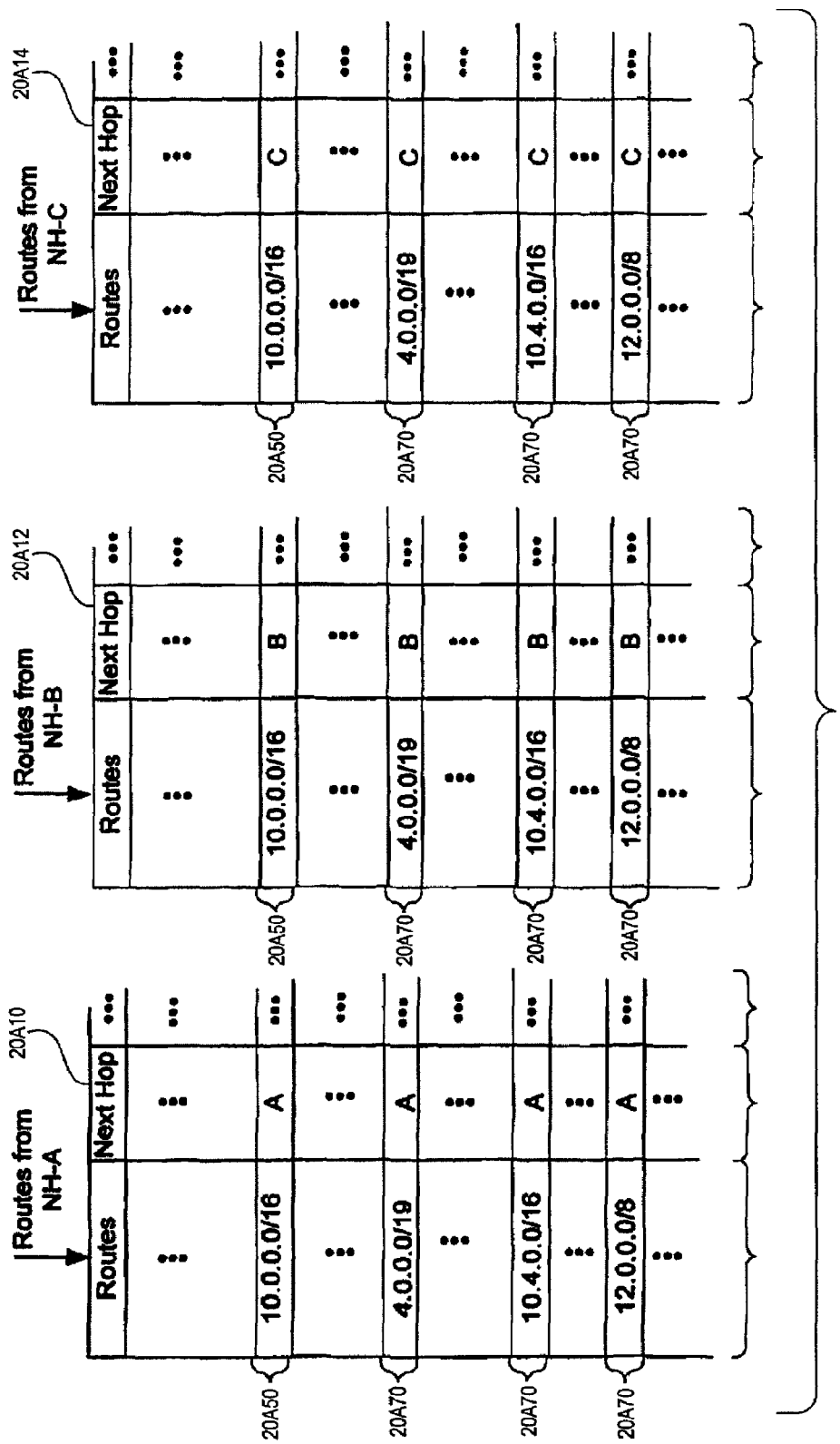
FIGS. 20A, 20B, and 20C, collectively
Figure 20B:
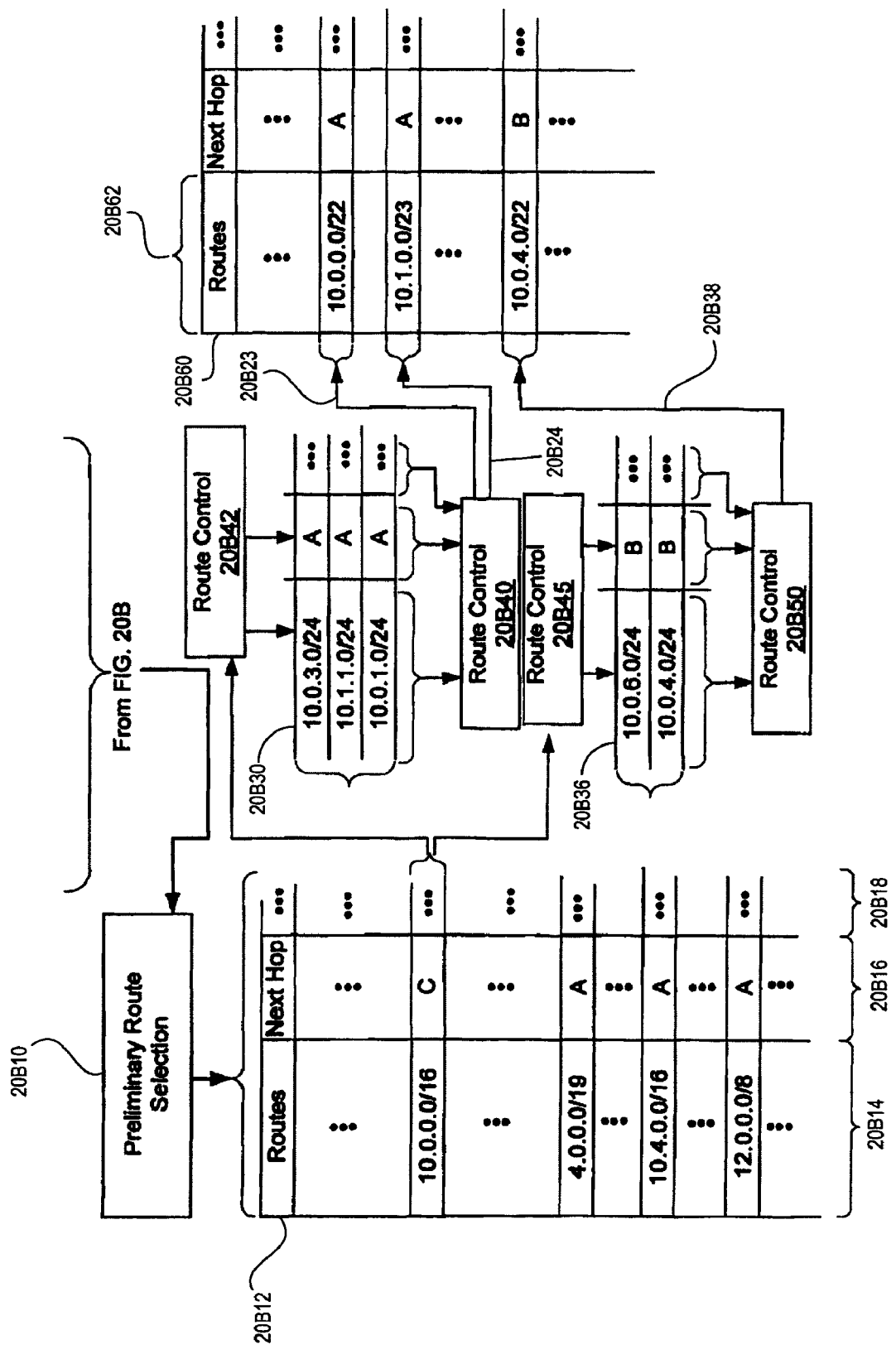
Figure 20C:
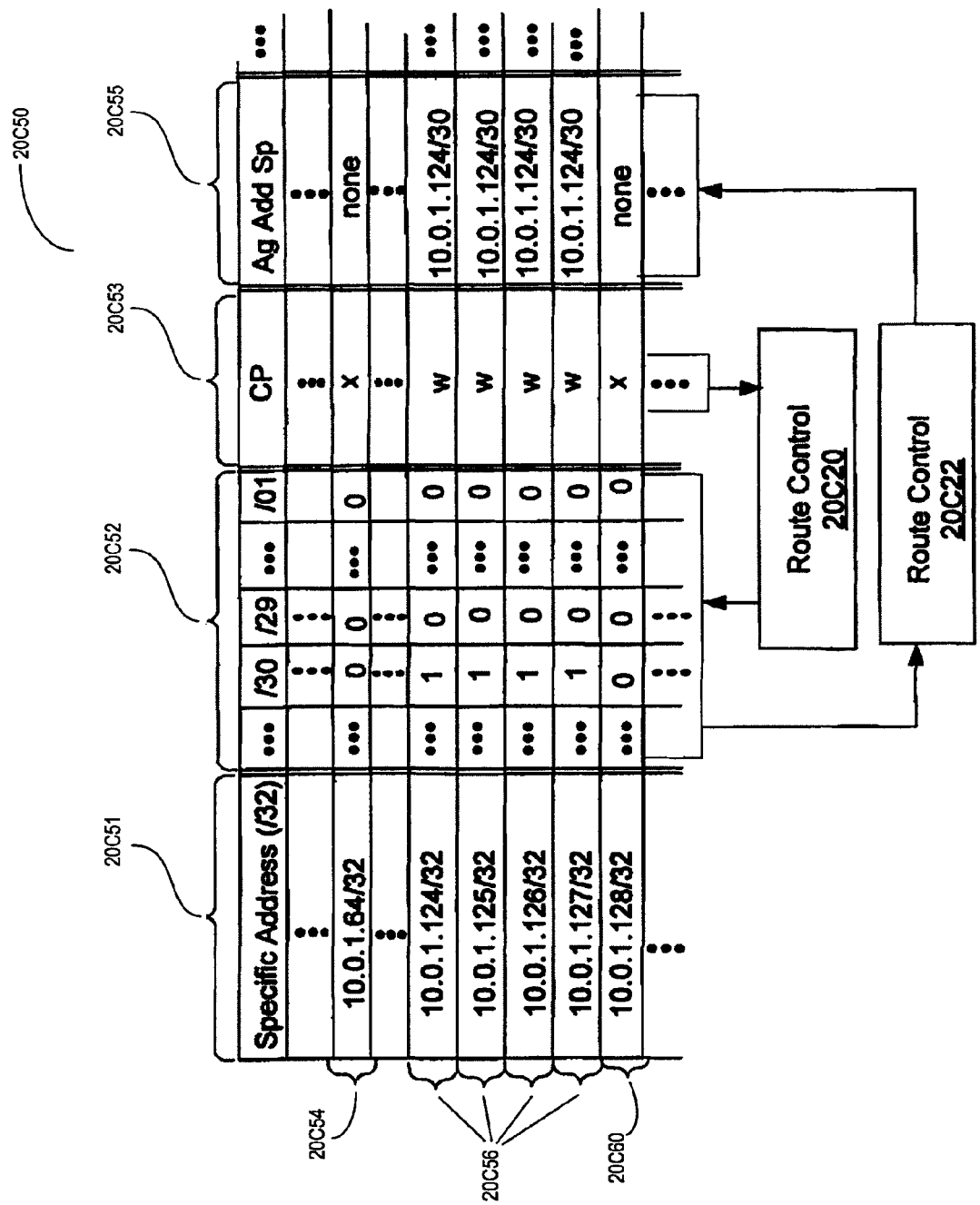

FIG. 20C depicts an exemplary data structure 20C50 for leveraging the relationships between convergence points and addressing schemes to provide for route control in accordance with an embodiment of the present invention. In this example, data structure 20C50 includes specific addresses 20C51 relating to the computing devices of FIG. 19C, which are populated in data structure 20C50. Prefix flags 20C52 indicates whether any of the specific addresses 20C51 can be aggregated to an appropriate prefix level. CP 20C53 includes identified nodes that are convergence points. In this case, data structure 20C50 includes data representing that convergence point "w" of CP 20C53 is associated with each address 20C51 in records 20C56. Addresses 20C51 associated with records 20C54 and 20C56, however, do not include data representing a relationship to convergence point "w." Rather, records 20C54 and 20C60 indicate that addresses 10.0.1.64/32 and 10.0.1.128/32 are not related to a convergence point.

A flow control system includes logic 20C20 to determine whether any of the prefix flags are to be set. Since all the addresses in records 20C56 share convergence point "w," logic 20C20 operates to set the flags to an appropriate level of aggregation. However, since addresses 10.0.1.64/32 and 10.0.1.128/32 are not related to a convergence point, the corresponding convergence point field 20C53 is left vacant.

A flow control system operates, for example, to set the "/30" prefix flags since this level of aggregation sufficiently describes each of the addresses in records 20C56. However, the /30 with respect to addresses 10.0.1.64/32 and 10.0.1.128/32 are not set. Logic 20C22 detects the set /30 prefix flags and then selects and associates a single route announcement of 10.0.1.124/30 to each address for routing data. That is, the flow control system includes logic 20C22 to associate an aggregated address space 20C55 ("Ag Add Sp"), if applicable. In the case of records 20C54 and 20C60, no level of aggregation is set and these routes most likely will announced in accordance with conventional route selection techniques.

Figure 21A:
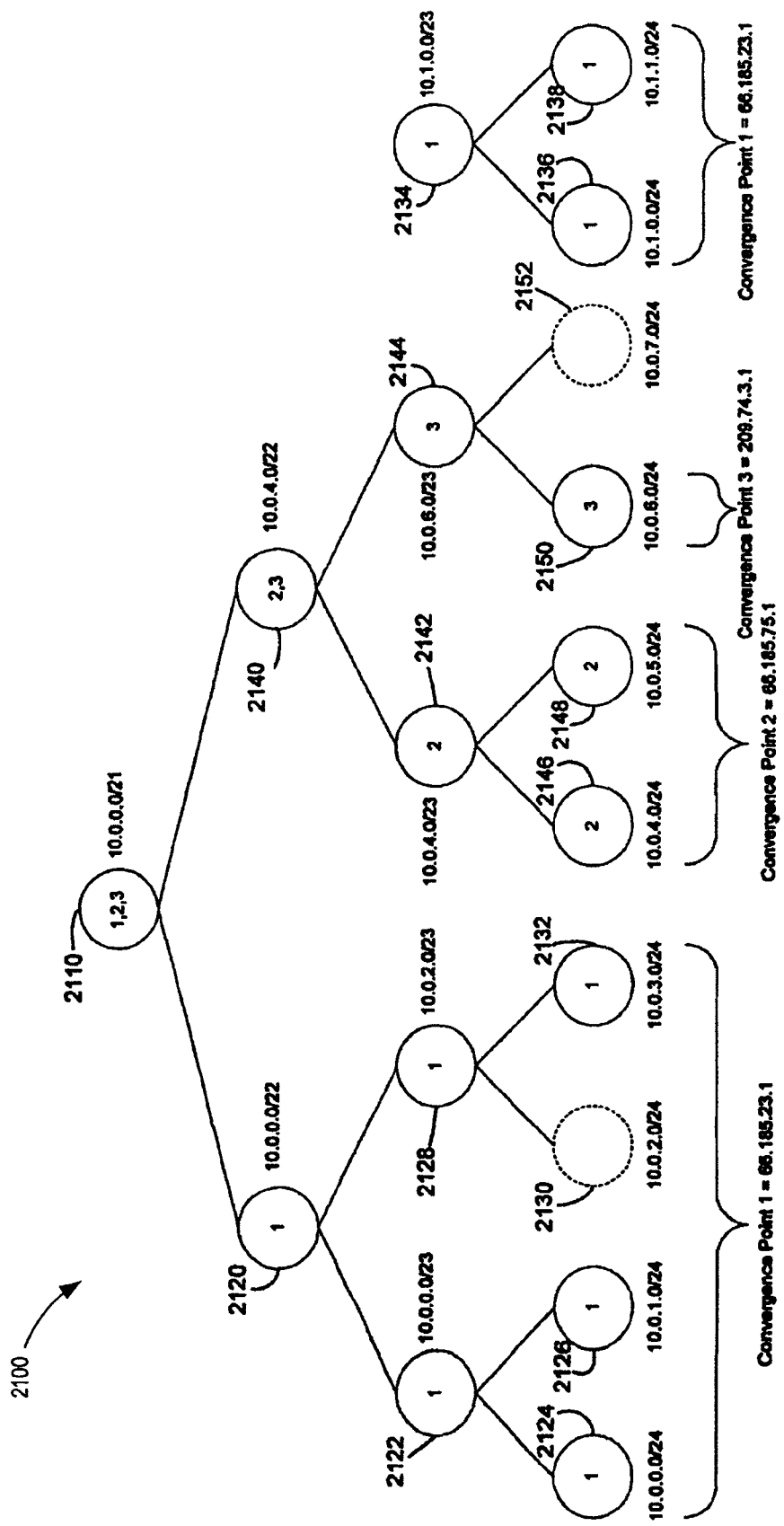
FIGS. 21A and 21B, collectively

With address 10.0.1.124/32 to 10.0.1.127/32 aggregated, each packet 2541 of FIG. 25 that leaves a particular source for one of the specific addresses will be matched to the /30 route and will be directed to the appropriate data path. The data structures shown in FIG. 20C are but one way to associate convergence points to address spaces for the purpose of obtaining an optimize route announcement. For example, FIGS. 21A and 2113 depict an alternate data structure for another exemplary method of obtaining an optimized route announcement in accordance with another embodiment of the present invention.

FIG. 19C depicts an exemplary network 19C00 including at least four paths from Sources A and B to destination address spaces 1951 and 1953. Path A (i.e., SA between address space 1951) and Path B (i.e., SB between address space 1951), as well as convergence point at node 1910, are discovered and identified in a manner similar to that of network 19A00 of FIG. 19A. In FIG. 19C, however, another network is discovered having an address space 1953 defined as 10.0.5.0/24, which includes router 1954 having an IP address of 10.0.5.192/32. The discovery of the network associated with address space 1953 could have been accomplished by passive flow analysis and/or other known discovery techniques, such as using manual methods, netflow, checkpoint, etc. Moreover, a second convergence point is present at node 1955, which can be a reference for address space 1953.

With a convergence point at node 1955, the traffic flows along the path portions SB-B48 (path defined by a portion from SB through nodes B4 and BB8 to a destination, where SB denotes Source B) and SA-A3-AA7 (path defined by a portion from SA through nodes A3 and AA7 to a destination, where SA denotes Source A) can be monitored. And with a convergence point at node 1910, the traffic flows along path portions SA-A6 and SB-B10 can also be monitored. With reference points for each address space, routing of data can be adapted to pick optimal paths according to the topological and/or geographic diversity between destinations. For example, suppose address space 1953 is located around Boston, Mass., U.S.A., address space 1951 is located around San Francisco, Calif., U.S.A., and the source is generally located in Los Angeles, Calif., U.S.A.

By using convergence points associated respective address spaces, data flows can be routed over the most appropriate paths. Between Source A and node 1955 (i.e., path of SA-A3-AA7) and Source B and node 1955 (i.e., path of SB-B4-BB8), active probing, for example, determines that the path of SA-A3-AA7 is most desired to communicate data flows between the source in Los Angeles and the address space in Boston. Whereas, between Sources A or B and node 1910, the path of SB-B10 is the most optimum to route date between Los Angeles and San Francisco.

Without using convergence point methodologies, however, preliminary route selection techniques, such as those performed by BGP, will be employed. In this case, suppose that BGP preliminary route selection determines that the best way to route data from the source to address space 1951 is to announce a route 10.0.0.0/19 to, for example, a router at source A. That is, all packets matched against 10.0.0.0/19 will be routed out Source A. Although this may be appropriate for data flows to address space 1951, this announcement requires data flows to address space 1953 to traverse path SA-A6-A10, which in this example includes path portions in Chicago, Ill. and New York City. Such detours increase transit time, latency, etc. Therefore, while some preliminary route selections by, for example, BGP may be appropriate for some data flows, such route selections hinder other data flows that are required to be routed in accordance with the preliminary route selections. Consequently, convergence point methodology in accordance with a specific embodiment allows for route selections that are the most appropriate for the destinations of interest.

Figure 19D:
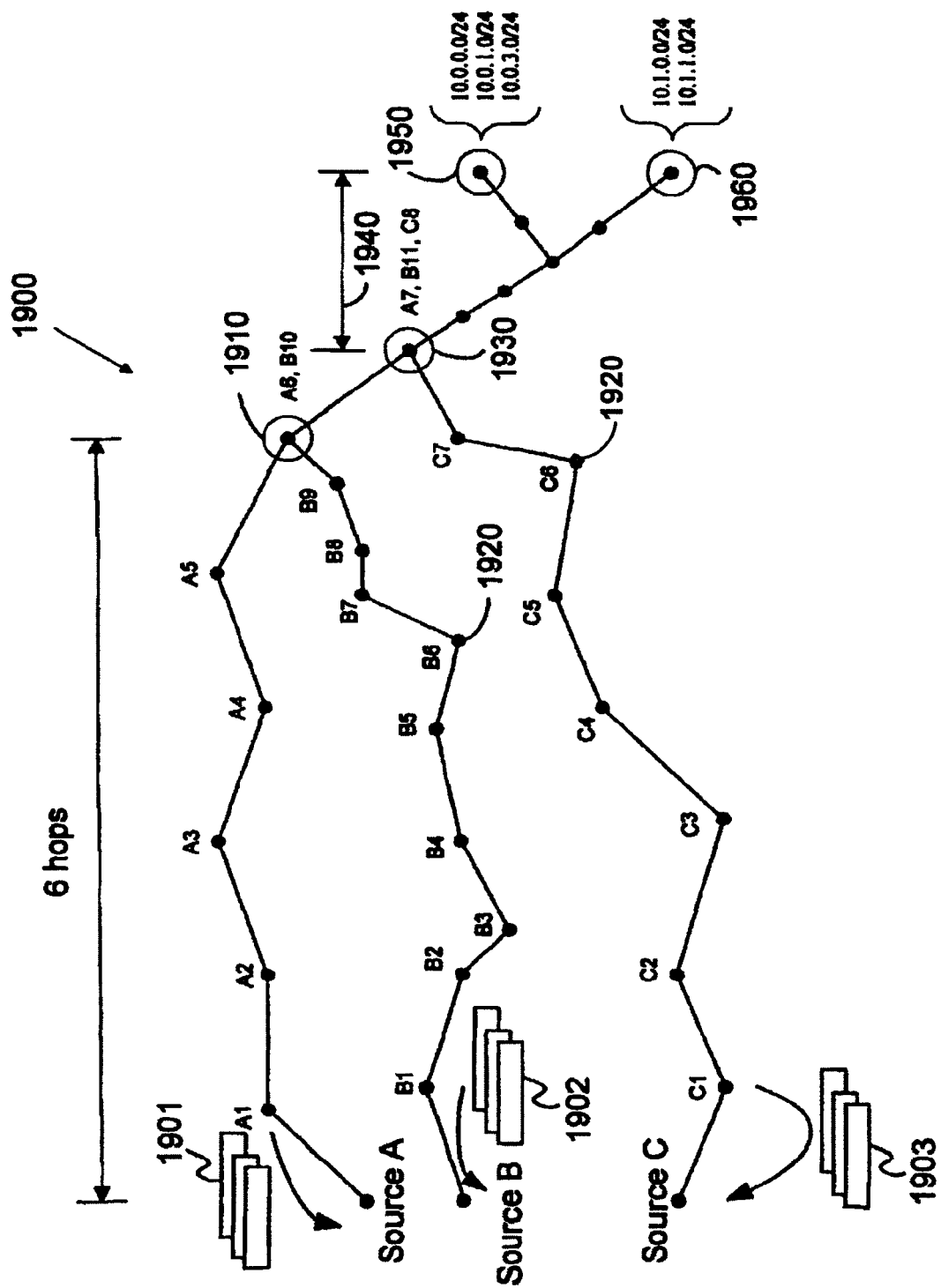

FIG. 19D depicts a network similar to that of 19A00 of FIG. 19A, but includes another source, Source C, another path, and additional address space. Again, a convergence point is a node where at least two paths intersect. For example, node 1910 represents a convergence point for path A (i.e., SA through node A6), path B (i.e., SB through node B10), and path C (path defined by path portion SC through node C8, where SC denotes Source C). In discovering paths, and consequently convergence points, path tracing probes are sent along the paths to discover the available candidate paths. With respect to FIG. 19D, paths A, B, and C represent the available candidate paths in the illustrated example. However, paths A, B and C are of varying number of hops. Path A, up to node/convergence point 1910, represents 6 hops. In contrast, path trace probes Path B only reaches node 1920 after 6 hops from source B, thereby falling 4 hops short of node and convergence point 1910. Path C, ultimately, never reaches the convergence point at node 1910, but instead reaches node and convergence point 1930, and requires 1 hop more than path A to node 1930.

Figure 19E:
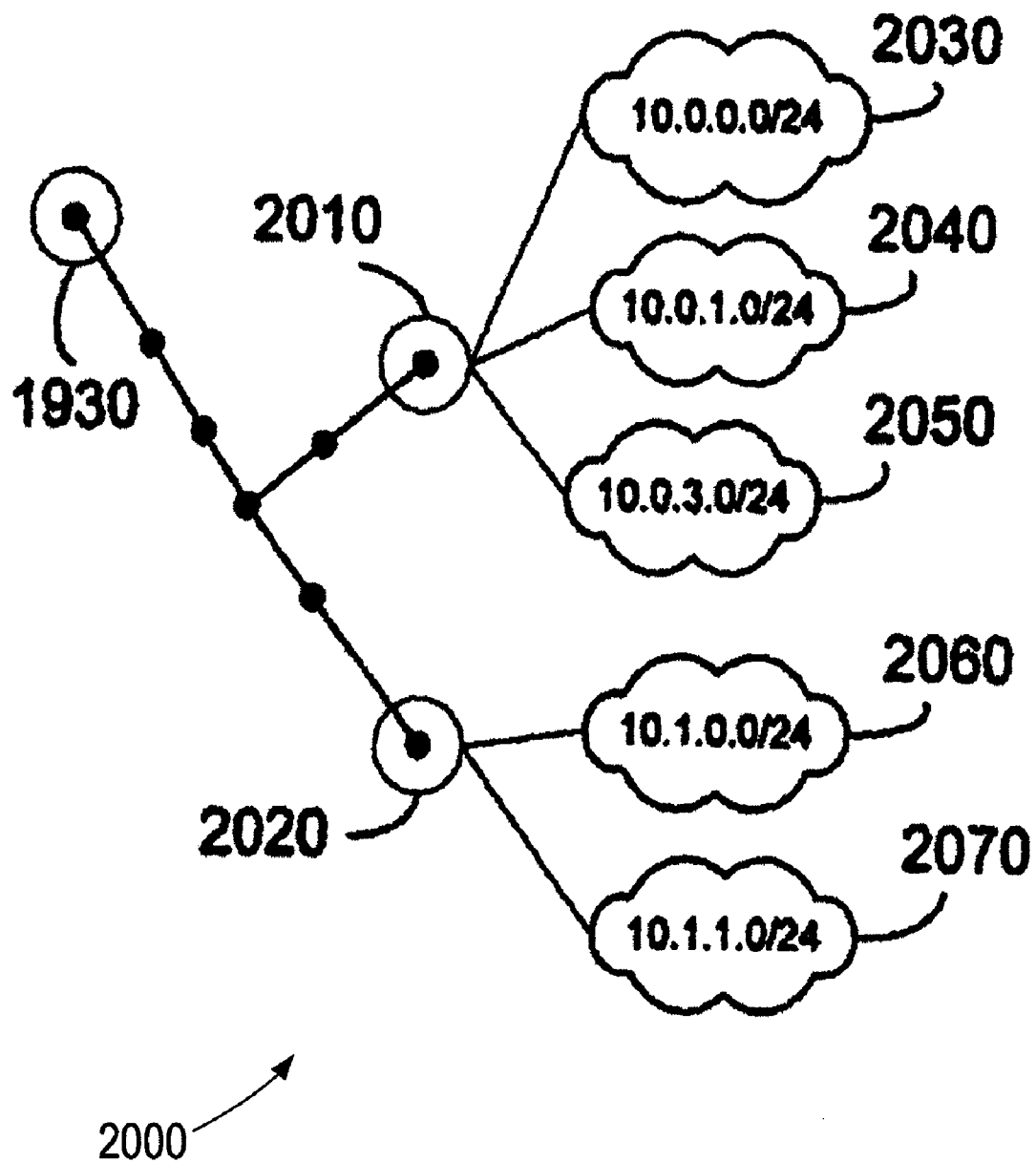

Thus, up through node and convergence point 1930, path A represents the shortest route between the source and destination addresses or address space, since the hop-length is equidistant (1 hop, identified as 1940) from node and convergence point 1930 to destinations 1950 and 1960. Beyond destinations 1950 and 1960, there may be numerous addresses represented only as an aggregate of addresses or address spaces identifying several exemplary IP addresses and prefix, such as 10.0.0.0/24, 10.0.1.0/24, 10.0.3.0/24, 10.1.0.0/24, and 10.1.1.0/24. Further detail of this exemplary address space is depicted in FIG. 19E and discussed below.

Upon discovering the topology of the network routes including convergence points 1910 and 1930, flow control system 200 (FIG. 2) has discovered paths A, B, and C and identified convergence points at nodes 1910 and 1930. Active probes can be generated by active calibrator 208 (FIG. 2) and sent to nodes/convergence point 1930. Responsive data representing node and/or path characteristics (e.g., RTT, loss, jitter, etc.) are generated by active probing and aggregated in a data structure such as a data table, although not limited necessarily to that specific structure (as discussed below in FIG. 26). The data from path traces is analyzed to yield information, such as IP addresses and prefixes identifying a node and convergence point address and prefix. Active probes, in turn, result in retrieving responsive data representing characteristics such as RTT/loss, jitter, and other performance metrics. The responsive data, which represents performance characteristics, is stored in a data structure and referenced for comparison to previous like responsive data to determine whether a control change is required to modify the data traffic flow. If responsive data representing a measured performance metric matches the stored performance metrics, then no change has occurred and a control change may not be required. For example, if responsive data in relation to a specific node is measured to have a RTT of 1 Oms, and if that metric is equivalent to stored responsive data, then no corrective action is required. However, if a difference between the responsive data and the stored performance metrics (received from previous probing) is observed such that the difference is noncompliant or violates a specific policy, then a control change may be required by controller 205 (FIG. 2).

Referring to FIG. 19D, path A will be path traced along its complete length, through node and convergence point 1930. However, active probing will stop at convergence point 1930 because it represents the closest convergence point prior to reaching destinations 1950 and 1960. Path B will be path traced only as far as node and convergence point 1910, as the path diversity with respect to Path A is equivalent to zero from that point onwards to the destination. That is, Path A and Path B share the same nodes from convergence point 1930 to the destination along which data is communicated. Path C will be path traced to point 1930 and, from that point onwards to the destination, will not be path traced.

FIG. 19D also includes route information 1901 from the SA-A6 path, route information 1902 from the SB-B10 path and route information 1903 from the SC-C8 path. This route information can be generated in accordance with any networking protocol, such as BGP, and provides a list of one or more routes for reaching destinations. Such route information is depicted in FIG. 20A. In FIG. 20A, routes received into the source from Source A (i.e., Next Hop A, or NH-A) is stored in exemplary data structure 20A10. Likewise, similar routes to reachable destinations are recorded in data structure 20A12 (with respect to Source B) and data structure 20A14 (with respect to Source C). These data structures will be discussed further below in the context of FIG. 19F.

FIG. 19E illustrates a subset of probe points generated from active and/or path trace probing. In this figure, the data routes between convergence point 1930 and destinations 2010 and 2020 comprise 5 path portions, each of which can be a hop. Regardless of the number of hops or portions of paths A, B, and C prior to convergence point 1930, from thereon, every path has an additional 5 segments between convergence point 1930 and destinations 2010 and 2020, but within a smaller address space. Further, each of the IP addresses beyond destinations 2010 and 2020 are also shown. Sub-destinations, represented by network clouds 2030, 2040, 2050, 2060, and 2070 can include IP addresses of specific destinations beyond destination points 2010 and 2020. These points can represent ingress and/or egress points beyond destination points 2010 and 2020. Examples of sub-destinations may be branch servers within a LAN or WAN, backup servers, hubs, or other components for servicing multiple destinations. The common path portions from convergence point 1930 to destinations 2010, 2020, and 2030 through 2070 contain zero network path diversity.

Figure 19F:
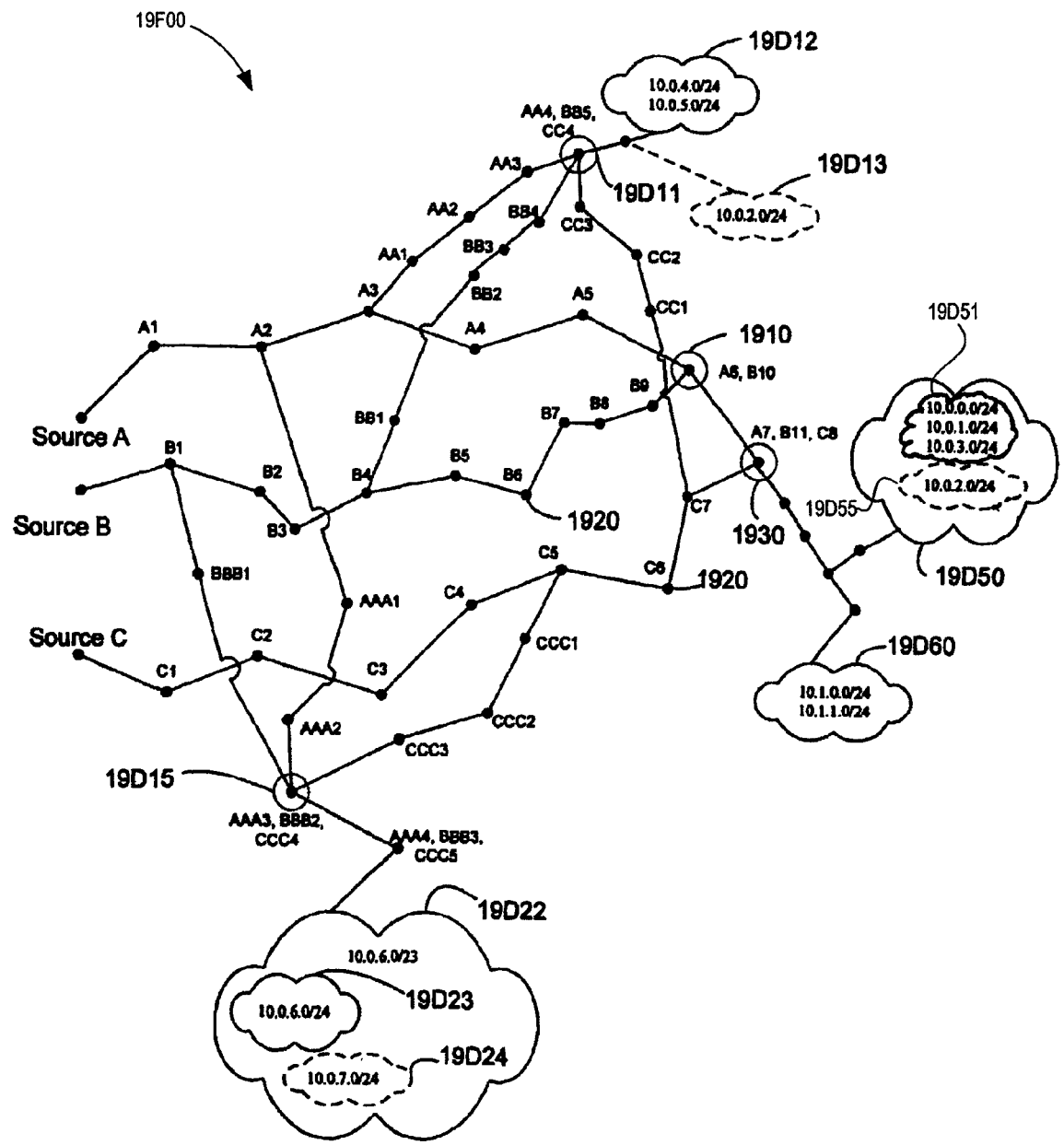

FIG. 19F is a more detailed network 19F00 showing at least nine paths from Sources A, B, and C to three convergence point related to specific sets of addresses. Similar to FIG. 19D, address space 19D50, which includes a small address space 19D51 of subsets of addresses identified by 10.0.0.0/ 24, 10.0.1.0/24, and 10.0.3.0/24, and address space 19D60, which includes subsets of addresses identified by 10.1.0.0./24 and 10.1.1.0/24, are both associated to convergence point 1 at node 1930. Further, the three paths from the sources via convergence point 1 to the destination can be identified by path SA-A7, path SBB11, and path SC-C8.

Further to exemplary network 19F00 is address space 19D12, which includes subsets of addresses identified by 10.0.4.0/24 and 10.0.5.0/24. Address space 19D12 is shown to be related to convergence point 2 at node 19D11 and is reachable from Source A via path SA-AA4, from Source B via path SB-BB5, and/or from Source C via path SC-CC4. Similarly, address space 19D22 identified by 10.0.6.0/23 includes a smaller address space 19D23, which includes a subset of addresses identified by 10.0.6.0/24. At least address space 19D23 is reachable from Source A via path SA-AAA3, from Source B via path SB-BBB3, and/or from Source C via path SC-CCC5, where each of these paths traverses through convergence point 3 at node 19D15.

In one embodiment, address spaces 19D12, 19D51, 19D60, and 19D23 have been discovered by passively analyzing traffic flows between those address spaces and the sources, whereas the candidate paths and the nodes thereof have been discovered by discovery probes. Address space 19D55 identified by 10.0.2.0/24 and address space 19D24 identified by 10.0.7.0/24, however, are not yet discovered. Hence, undiscovered address spaces 1913D55 and 19D24 are shown in broken lines.

In accordance with a specific embodiment, undiscovered address spaces and subsets of address thereof are presumed to be related to the convergence point associated with other address spaces in a binary, parent-child lineage. For example, undiscovered 10.0.7.0/24 is presumed to be a subset of 10.0.6.0/23, and undiscovered 10.0.2.0/24 is presumed to be a subset of 10.0.0.0/22 since other sibling address spaces 10.0.0.0/24, 10.0.1.0/24 and 10.0.3.0/24 share the same parent or superset of address spaces, as shown in FIG. 21A. If, however, address space 19D55 identified by 10.0.2.0/24 is subsequently identified and found not to share the same convergence point (i.e., convergence point 1) associated with address space 19D51, but rather shares convergence point 2 (or any other convergence point other than convergence point 1), then address space 19D13 will represent addresses identified by 10.0.2.0/24.

FIG. 20A depicts exemplary routes received from the discovered candidate paths of network 19F00 of FIG. 19F. For example, routes 20A20 received from paths SAA7, SA-AA4, and SA-AAA3 are recorded in data structure 20A10 along with next hop 20A22 and other information 20A24 that might be used to make routing decisions. Next hop 20A22 information of structure 20A10 are all "As" because the associate routes are reachable from source A. The routes 20A20 reachable via Source B and Source C are recorded in data structures 20A12 and 20A14, respectively. Routes received from Source B into, for example, a flow control system are associated with Next hop B, or NH-B, as shown in Next Hop B 20A22, whereas routes received form Source C are associated with Next hop C, or NH-C, as shown in Next Hop C 20A22.

Records 20A50 indicate that routes to 10.0.0.0./16 can be reached via any Next Hop NH-A, NH-B, or NH-C. Likewise records 20A70 indicate that routes to address spaces 4.0.0.0/ 19, 10.4.0.0/16 and 12.0.0.0/8 can be reached via all Next Hops A, B, and C. Again, such routes can be received by certain networking protocols, such as BGP.

FIG. 20B illustrates how an exemplary flow control system in accordance with a specific embodiment uses route information that is recorded in exemplary data structures 20B12 and 20B60 to optimize the announcements of routes, which in turn, optimizes the routing of data between the source(s) and destination(s). In one example, a preliminary route selection process 20B10 is performed on the data representing routes (and accompanying information, such as next hop, etc.) from tables 20A10, 20A12, and 20A14 in FIG. 20A. Process 20B10 generates data representing routing information that can be populated in at least one data structure 20B12, as shown in FIG. 20B, which illustrates new relationships between routes 20B14 and next hop 20B16 information (as well as other information 20B18 known in the art), for example. In a specific embodiment of the present invention, process 20B10 is performed in accordance with BGP active route selection criteria. It should be noted that process 20B10 is optional in some embodiments and need not be required.

To illustrate the preliminary route selection process 20B10, consider the selection of route 10.0.0.0/16 and its next hop of C, wherein process 20B10 operates to select routes to minimize the number of ASes that data traffic is to traverse. Although the tables of FIG. 20A indicates that routing data to these routes through either next hops A, B, or C (i.e., through sources A, B, or C) is possible, process 20B 10 determines and selects data flows to these routes via next hop C because, in this instance, path SA-A7 (from source A to address space 19D60) of FIG. 19F has the least number of transit AS hops (not shown) for the majority of routes to address space 10.0.0.0/16. Thus, this route is designated to route data through next hop C, which in some embodiments, can be a routing device from which data flows to the destination. Under preliminary route selection process 20B10, this route (i.e., 10.0.0.0/16) will be announced to next hop C for route control.

For routes related to address space 10.0.0.0/16, consider that a convergence point (i.e., convergence point one) was found by route control process 20B42 to be related to a subset of addresses constituting that address. And suppose that routing data according to these more specific addresses (e.g., 10.0.0.0/24 10.0.1.0/24, 10.1.1.0/24, and 10.0.3.0/24) has been determined by route control process 20B42 to provide better data routing with respect to at least one flow characteristic (e.g., for enforcing a policy) than a more general route of 10.0.0.0/16. Further, route control determines that routing data to the more specific address spaces via source A rather than the preliminarily select source C would provide for optimum routing as determined, for example, by passive flow analysis. Route control process 20B42 would then select the more specific routes to route data and/or the optimum next hop, as indicated in data structure portion 20B30.

Next, consider that a route control process 20B40 in accordance with a specific embodiment operates to further optimize data representing the route announcements 20B30. Given the topological information available to an exemplary flow control process, such as the information described in regard to FIG. 19F, the flow control process can operate to optimize the route announcement for routes 10.0.3.0/24 and 10.0.1.0/24. Since address space 19D50 of FIG. 19F is presumed to represent destination address spaces 10.0.0.0/24 10.0.1.0/24, 10.0.2.0/24, and 10.0.3.0/24, address space 19D50 can be identified as 10.0.0.0/22. Hence, data representing an updated route announcement 20B32 will be placed in data structure 20B60 as route 20B62, which is used to route data flows and packets therein. For flows going to 10.0.0.0/24, 10.0.1.0/24, and 10.0.3.0/24, the packets destined to addresses represented as 10.0.0.0/22 will be directed accordingly via next hop A. FIG. 21A illustrates an example of how the optimized route can be determined.

In addition, route control process 20B40 operates to optimize data representing route announcements 20B30 for route 10.1.1.0/24. Since address space 19B60 includes 10.1.1.0/24 and 10.1.0.0/24, this address space can be identified as 10.1.0.0/23. Accordingly, data representing an updated route announcement 20B34 will be placed in data structure 20B60 as route 20B62, which is used to route data flows and packets therein to address space 19B60. Again, FIG. 21A illustrates how this route can be optimized for routing data.

In another example, consider that route control 20B45 determines that at least two subsets of addresses (e.g., 10.0.6.0/24 and 10.0.4.0/24) constitute the address space defined by 10.0.0.0/16. Further, suppose that route control 20B45 determines that data flows between the source and these address spaces are to preliminarily be routed via next hop A, respectively. In this instance, the more specific address spaces identified by 10.0.6.0/24 and 10.0.4.0/24 are related to (different) convergence point 2 (at node 19D15) and convergence point 3 (at node 19D11), respectively. According to the criteria of preliminary route selection process 20B10, data flows to be routed between the source and the destination address space 19D23 of FIG. 19F are routed via next hop C, as indicated in the next hop field 20B16 of data structure 20B12 of FIG. 20B. Similarly, data flows between the source and destination address space 19B12 are routed via next hop C as well. As in the other example, process 20B10 operates to minimize the number of ASes on path over which data flows. Using this criterion, path SC-CCC5 via next hop C is selected and recorded in the next hop field 20B16 for routing data to address spaces 10.0.4.0/24 and 10.0.6.0/24. It is noteworthy that next hop C has been selected according to process 20B10, regardless of the flow characteristics associated with these paths to address spaces 10.0.4.0/24 and 10.0.6.0/24. Hence, the default routing behavior may not provide for optimum data transport.

An exemplary flow control system employing route control process 20B40 is configured to further determine the optimum path in which to route data over, by way of, for example, passive analyzation techniques described herein. In this example, the flow control system uses route control process 20B45 to select paths that provide a path that either satisfies a specific policy, or is the optimum path in which to route data over. Consider that process 20B45 determines that next hop C provide for satisfactory data transport, but rather next hop B does provide for optimal data transport. In this case, process 20B45 selects next hop B and associates data representing next hop B into the next hop fields related to routes 10.0.6.0/24 and 10.0.4.0/24 in data structure 20B36.

Figure 24:
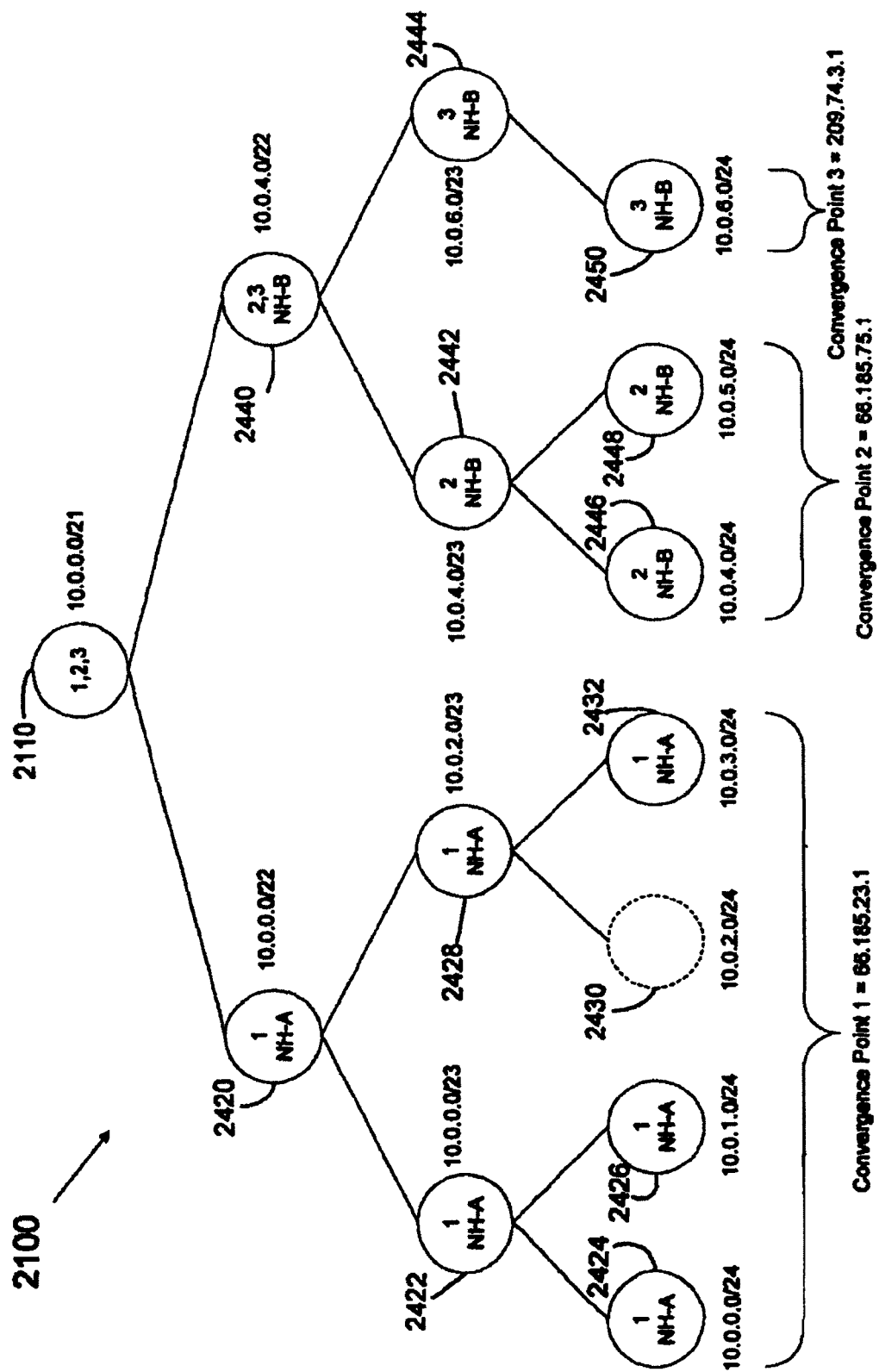
FIG. 24 is a graphical representation illustrating another exemplary data structure for relating convergence point information and next-hop information to an address space in accordance with another specific embodiment of the present invention.

Route control process 20B50 determines that routes 10.0.6.0/24 and 10.0.4.0/24 are related to next hop B. That is, data flows between the source and destination address spaces 10.0.6.0/24 and 10.0.4.0/24 should at least route via next hop B. Process 20B50, however, operates to further optimize the designation (for route announcement, for example) in which to route data by updating route field 20B62 with a substitute route of 10.0.4.0/22. In this case, with routes 10.0.6.0/24 and 10.0.4.0/24 related to the same next hop, the respective address spaces can be aggregated. FIG. 24 illustrates how this updated route can be determined.

It should be noted that route control processes 20B40, 20B45 and 20B50 can be distributed throughout the flow control system and networks. In a specific embodiment, these processes and/or modules can reside in control module 2525 of flow control process 200 in FIG. 25. Additionally, data structures 20B12 and 20B60 can be located anywhere in the flow control system and networks. In a specific embodiment, data structure 20B12 resides in router 2545 in repository 2598 of FIG. 25 and data structure 20B60 resides in router 2545 in repository 2599. Such data structures can be combined and can be of any data structure known in the art. Also, these data structures can be located in separate routers.

FIG. 21A illustrates an exemplary data structure 2100 for storing and comparing convergence point information for aggregating routes and information thereof, and to announce routes as determined by, for example, convergence point analysis. Data structure 2100 includes information relating to convergence points, relationships between convergence points and address spaces, discovered and undiscovered address spaces, and other similar information that describes features of network 19F00 of FIG. 19F. Although data structure 2100 of FIG. 21A is represented as a multiple-level binary data structure, any other data structure known in the art that can relate information pertinent to topological-based route control, as described herein, is suitable to practice the present invention. In the example shown in FIG. 21A, the data structure is a four-level, binary tree-type data structure shown as a subset of a larger thirty-two-level structure (or of any other number of levels), having parent-child relationships between various points on a network and corresponding levels of granularity of address prefix or netmask. The relationship between parent address space and child address space is illustrated, for example, in connection with the discussion of FIG. 19B.

It should be noted that the example shown in FIG. 21A illustrates a portion of a more comprehensive data structure covering numerous relationships. This data structure represents exemplary structural relationships between data representing address space and data representing convergence points. These relationships facilitate combining subsets of address spaces to achieve the ability to determine common destinations under a single convergence point. Thus, the subsets of addresses can be monitored by a single probe. Some embodiments of the present invention avoid voluminous data traffic volume from probing all points above and below convergence points as found with conventional data flow control systems.

In a specific embodiment, each data cell of data structure 2100 is represented by a "circle" and is "linked" to a parent data cell representing a higher level of address aggregation and/or a child data cell representing a lower level of address aggregation. A data cell represents a portion of the network of interest, which can be described as an address space, for example, in terms of an IP address and a prefix (i.e., netmask). For example, data cell 2120 represents an address space defined by 10.0.0.0/22. Its parent data cell is data cell 2110, which represents an address space defined by 10.0.0.0/21, and one of its child data cells is data cell 2122, which represents an address space defined by 10.0.0.0/23. Data cells, such as 2120, indicate their parent-child relationships as being "linked" by one or more lines, as the case may be. Further, each data cell contains data representing one or more convergence points that are associated with the represented address space. For example, data cell 2122 contains data identifying convergence point 1 (i.e., "1") as related to the address space 10.0.0.0/23. As shown in FIG. 19F, convergence point 1 at node 1930 lies on a path between the source and address space 19D51, and again, provides a reference to address space 19D51 for actively probing the data path between the source(s) and destination(s).

In general, parent data cells represent an address space that includes an aggregation of its child data cells. For example, data cell 2122 is a parent cell to data cells 2124 and 2126. The address spaces associated with 10.0.0.0/24 (data cell 2124) and 10.0.1.0/24 (data cell 2126) can be expressed as 10.0.[00000000].0/24 and 10.0.[00000001].0/24, respectively, where the third byte of the addresses is expressed in binary.

When these address spaces contain the same convergence point (i.e., "1"), the address spaces can effectively be aggregated because convergence point 1 can be used to monitor traffic flow characteristics associated with the path(s) from the source to the destinations identified by both 10.0.[00000000]. 10.0.[00000001.XXXXXXXX]/24 and 10.0.[00000001.XXXXXXXX]/24. Hence, the least significant bit of the third byte can be represented by an "X" as a "don't care." Therefore, both address spaces can be aggregated and identified by 10.0.0000000X.0/24, which in turn can be described as address space 10.0.0.0/23 (i.e., data cell 2122). Once aggregated as 10.0.0.0/23, data flows destined to either address spaces associated with 10.0.0.0/24 and 10.0.1.0/24 can be routed according to the aggregated address by an exemplary flow control system, as shown in FIG. 25, and in accordance with the exemplary methods described in connection with FIG. 20B.

Data cell 2110 is the parent data cell for each of the child data cells shown in FIG. 21A, except for cells 2134, 2136, and 2138. The exclusion of data cells 2134, 2136, and 2138 is discussed below. Data cell 2110 is also the highest level address space in the network topology illustrated in FIG. 19F and contains data representing three convergence points 1, 2, and 3. Parent data cells generally contain the convergence points associated with each of its child data cells. Data cell 2120 is also a parent data cell, but for data cells 2122, 2124, 2126, 2128, 2130, and 2132. Again, data cell 2120 is identified as address space 10.0.0.0/22 and contains a single convergence point 1 identified by an IP address of 66.185.23.1.

Likewise, data cell 2140 is a parent data cell for the data cells 2142, 2144, 2146, 2148, 2150, and 2152. But data cell 2140 contains data representing convergence points 2 and 3, which are respectively identified with IP addresses 66.185.75.1 and 209.74.3.1. Because the address space 10.0.4.0/22 includes two convergence points, the performance of the paths between the source(s) and this address space related to data cell 2140 cannot be adequately monitored by a specific convergence point. Therefore, child data cells 2142 (i.e., 10.0.4.0/23) and 2144 (i.e., 10.0.6.0/23) will not be aggregated (without additional information, e.g., next hop) to form the address space represented by data cell 2140.

As discussed above, data cell 2134 and its children data cells 2136 and 2138 are excluded from address aggregation into address spaces represented by data cells 2120 and 2110. Data cells 2134, 2136 and 2138 are thus deemed "disjoint" because they are not direct descendants from either of data cells 2120 and 2110. Data cells 2134, 2136 and 2138 do, however, contain the same convergence point 1, as shown in FIG. 19F. For data cells 2134 (i.e., 10.1.0.0/23) and its children to be in a direct parent-child relationship, these cells would be required to be at least linked to an address space identified by 10.0000000X.0.0/16, if, for example, all address spaces described by 10.0.0.0/16 are related to a single convergence point.

As discussed in connection with FIG. 19F, address spaces 19D24 (i.e., 10.0.7.0/24) and 19D55 (i.e., 10.0.2.0/24) have yet to be discovered, unlike the other address spaces represented by data cells in FIG. 21A. As shown in FIG. 21A, the broken lines of the circle representing data cells 2130 and 2152 indicate that these are undiscovered address space. If discovered in the network topology by path trace probing, by passive flow analysis methodologies, or the like, data cells 2152 and 2130 will then populate data structure 2100 and will include their respective convergence points. For example, the IP address space of node 2130 (IP address/netmask=10.0.2.0/24) is shown to be undiscovered by at least the passive flow analyzer of the present invention 630 (FIG. 6) and, therefore, is not populated in the data structure as no traffic is flowing to that destination.

In the case that address space 19D55 (i.e., 10.0.2.0/24) of FIG. 19F is discovered and found to be related to convergence point 1, then in FIG. 21A, the address space 10.0.0.0/22 of data cell 2120 remains a proper level of aggregation. In other words, convergence point 1 is sufficient to monitor all address spaces within 10.0.0.0/22. If, however, 10.0.2.0/24 is discovered to be address space 19D13 of FIG. 19F, then this address space would be related to convergence point 2 (or any other convergence point) rather than convergence point 1. Consequently, the address space 10.0.0.0/22 would no longer be an appropriate level of aggregation.

Figure 21B:
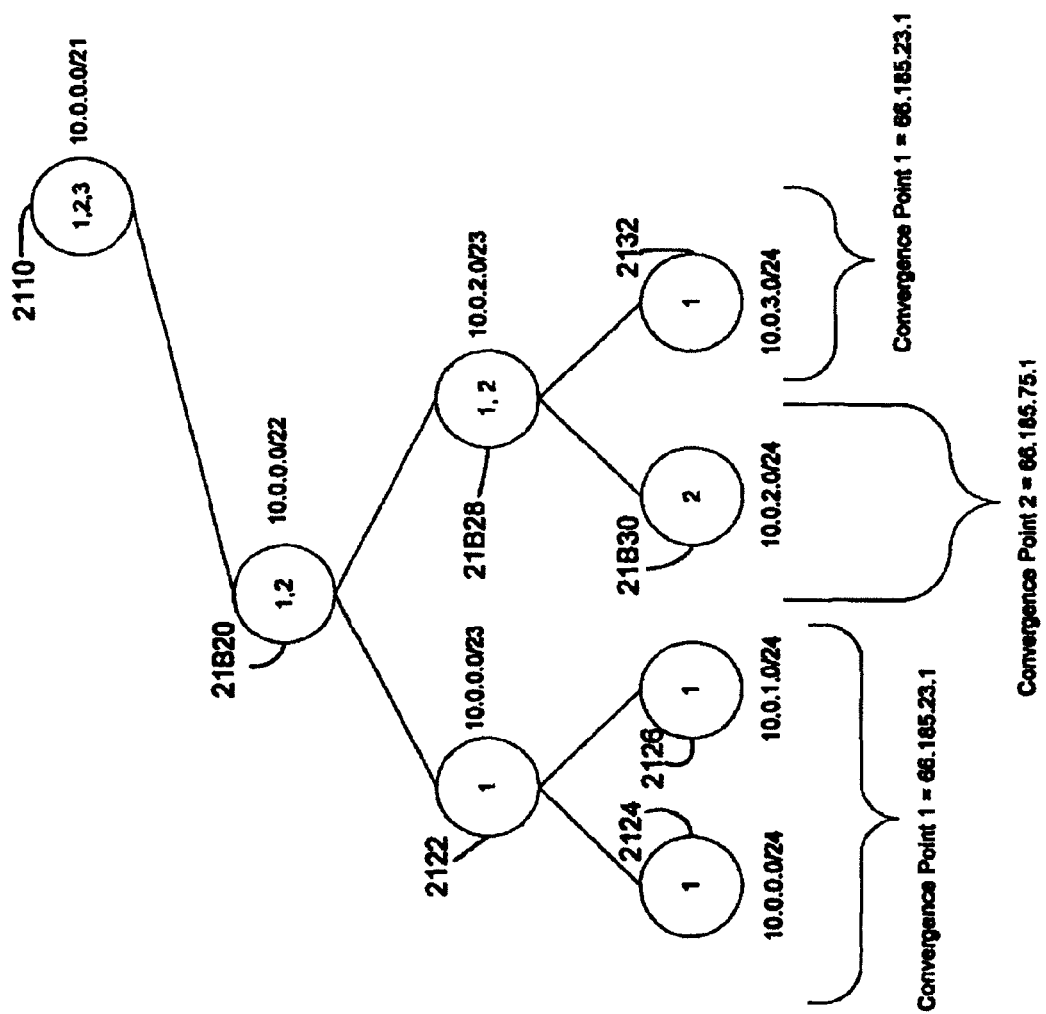

FIG. 21B depicts an exemplary portion of data structure 2100 of FIG. 21A in response to discovering address space 10.0.2.0/24 related to convergence point 2. As shown, data cell 21B30 contains data representing convergence point 2. And its parent data cells 21B20 (i.e., 10.0.2.0/23) and 21B28 (i.e., 10.0.0.0/22) contain both convergence points 1 and 2. With convergence point 2 being "pushed up" through data cells 21B20 and 21B28, the address spaces related to these cells are no longer appropriate to aggregate to 10.0.0.0/22. Thus, the level of aggregation is "pushed down" through to child data cells having one convergence point. For example, data cell 2122 contains only convergence point 1, which indicates that 10.0.0.0/23 is an appropriate level of aggregation. Data cells 21B30 and 2132 have only one convergence point (convergence points 2 and 1, respectively). Therefore, 10.0.2.0/24 and 10.0.3.0/24 are appropriate levels of aggregation for addresses.

Data structure 2100 can reside in repository 2511 of an exemplary flow control system 200, as shown in FIG. 25. Data structure 2100 of FIG. 21A, however is not limited to reside therein and can reside any where within the flow control system and networks. In a specific embodiment of the present invention, flow control system 200 (and/or controller/control module 2525) of FIG. 25 and data structure 2100 of FIG. 21A are used to govern route control process 20B40 of FIG. 2013, for example.

In one example, flow control system 200 operates upon the specific route that is associated with 10.0.3.0/24 of data structure 20B30 (e.g., portion of 201312). To determine whether this specific route is optimized in its level of aggregation, the flow control system determines that first it is not optimized. To provide an optimized level of aggregation in which to announce (and route data), the flow control system determines a data cell that corresponds to the specific route's level of aggregation. That is, specific route 10.0.3.0/24 is matched to data cell 2132 of FIG. 21A. Then, the flow control system moves up through the parent-child linkages until a parent (or grandparent, etc.) data cell represents the largest number of addresses (i.e., largest address space) while containing one convergence point. In this case, that is data cell 2120. Therefore, the proper level of aggregation represented by data cell 2120 is 10.0.0.0/22, which is placed into data structure 20B60 in the form of route update 20B23, as shown in FIG. 2013. The above process is similarly followed for the specific route associated with 10.0.1.0/24 of data structure 20B30.

In another example, the specific route related to 10.1.1.0/24 of data structure 20B30 is processed by route control process 20B40 of FIG. 2013. This preliminary route is matched against data cells in data structure 2100, which in this example, resides in repository 2511. Consider that flow control system 200 matches the preliminary route to the address space of 10.1.1.0/24 at data cell 2138. The flow control system then moves up through the parent-child linkages until a parent (or grandparent, etc.) data cell represents the largest number of addresses (i.e., largest address space) while containing one convergence point. In this case, data cell 2134, which represents 10.1.0.0/23, is found to be the largest address space in the parent-child linkage. Hence, address space 10.1.0.0/23 is the appropriate address and prefix to use to route data from between the source and one or more destination within 10.1.0.0/23.

Returning to the first example where the proper level of aggregation was determined to be 10.0.0.0/22, which was placed into data structure 20B60 in the form of route update 20B23 shown in FIG. 20B. Next suppose that an address space 10.0.2.0/24 related to convergence point 2 is discovered, as shown in FIG. 21B. Flow control system 200, whether periodically or in response to a certain event, then detects the discovery and adjusts the proper levels of aggregation as discussed above in connection with FIG. 21B. The flow control system then will withdraw the 10.0.0.0/22 route and will replace it with 10.0.0.0/23, 10.0.2.0/24 and 10.0.3.0/24, which are appropriate levels of aggregation as determined above. In a specific embodiment, the updated routes 10.0.0.0/23, 10.0.2.0/24 and 10.0.3.0/24 are placed in a data structure 2599 of router 2545 of FIG. 25 for providing for appropriate routing of data.

As actively probed convergence points reveal changes in network performance, other convergence points can be substituted when data paths are modified to provide optimum data routing. Theses changes affect one or more parent-child relationships in data structure 2100, and thereby change the proper levels of aggregation for numerous address spaces. Consequently, exemplary data structure 20B60 of FIG. 20B will change to accommodate new routes.

Thus, route control in accordance with an exemplary embodiment of the present invention uses tree-oriented analyses such as those illustrated and described as in FIG. 21A. By analyzing a series of points in a determinate fashion, the number of active probes that are sent to specific nodes is minimized, thus reducing the amount of route control data traffic and increasing the overall efficiency of data routing and control. Using a data tree structure to analyze convergence points, the construction of efficient network data paths is possible by analyzing the relationships between each point (node) to identify the shortest prefix, which would indicate a convergence point related to the largest set of addresses in an address space. This is the prefix length that can be announced in order to adjust the primary data path in reaction to a network degradation incurred at a destination point.

It should be noted that other data structures, such as described in FIG. 20C, and methods of route control by way of optimized routing announcements (to the egress routers), for example, are within the scope and spirit of the present invention.

FIG. 22 is a control flowchart 2200 illustrating an example of the method of determining characteristics associated with each hop and point. For example, in FIG. 19D, each point along path A can be path trace probed in sequence, thereby generating responsive data which is stored in a repository or other data structure for constructing a map of the network topology. The example shown in FIG. 22, a path trace is started on one or more candidate paths in step 2210. In step 2220, the IP address of each hop can be recorded in a data structure and checked against previously recorded data. At 2230, each hop discovered by a returning probe is checked to see if it has either been probed or recorded previously. At decision point 2240, the decision as to whether each hop has been seen (e.g., probed and/or recorded) previously is determined by comparing the probe-generated information (such as an updated IP address) to stored data such as archived IP addresses contained within a data structure. If the hop has been previously probed and/or recorded and information matches previously recorded hops (signifying the discovery of a convergence point), the candidate path trace is halted and the sub-convergence point is recorded in step 2250 and 2260.

If the hop was not seen (e.g., probed and/or recorded) previously, another decision point as to whether the path trace should be ended occurs at step 2270. If, however, the candidate path trace reveals a sub-convergence point, it is recorded in a data structure at step 2260. If the hop has not been probed or recorded previously, then another condition-determining decision occurs at step 2270. In step 2270, one of four possible conditions may result in the termination of the overall path tracing condition. The first condition is whether the probe has reached its intended destination. The second condition is whether a predetermined number of probes fail to generated responsive data such as convergence point characteristics, data, or parameters. Third, if a routing loop is encountered, the path tracing condition will be ended. Fourth, if unknown ICMP code is encountered, then the path trace is ended. If path trace probing is halted, then the process is done as reflected in step 2280. The number of failures to be seen before ending the probe can be pre-set as a stored rule for use by the active calibrator 208 (FIG. 2), either by the system, user or another means. FIG. 23 shows logic that can further reduce the number of path trace probes to a destination, further reducing the possibility of triggering security measures. Logic processes, as described above, halt all path traces, including the first probes to reach the destination, except when all candidate paths have a convergence point.

Figure 23:
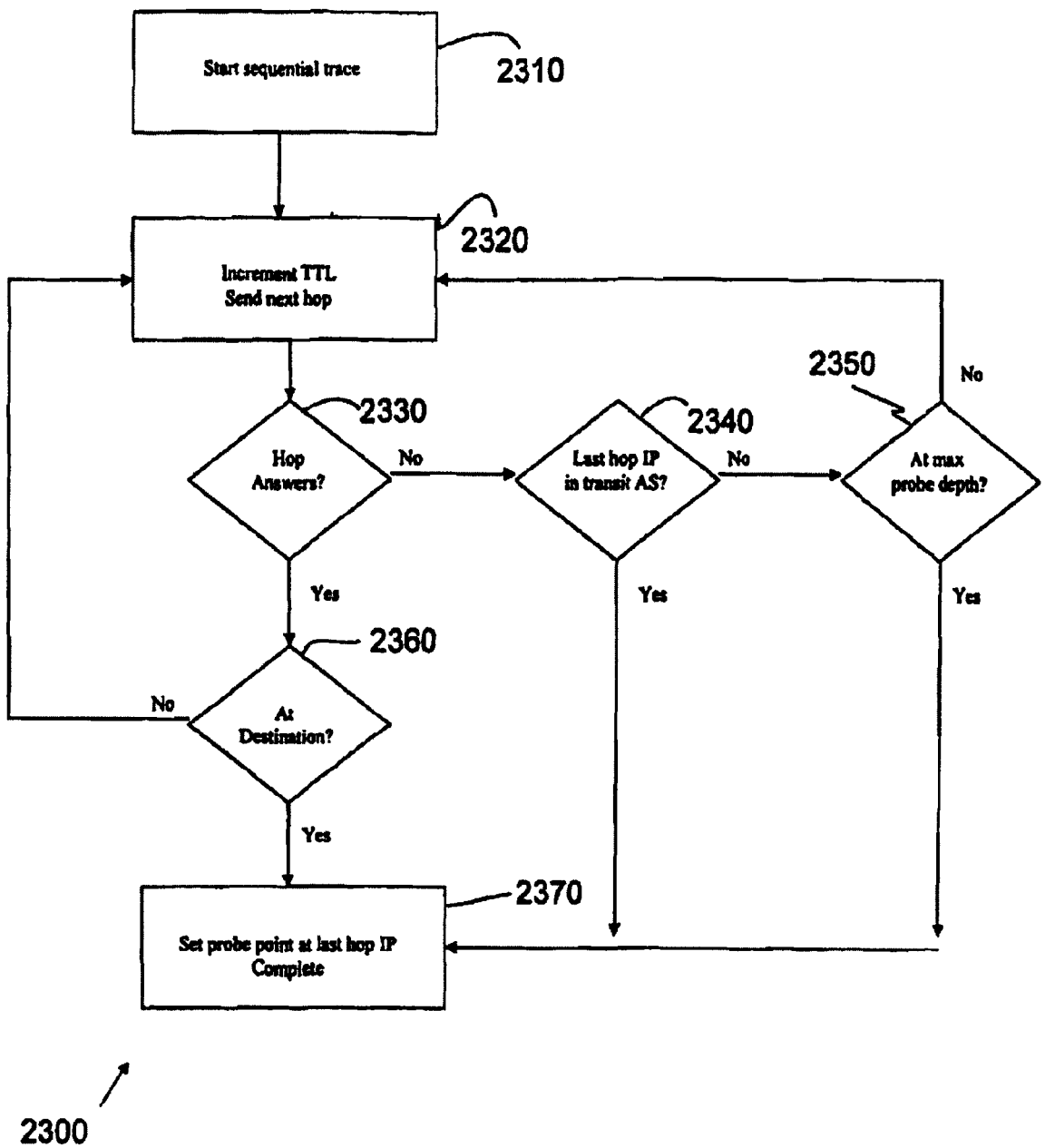
FIG. 23 is a flow chart illustrating an exemplary method for path trace measurement for determining whether a probe point in a data network is a convergence point in accordance with an exemplary embodiment of the present invention.

FIG. 23 illustrates an exemplary control flowchart 2300 for a method further describing the end condition of step 2270 in FIG. 22, in accordance with another embodiment of the present invention. In this method, probe points such as convergence points are discovered and/or established regardless of whether transit AS or destinations filter or prevent probe information from returning back. More specifically, the method establishes an alternate point in which to probe if either a transit AS or a destination prevents the generation of information in response to probes. In one embodiment, the method establishes as an alternate probe point a node one hop removed from a non-responsive node. Again, a sequential path trace is started in step 2310, for example, by controller 205 of FIG. 2. A probe is sent to a next hop in step 2320 and, in step 2330, determines if the probe provides data about nodes along one or more paths in response to the path trace probe. If responsive data is received, then the path trace to a specific node is considered complete in step 2370.

If there is no answer to the path trace, then the system must determine the then-current location of the probe. In step 2340, the flow control system determines if the target node (i.e., a convergence point) was non-responsive to the probe and, if so whether it was proximate to an intended destination. By comparing characteristics of a particular node to data stored in traffic repository 221 (FIG. 2), controller 205 can determine whether the IP address, among other characteristics matches a recorded IP address for a known transit AS. Controller 205 can also determine whether the probe has reached its probe depth, or whether the probe has failed. For example, a probe depth of "Y" might specify that three failed probing attempts are allowed before probing is halted. The probe depth specifies a limit which prevents excessive probing from, for example, triggering security measures to be implemented. Examples of security measures which might be implemented can be similar to those in response, for example, to a denial of service attack. If the target node is nonresponsive then the system, in step 2350 determines whether the probe reached its destination or in the transit AS of the destination, which is the AS directly upstream from the destination. Generally, the upstream AS can be identified, for example, by the BGP daemon (described below in connection with FIG. 25). If a probe is non-responsive, then this may indicate a filtered address or "black hole" which, when recorded in a data structure such as a repository or database, can indicate a network problem, latency, or obstruction, thus invoking alternate data routing and route control to determine an alternate path.

If an answer is received, then the system determines if the hop reached its desired destination or sub-convergence point at step 2360. If it is the last hop, then the path trace is recorded as completed. A new active probe session is started, targeting the convergence point whose IP address is the last recorded convergence point in the repository or other data structure as shown in step 2370. If the hop is answered from step 2330 and if the hop is at its destination convergence point, the path trace is considered complete. If not, then the next probe (i.e., incremental time to live) is sent, restarting at step 2320.

Additional logic shown in FIG. 23 can be applied using data (e.g., nonresponses, lack of response to particular probes, etc.) from a data structure to determine if filtering is occurring close to the destination or if the filtering is happening in the middle mile. If the filter is seen close to the destination the system may not be able to resolve a complete data path to the destination filters. If the problem is seen in the middle mile the system can continue to look for valid hops after the maximum number of probes is sent. In some embodiments, a system wide limit can be set as a redundant measure to handle cases of routing loops or other pathologies that occur in the network.

Figure 26:
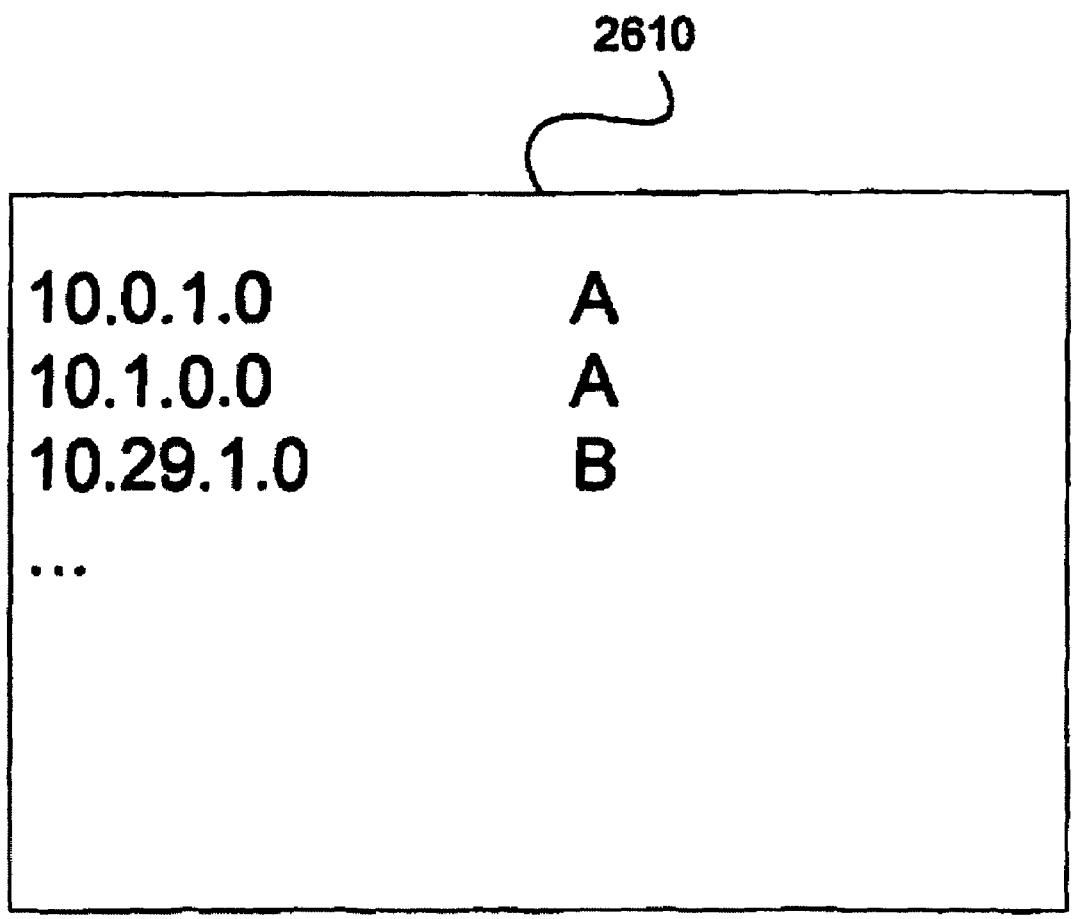
FIG. 26 illustrates an exemplary routing table according to a specific embodiment of the present invention.

FIG. 24 shows an another exemplary data structure in accordance with another embodiment of the present invention that incorporates, for example, source-specific information such as "next hop" information. Next hop information can supplement exemplary convergence point methodologies according the present invention. "Next hop" is information related to a network path portion or node located one hop from a particular node (e.g., source node). In one embodiment, next hop information can include identifiers of egress router that are located on specific paths between the source node and one or more destination addresses. A next hop can be an address (i.e., identifier) from a routing table or other data structure that directs data traffic flow (i.e., routing table of BGPd as shown in FIG. 26). For example, a router may have an IP address of 66.185.23.1 and designated by "NH-A." Data traffic routed over this link or NSP will have a next hop address of "NH-A" in the local routing table. This router represents as a node or point may be associated with convergence points within a specific address space, as designated and announced by specific prefix length (e.g., /19). However, next hop information is not necessarily associated with convergence points. In another embodiment, next hop identifiers A, B and C, as described herein can refer to Source A node (e.g., router), Source B node, and Source C node, respectively.

The destinations in the network of FIG. 21A are also reflected in FIG. 24 as 2424, 2426, 2430, 2436, 2438, 2446, 2448, 2450, and 2452. Next hop information for each of these destination prefixes (e.g., 10.0.3.0/24) can be determined, in one embodiment, by using the routing table of BGPd on the current internal routing table of controller 205 (FIG. 2). In the example of FIG. 24, there are two potential routes with two potential next hops, indicated by "NH-A" and "NH-B." An exemplary flow control system, for each destination network of FIG. 24, does a route lookup and stores next hop information in a repository or storage application with convergence point information.

Adding next hop information to the data structure 2100 of FIG. 21A, as shown in FIG. 24, can be used to select the appropriate prefix length that should be announced (e.g., to network routers identified by next hop information). Consider data cells 2142 and 2144 of FIG. 21A, which each have different (but one) convergence points. In accordance with an exemplary convergence point methodology, the specific address spaces identified as 10.0.4.0/23 and 10.0.6.0/23 are to be used for routing data. However, consider the next example where next hop information is used to supplement convergence point information.

As shown in FIG. 24, suppose two destination address spaces prefixes at 10.0.4.0/23 and 10.0.6.0/23 share different convergence points (2 and 3) yet share the same next hop (NH-B). Therefore, it is appropriate to announce 10.0.4.0/22 associated with data cell 2440 to network routers. However, if network degradation occurs thereafter at 10.0.5.0/24 and requires resolution by routing over NH-A rather than NH-B, the aggregation point is lowered ("push down") to 10.0.4.0/23 because it shares convergence point 2 via next hop NH-A. Address space 10.0.4.0/23 becomes associated with the new announced route to network routers. Destination 10.0.6.0/23, however is, still is routed over NH-B since the problem did not affect this portion of the address space (since it is related to a path associated with convergence point 3). This routing can be affected by leaving the more general route of 10.0.4.0/22 via NH-B in place (the more specific 10.0.4.0/23 over NH-A will take precedence in the routing table) or 10.0.4.0/22 can be withdrawn and replaced with 10.0.6.0/23 over NHB.

Data structure 2100 of FIG. 24 can reside in repository 2511 of an exemplary flow control system 200, as shown in FIG. 25. Data structure 2100 of FIG. 24, however it is not limited to reside therein and can reside any where within the flow control system and networks. In a specific embodiment of the present invention, flow control system 200 (and/or controller/control module 2525) of FIG. 25 and data structure 2100 of FIG. 24 are used to govern, or embody, route control process 20B50 of FIG. 2013, for example.

In one example, flow control system 200 is used to control the routing of data over network 19F00 of FIG. 19F. The flow control system determines that after passively monitoring the data traffic over paths from each source to each address space 19D12 (i.e., 10.0.4.0/24) and 19D23 (i.e., 10.0.6.0/24) that paths passing through Source B have the most desirable path performance characteristics (e.g., favorable in terms of RTT, loss, latency, etc). As shown in FIG. 20B, the route control process 20B45 of flow control system 200 operates to override the preliminary next hop information, as determined by the preliminary route selection process 20B10. In this case, next hop C, which is associated with 10.0.6.0/24, is changed to next hop B in data structure 20B36. Similarly, next hop C associated with 10.0.4.0/24 is changed to next hop B in data structure 20B36.

Route control process 20B50 of the flow control system further operates on route and next hop information from 20B36. To determine whether the preliminary route(s) are optimized in its level of aggregation, the flow control system determines whether it is not optimized. To provide an optimized level of aggregation in which to announce (and route data), the flow control system determines a data cell that corresponds to a preliminary route's level of aggregation.

The route control process 20B50 evaluates the preliminary route(s) of 10.0.4.0/24 and 10.0.6.0/24 against the address spaces associated with the data cells of FIG. 24. Then, the flow control system moves up through the parent-child linkages until a parent (or grandparent, etc.) data cell represents the largest number of addresses (i.e., largest address space) while containing, for example, one convergence point. For preliminary route 10.0.4.0/24, the largest address space containing just convergence point 2 in this example is data cell 2442. For preliminary route 10.0.6.0/24, the largest address space containing just convergence point 3 in this example is data cell 2444. Also, route control process 20B50 determines whether data cells 2442 and 2444 and their respective address spaces relate to one next hop identifier. In this case, it is NH-B. Although children nodes 2442 and 2444 of parent node 2440 have different, albeit one, convergence points, nodes 2442 and 2444 are related to the same next hop identifier NH-B. Therefore, the proper level of aggregation represented by the parent data cell 2440 is 10.0.4.0/22, which is placed into data structure 20B60 in the form of route update 20B38, as shown in FIG. 20B.

FIG. 25 illustrates an exemplary network 2500 coupled to a flow control system in accordance with an embodiment of the present invention. A data repository 2510, router 2515, passive flow analyzer 2520, control module 2525, daemon application 2530, repository 2511, source router 2545, and intermediate nodes 2547. Destination nodes 2550 are reached via network A 2560 and network B 2570 by routing data traffic flow over Internet backbone 2580 through convergence point 2585. Destination nodes 2550 can also represent intermediate nodes in a destination AS. Beyond convergence point 2585, destination nodes 2550 are encompassed by address space 2590. In exemplary embodiments of the present invention, a third-party vendor may provide the BGP daemon application 2530 for protocol-driven standardization of data networking communications. BGP daemons may be written in various languages and formats such as C or C#, generally incorporating the latest versions of BGP, such as BGP4. One having ordinary skill should appreciate how to script a BGP daemon suitable to practice the present invention. However, it is foreseeable that other protocols may replace BGP and the description herein is not intended to limit daemon application 2530 to only those incorporating BGP. Other standards bodies such as the IETF may release new RFCs for new protocols and alternative embodiments of the present invention may use these daemons.

Along candidate paths are nodes 2547, shown passing through network A 2560 and network B 2570. Node 2589 is found along candidate data routes between source router 2545 and convergence point 2585. Beyond convergence point 2585, several destination nodes 2550 exist as represented by aggregate address space 2590. Internet 2580 is a typical electronic network which connects to network A 2560 and network B 2570, but may be embodied by alternative electronic networks such as a LAN, WAN, or other type of distributed computing network.

Operating in a manner similar to a first-order data filter that can analyze prefix addresses for problems, which might degrade or adversely affect data routes. Probe signals that are generated to provide diagnostic data on data routes are sent to the control module 2525.

Repository 2511 is but one vehicle to store data described herein according to any appropriate data structure. Additionally, although router 2545 is shown to be one routing device, the routing functionality can be distributed across any number of routing devices. Moreover, data structures 2598 and 2599 can be combined, or alternatively, data structure 2598 can be modified by the flow control system so as to be transformed into data structure 2599. One having ordinary skilled in the art should recognize that the flow control system and peripheral network elements can be arranged in any fashion, functionally and structurally, to practice the present invention.

FIG. 26 is an illustration of an exemplary data structure 2610, which can be implemented by a routing table, repository, database, or any of a number of other data structures. Data structure 2610 may be used to store data and other information for use by flow control system 200 (FIG. 2). Data such as IP addresses, prefix/netmask, latency, next hop in information, next hop out information, convergence point identification, user configurable operating parameters, and other data may be stored in data structure 2610. Data gathered in response to path trace and active probing may also be used. Using recorded information such as IP addresses or conditions recorded in data structure 2610 enables the creation of a topological network map, from which efficient data routes are constructed. Candidate path convergence point IP addresses are stored in data structure 2610 for topologically-mapping network data routes. Aggregating IP addresses of convergence points between a source and a destination node or point enables efficient data route control in accordance with an embodiment of the present invention.

In the simplest embodiment of route control, a probe point can be set to be one hop prior to a destination (as discussed above) or a point along a data route where, for example, probes fail to generate responsive information because they are continuously filtered such as described in connection with FIG. 23. In another embodiment that uses convergence point analysis, the network probe point is the first common hop along all of the candidate paths. By sending active probes to each of these points, any responsive information received by the system is recorded in data structure 2610 for use in constructing a topologically-aware network map. Again, as convergence points represent points in the network where path diversity is zero, these points are mapped by the present invention to determine an efficient data route.

Figure 27:
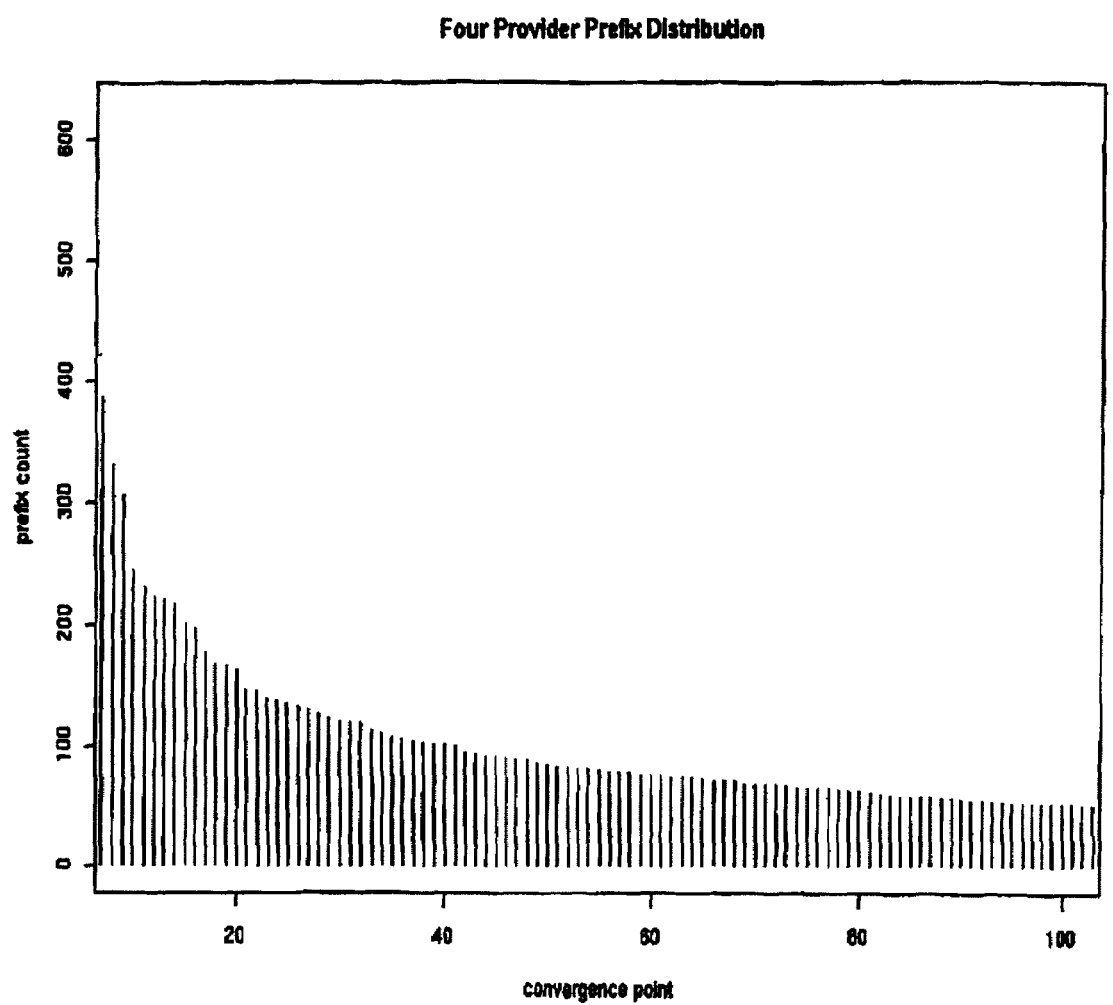
FIG. 27 illustrates a graphical representation of a four-NSP prefix distribution of convergence point analysis information, in accordance with an embodiment of the present invention.

The scaling benefits of an embodiment of the present invention are illustrated in the graph of FIG. 27. Scaling benefits may occur within a network aggregation such as the one illustrated in FIG. 19D where one or more convergence points such as 1930 exist. FIG. 27 illustrates the number of destination networks behind the lowest-level prefix convergence points observed over an hour, in accordance with an embodiment of the present invention. The effects are fairly uniform with an average of 100 networks behind each convergence IP. Measuring just the convergence point yields a 100 to 1 gain in scaling or efficiency, that is, a single measurement today can do the work of 100 measurements of the past. When the number of NSPs is reduced, some destinations may observe little or no network path diversity. High density convergence points may emerge and, when probing to these high density convergence points, they may be only a few hops away. The majority of the network path may have zero network path diversity. Thus, convergence point analysis can effectively measure the level of path diversity offered by the correct set of NSPs.

Further, end-to-end measurements are good at indicating deviations from normal operating parameters and detecting performance problems. However, effects on non-diverse portions of a path can cloud end-to-end provider/NSP comparisons. End-to-end measurement and control techniques such as TCP probes, ICMP/UDP probes that traverse non-diverse portions of the path, measurement techniques such as web objects and other application based measurements are often confused by last-mile congestion. Because of queuing and other effects, any measurements through congestion can vary by large amounts (e.g. latency that varies by +/−100s of ms is not uncommon). If the congestion occurs on a non-diverse, "last mile" link, any given provider may appear to have substantially better or poorer performance for any given measurement due to these random effects. Thus, last-mile conditions, which cannot be solved with routing, may cloud the eventual routing decision that is made based on these poor and highly variable measurements. Whenever possible, more accurate measurements can be made by avoiding the shared portion of the route or path.

Figure 28:
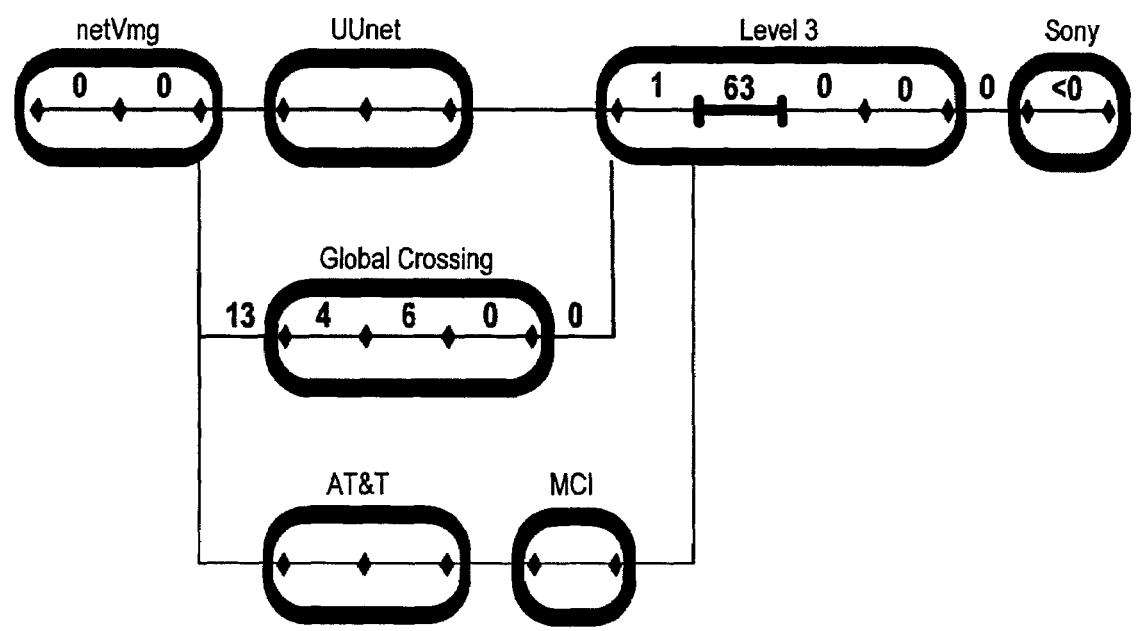
FIG. 28 illustrates a network topology for path trace measurement and analysis and a path trace report, in accordance with an embodiment of the present invention.

This effect is illustrated in FIG. 28. FIG. 28 shows a route where a performance problem (high latency, +63 ms, at the highlighted link) occurs beyond the convergence point. This high latency is a problem that cannot be solved through routing, as every available path traverses the shared hop where the problem occurs. Any technique that measures through that congestion will experience highly variable measurements as described above. It is not possible to make an accurate decision using end-to-end measurements under these circumstances. Measuring instead to the convergence point allows an effective assessment of all the candidate paths relative to the diversity being offered along the route. By measuring up to the point of the path that can be controlled by routing, the embodiment is not subject to the variable effects on the non-diverse path. Thus being aware of these situations, the product is prevented from making route changes that attempt resolution of problems it cannot effectively solve.

Unless a flow control system recognizes the above-discussed situations by measuring only the portion of a path that is relevant (i.e., up to a convergence point), spurious route changes and churn can occur. As discussed, where congestion exists, the variance in latency can be very-high. For example, one sample may vary by 100s of ms from a next, to the same destination, as part of the same flow. Using an embodiment of the present invention, these effects can be isolated to a last-mile link beyond the convergence point where no path diversity exists. While passive analysis observes these as performance problems, embodiments of the present invention can recognize that a data flow is already on the best-performing path available. If the route control product assesses candidate paths in an end-to-end manner such as TCP probes, web objects or destination-based probes, the candidates would appear to differ by the same 100s of ms, packet-by-packet. This will cause some paths to appear to perform better at some times and other paths to appear to perform at a degraded level at other times, resulting from last mile effects. Routing changes based on such measurements may result in needless changes, route churn, or other spurious and ineffectual actions.

Convergence point analysis presents a common probe point for all destination prefixes seen beyond this point. Using this analysis significantly reduces the probe volume that must be sent because a single probe result can be used for all downstream destination prefixes. Measured "middle mile" or diverse path performance to the convergence point is relevant for all of these prefixes.

Additionally the type of route view shown in FIG. 28 is useful for the network operator or engineer, especially when troubleshooting problems related to a specific destination. This reporting capability is an important aspect of the embodiment. The view into each route shown in FIG. 28, including the individual links and relative performance over each link allows the operators to quickly assess each route and understand the intermediate providers that are traversed, the relative performance of each of those providers, where the route converges, what percentage of the route is actually diverse over the current set of providers, as well as a quick indication of any and all problem areas such as poor performance that were encountered on the path. In general, such a report is very useful not simply for troubleshooting actual problems, but understanding every detail about how the providers are able to reach this particular destination. By storing such reports over time, it is possible to find and report on historical intermediate route changes for each destination. Additionally the ability to detect certain events deep in the network allows the system to monitor the egress network all the way to each destination. Such a capability is common for local area networks, but no system exists that correlates such data over the wide area network.

This in-depth topology analysis allows the system to determine some root cause analysis for each network event or performance problem that is seen. Events include but are not limited to routing loops, black holes, high congestion, peering problems, and other routing anomalies. By observing these effects historically it is possible to report on the temporal nature of each of these events and report on the overall impact each event had, both in terms of the number of destinations affected, the duration of the event, and how much traffic volume was impacted throughout the event. This event-based reporting is very useful for the network operators to understand the overall impact each network event had on the operations and applications. It is also possible to highlight the actions that the embodiment took to isolate and route around the problem. Such reporting capabilities serve to highlight the effectiveness of the route control products in realizing performance improvements and isolating the impact of various network events.

As discussed, FIG. 28 illustrates the overall diversity that is offered to the indicated destination. This diversity can be expressed as a percentage of the total path. For example, in FIG. 28, two of the three paths have 6 diverse links and 5 non-diverse links, each being (6/11=0.54) roughly 54% diverse. The remaining link has 5 diverse and 5 non-diverse links and is thus 50% diverse. Averaging all of these together yields a total diversity of 53% to this destination. Thus there is a good chance (47%) that a problem will occur on this path that cannot be resolved with route control. If this is not acceptable diversity, the network planners might consider adding another provider that converges closer to the eventual destination, thus offering better reach to that destination, and lowering the risk that any given network failure will impact the application. Thus, as a capacity planning tool, understanding the available path diversity to all destinations allows the operators and network planners to assess the risk of an "unsolvable" problem occurring. In general, low path diversity=high risk of such problems.

Figure 29:
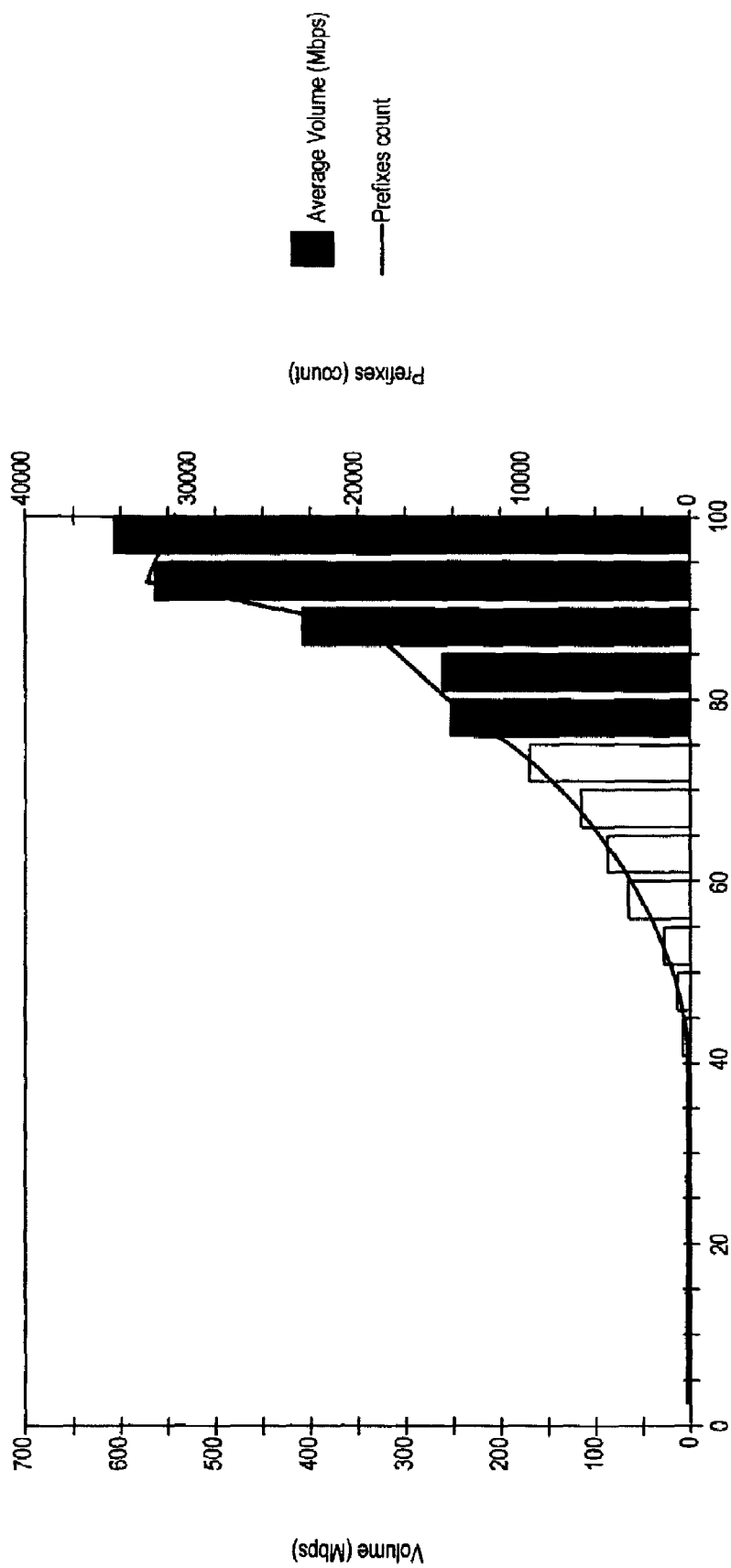
FIG. 29 illustrates a path diversity report, in accordance with an embodiment of the present invention.

Collecting the path diversity calculations for all of the observed routes allows for a general assessment of the overall path diversity being offered by the providers. This information can be collected and calculated from the topology assessment and reported to the user for network planning purposes. FIG. 29 illustrates one embodiment of such a report. In FIG. 29, all of the paths to the destinations of interest are assessed for diversity and plotted from 0% diverse to 100% diverse. The line in FIG. 29 represents the number of destinations or prefixes that correspond to the various diversity percentages. Each destination can be weighted by the amount of traffic being sent to that destination over the duration of the report as shown by the bars of the chart. Thus, at a glance, the network planner can assess the overall path diversity available over the current provider selection and understand how well the mix of providers in use is able to reach the important destinations of the users.

Figure 30:
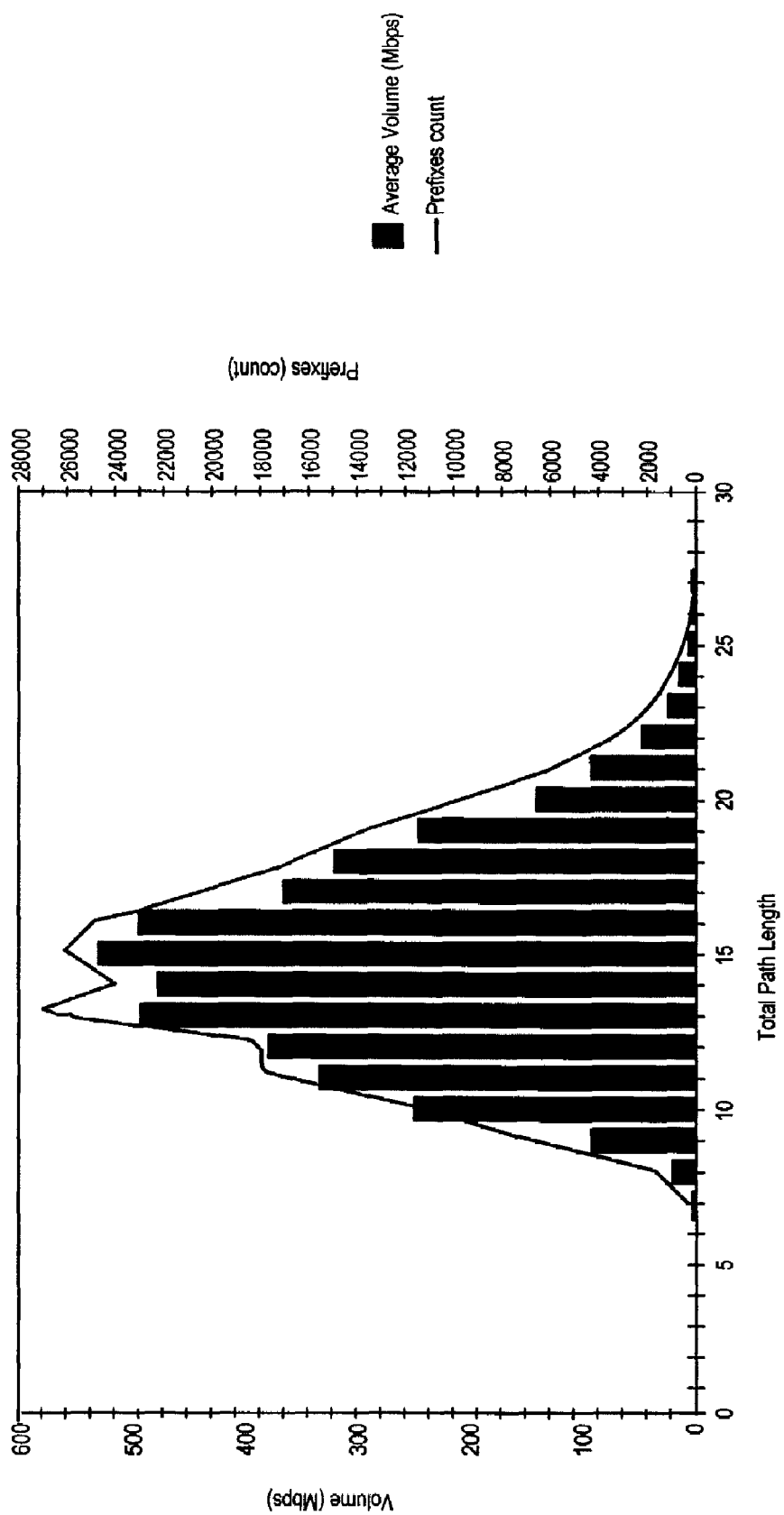
FIG. 30 illustrates a path length report, in accordance with an embodiment of the present invention.

Furthermore, as shown in FIG. 30, a breakdown of the total path length for each percentage is possible, making it easy to spot aberrations based on abnormally short or long path lengths. FIG. 30 illustrates the path lengths for a subset of the paths shown in FIG. 29. Although any subset can be selected, FIG. 30 illustrates the path lengths for the paths shown in FIG. 29 having 50%-75% diversity. Showing the total hop count, again weighted by destination volume, allows the operators to easily see how far the physical path length of each destination is by volume. As a supplement to these reports, it is possible to plot the top Autonomous Systems (i.e. destinations) that are in each of the operating regions. This allows the operators to easily see which destination networks are getting poor path diversity. If those destinations are important enough, additional or different network connectivity can be brought in that is better able to reach those important networks.

Figure 31:
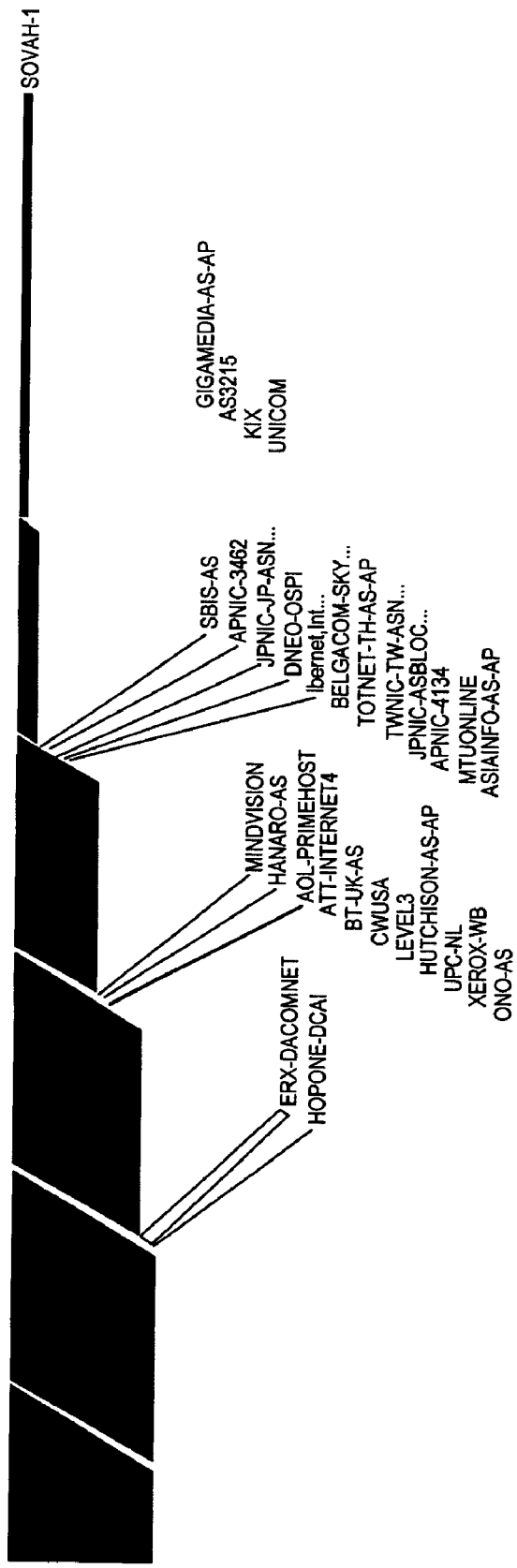
FIG. 31 illustrates a destination distance and traffic volume report, in accordance with an embodiment of the present invention.

FIG. 31 represents the volume of traffic to and the distance of a number of destinations and reflects another possible report that can be generated once the topology is known. A common analysis by network engineers is to understand which destination Autonomous Systems (AS) are sending or receiving the highest volume of traffic and the distance of those destinations. If an important destination is far away, efforts can be made or changes in network connectivity can be made to bring those destinations closer to the local application. FIG. 31 is one possible way to represent this information, though other similar views to addresses these issues are possible.

FIG. 31 shows the top N destination Autonomous Systems by volume. The number N can be configured and in this example the top 30 are shown and identified by name (e.g. GIGAMEDIA-AS-AP, AS3215, KIX, etc). The thickness of the line to each destination Autonomous System name represents the relative volume of traffic. The distance of the destination is shown as the number of AS hops (1, 2, 3, 4, 5, 6) traversed to reach the destination. This is equivalent to counting the large ovals of FIG. 28 on the way to the destination, each of which represents an intermediate AS hop. The total volume of all N top destinations is represented by the thickness of the line at the far left of the figure.

This figure allows the operators and engineers to see at a glance which destinations are important by volume and the distance to those destinations, in terms of intermediate providers traversed. An ability to mouse over each line or destination name to obtain numerical volume using a 'tool-tip' menu is an aspect of this report that is not illustrated. FIG. 31 is an effective aggregation of the topology information collected by the underlying system to analyze aspects of the existing network such as connectivity and load.

Referring back to FIG. 19D, the results of the topology discovery (or path trace) probes are recorded for detecting future network degradations at points related to one of the destination prefixes (10.0.0.0/24). Path traces are started over paths A, B, and C recording the path hop by hop. With convergence point analysis only the probes over candidate A reach the destination, unless a change in the topology is discovered or no convergence point exists, in which case the probes will be sent to the destination(s). This reduces the volume of traffic that can cause security alerts at the endpoints. FIG. 22 shows the control flow process for path tracing.

A common problem in conventional topology discovery probes results when intermediate service providers filter the response to traceroute packets. This results in several hops within that provider that do not respond. Conventional topology discovery probes may confuse these filters with security filters that are commonly implemented near a destination. If the approach is to continue increasing the time-to-live (TTL) rate of active probing until a valid hop is returned, this will not generate a response when the trace is hitting a filter at the destination. A simple embodiment is to administratively set a depth at which the system will give up if no valid hop returns. For example, a configuration that sets the max loss filter at 3 hops would halt the trace if three concurrent hops did not return a result. At the destination the filtering device will see the packets for all three hops and may trigger security notifications to the system administrator or cause pre-set security reactions to occur. If the filtering occurs in the middle mile, the problem may cause only a small portion of the path to be recognized and thus minimize the optimization of the data route.

Returning to FIG. 19D, the sub-convergence point 1910 and the convergence point 1930 are recorded. When additional prefixes are discovered (such as point 1950 at IP address/prefix 10.0.3.0/24 and point 1960 located at IP address/prefix 10.1.0.0/24) the path trace methodology discovers the same convergence point 1930 at IP address 66.185.23.1. This is added to the repository of convergence points and a single probe is generated and sent to convergence point 1930 for 10.0.0.0/24 whereupon it is recorded as a result to 10.0.1.0/24, 10.0.3.0/24, 10.1.0.0/24, and 10.1.1.0/24, all of which have the same convergence point. This greatly reduces the volume of probe traffic over conventional methods of route control. In other embodiments of the present invention, convergence point analysis can be used in data networks where the data network provides the communication means, such as physical inter connective links comprising copper wire, fiber optic cable, or the like, for transmitting and receiving signals. Similarly, wireless communication means, such as radio waves or the like, are also understood to provide means to transfer. information from a source to a destination.

As is well known in the art of network communications, data networks are configured to communicate electrical information, such as a computer data signal comprising data (e.g., binary data bits) superimposed upon a radio or any other carrier wave. A person having ordinary skill in the art would appreciate that a carrier wave is electromagnetic energy propagated from a source by radiation, optical or conduction waves and is suitable for embodying an information-bearing signal, such as a computer data signal. In one embodiment, a carrier wave behaves, or is modulated, according to a network protocol, such as Ethernet, IEEE 1394, TCP/IP, or any other communication protocol, so as to include computer data information. In some embodiments, the computer data signal includes a computer program for practicing the present invention.

The carrier wave can be, for example, a direct current, an alternating current, or a pulse chain. In modulation of the carrier wave, it may be processed in such a way that its amplitude, frequency, or some other property varies so as to embody data for transfer.

It should be noted that the route control processes discussed above were separated to emphasize the functionality of the processes, and that theses process can be constituents of the processes underlying the flow control system and/or the controller. Also, the data structures described above were also separated to better illustrate certain aspects of the present invention. In one embodiment, a single repository and/or data structure comprise each of the data structures described above.

Although the foregoing description uses convergence points as exemplary probe points or proxy points, the invention is not limited to the use of convergence points. Other means of point identification are contemplated by the invention and include using other intermediate hops along the data path, common address points inside a destination network block, such as the broadcast address, common network infrastructure elements, such as gateway routers or DNS servers, techniques, such as triangulation of third-party measurements, as well as other similar means. For example, a proxy point can be selected as the last known hop along a data path before an administrative boundary blocks the measurement. Common administrative boundaries, such as network firewalls block measurements to the destination end point. In order to measure the destination, the probing element typically has to "back off" by one hop in order to collect data and avoid security mechanisms or firewalls. This "N−1" hop is the last point on the data path that will respond to measurement and is an example of a very simple proxy point for the destination. Other common proxy points are well-known addresses inside a destination network. Addresses, such as the gateway address, typically ".1" of any address block (e.g. 24.0.16.0/24 uses 24.0.16.1 as the default router gateway address) can be a proxy point for many destinations in the network. Other addresses, such as the broadcast address, ".255", the network address itself, ".0", or other similar proxy points also can be used.

Other means of point identification involve common network infrastructure elements, such as DNS servers or gateway routers. For example, when a DNS request is issued from a client it is sent from the client's local DNS server. Measuring the performance to this DNS server can be used as a proxy for the destination performance. When multiple clients share a DNS server (as is common) this measurement can be used as a proxy for all those clients. When a DNS request is observed locally, some active measurements (i.e. active probes, pings, etc.) can be made to the originating DNS server. The path that represents the best performance (or lowest link utilization) to the DNS server can be used for the upcoming transaction. To enable subsequent decisions, the Time To Live (TTL) of the response should be set low. This allows subsequent responses that may differ due to dynamic changes in network performance or link load.

The use of DNS servers is a common technique for global load balancing. However, in order to use DNS servers for more explicit routing, the client address space needs to be mapped to the DNS server. In addition, the use of DNS servers to identify proxy points assumes proximity of the client and the DNS server.

Another approach to identifying proxy points is to use third-party measurements from a variety of locations throughout the network to identify common points representing a set of destinations. This approach commonly involves triangulation of third-party measurements to a set of destinations, e.g. an entire Autonomous System, to identify common proxy points for those destinations. Once identified, the proxy points can be communicated to the edge device making the measurements for routing and other purposes. In this case, the performance measurements from the third-party servers are accurate, but an assumption is made that the topology view from the third-party servers closely matches that of the source, at least close to the destinations. Thus, an extensive array of third-party measurements may be needed for this approach to be effective.

Although the present invention has been discussed with respect to specific embodiments, one of ordinary skill in the art will realize that these embodiments are merely illustrative, and not restrictive, of the invention. For example, although the above description describes route control as relating to Internet data, it should be understood that the present invention relates to networks and route control in general and need not be restricted to Internet data and signals and can be applied to the fields of communication and networks in general. The scope of the invention is to be determined solely by the appended claims.

In the foregoing specification, the invention is described with reference to specific embodiments thereof, but those skilled in the art will recognize that while the invention is not limited thereto. Various features and aspects of the above-described invention may be used individually or jointly. Further, although the invention has been described in the context of its implementation in a particular environment and for particular applications, its usefulness is not limited thereto and it can be utilized in any number of environments and applications without departing from the broader spirit and scope thereof. The specification and drawings are, accordingly, to be regarded as illustrative rather than restrictive.

What is claimed is:

1. A method for analyzing routes to a destination address space, comprising:
    identifying a plurality of paths, each path beginning at a different source and terminating at a common destination address space;
    identifying a plurality of nodes for each of the plurality of paths;
    identifying at least one convergence point between at least two of the paths, wherein the convergence point is a common node for the at least two paths, said at least two paths being non-diverse from the convergence point to the destination address space;
    associating the convergence point with the destination address space;
    determining a path performance for each of the at least two paths, wherein the path performance is based on a path performance from the source of each path to the convergence point; and
    analyzing the at least two paths to the destination address space.

2. The method of claim 1, wherein analyzing the at least two paths to the destination address space, comprises selecting a route to the destination address space based upon the relative path performances for the at least two paths.

3. The method of claim 2, wherein the at least two paths include a first path and a second path and wherein selecting a route to the destination address space based upon the relative path performances for the at least two paths comprises selecting the first path, further comprising:
    determining a current path performance for the first path;
    comparing the current path performance to the path performance for the first path; and
    based upon the comparison, selecting the second path as the route to the destination address space.

4. The method of claim 1, wherein analyzing the at least two paths to the destination address space, comprises determining diversity for the at least two paths.

5. The method of claim 4, further comprising analyzing path length for the at least two paths.

6. The method of claim 1, wherein analyzing the at least two paths to the destination address space provides network topology information that is used in connection with network planning activities.

7. The method of claim 1, wherein analyzing the at least two paths to the destination address space provides information used to evaluate distance and volume for a plurality of destinations, including the destination address space.

8. The method of claim 1, further comprising:
    periodically determining the path performance for each of the at least two paths.

9. The method of claim 1, further comprising:
    determining an aggregated address space that includes the destination address space and that is associated with the convergence point.

10. The method of claim 1, further comprising:
    determining an aggregated address space that includes the destination address space, that is associated with multiple convergence points and that shares a common next hop.

11. The method of claim 1 wherein identifying a plurality of paths comprises using an active path trace probe.

12. The method of claim 1 wherein identifying a plurality of paths comprises using a passive flow analyzer.

13. The method of claim 1, wherein the at least two paths include a first path, further comprising:
    associating the convergence point with additional destination address spaces; and
    obtaining path performance information for the destination address space and the additional destination address spaces using a single measurement of the first path.

14. The method of claim 1, wherein the plurality of paths pass through at least one public Internet Protocol network.

15. The method of claim 14 wherein the at least one Internet Protocol network is a network of an Internet Service Provider.

16. The method of claim 14 wherein the at least one Internet Protocol network is a Local Area Network.

* * * * *